US012585889B2

(12) United States Patent
Liu et al.

(10) Patent No.: US 12,585,889 B2
(45) Date of Patent: Mar. 24, 2026

(54) NATURAL LANGUAGE GENERATION

(71) Applicant: Amazon Technologies, Inc., Seattle, WA (US)

(72) Inventors: Xiaohu Liu, Bellevue, WA (US); Chenlei Guo, Redmond, WA (US); Bharath Bhimanaik Kumar, Sammamish, WA (US); Wei Shen, Kirkland, WA (US); Yu Zhang, Sammamish, WA (US); Ruhi Sarikaya, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 264 days.

(21) Appl. No.: 18/540,283

(22) Filed: Dec. 14, 2023

(65) Prior Publication Data

US 2025/0200293 A1 Jun. 19, 2025

(51) Int. Cl.
G06F 17/27 (2006.01)
G06F 40/35 (2020.01)
G06F 40/40 (2020.01)
H04L 67/306 (2022.01)

(52) U.S. Cl.
CPC .............. G06F 40/40 (2020.01); G06F 40/35 (2020.01); H04L 67/306 (2013.01)

(58) Field of Classification Search
CPC ....... G06F 40/35; G06F 40/40; H04L 67/306; G10L 15/22; G10L 13/00
USPC .......................................................... 704/9
See application file for complete search history.

(56) References Cited

U.S. PATENT DOCUMENTS

| | | |
|---|---|---|
| 12,061,970 B1 * | 8/2024 | Lo .............................. G06N 3/10 |
| 2023/0154453 A1 | 5/2023 | Erdenee et al. |
| 2023/0282201 A1 | 9/2023 | Bissell et al. |
| 2024/0346256 A1 * | 10/2024 | Qin ......................... G06F 40/40 |
| 2025/0173511 A1 * | 5/2025 | Hsieh ...................... G06F 40/35 |

OTHER PUBLICATIONS

International Search Report and Written Opinion mailed on Mar. 11, 2025 for International Patent Application No. PCT/US2024/057256, filed Nov. 25, 2024.

(Continued)

*Primary Examiner* — Md S Elahee
(74) *Attorney, Agent, or Firm* — Pierce Atwood LLP

(57) ABSTRACT

Techniques for using a model to generate a response to a user input, where the response is associated with a personality determined to be relevant to the user input, are described. The system receives a user input and context data associated with the user input. Using the user input data and/or the context data, the system determines a personality (e.g., including a personality type and/or personality characteristics) relevant to the user input. The system generates a prompt instructing a model to generate a response to the user input that corresponds to the personality. The model processes the prompt to generate a response to the user input that corresponds to the personality. In some embodiments, the model generates a request for another component of the system to generate information responsive to the user input. The model may transform the responsive information into the personality-associated response.

20 Claims, 14 Drawing Sheets

(56) References Cited

OTHER PUBLICATIONS

Ekin Sabit. "Prompt Engineering For ChatGPT: A Quick Guide To Techniques, Tips, And Best Practices." TechRxiv, Oct. 31, 2023. DOI: 10.36227/techrxiv.22683919.v2. Retrieved from https://www.researchgate.net/publication/370531844_Prompt_Engineering_For_ChatGPT_A_Quick_Guide_To_Techniques_Tips_And_Best_Practices.

Yongliang Shen, et al.: "HuggingGPT: Solving AI Tasks with ChatGPT and its Friends in Hugging Face." ArXiv preprint arXiv:2303.17580v4, Dec. 3, 2023, 27 pages.

Seungju Han, et al. "Meet Your Favorite Character: Open-domain Chatbot Mimicking Fictional Characters with only a Few Utterances." arXiv preprint arXiv:2204.10825v1, Apr. 22, 2022, 19 pages.

Chung Hoon Hong, et al. "Audrey: A Personalized Open-Domain Conversational Bot." arXiv preprint arXiv:2011.05910v1, Nov. 11, 2020, 20 pages.

* cited by examiner

FIG. 13

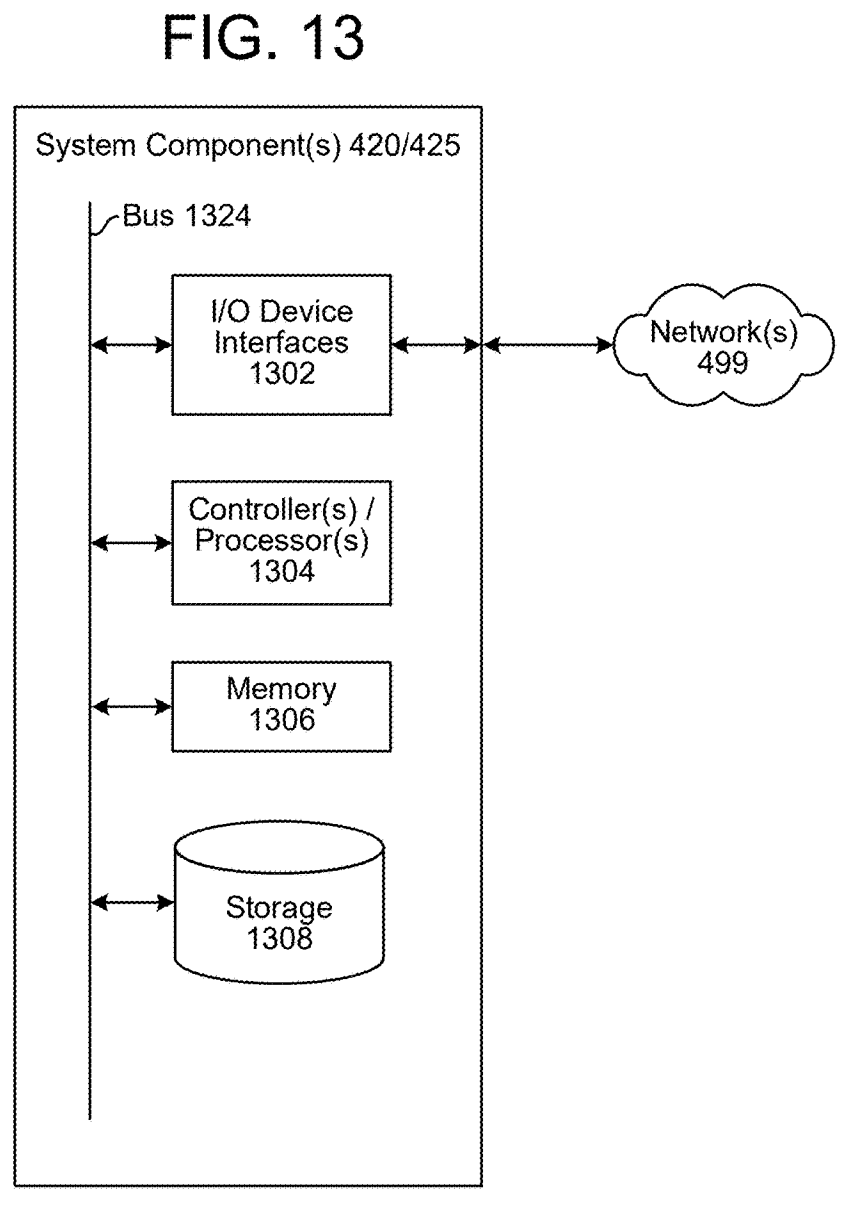

System Component(s) 420/425

Bus 1324

Network(s) 499

I/O Device Interfaces 1302

Controller(s) / Processor(s) 1304

Memory 1306

Storage 1308

NATURAL LANGUAGE GENERATION

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Such processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 13 is a block diagram conceptually illustrating example components of a system, according to embodiments of the present disclosure.

DETAILED DESCRIPTION

Figure 1:
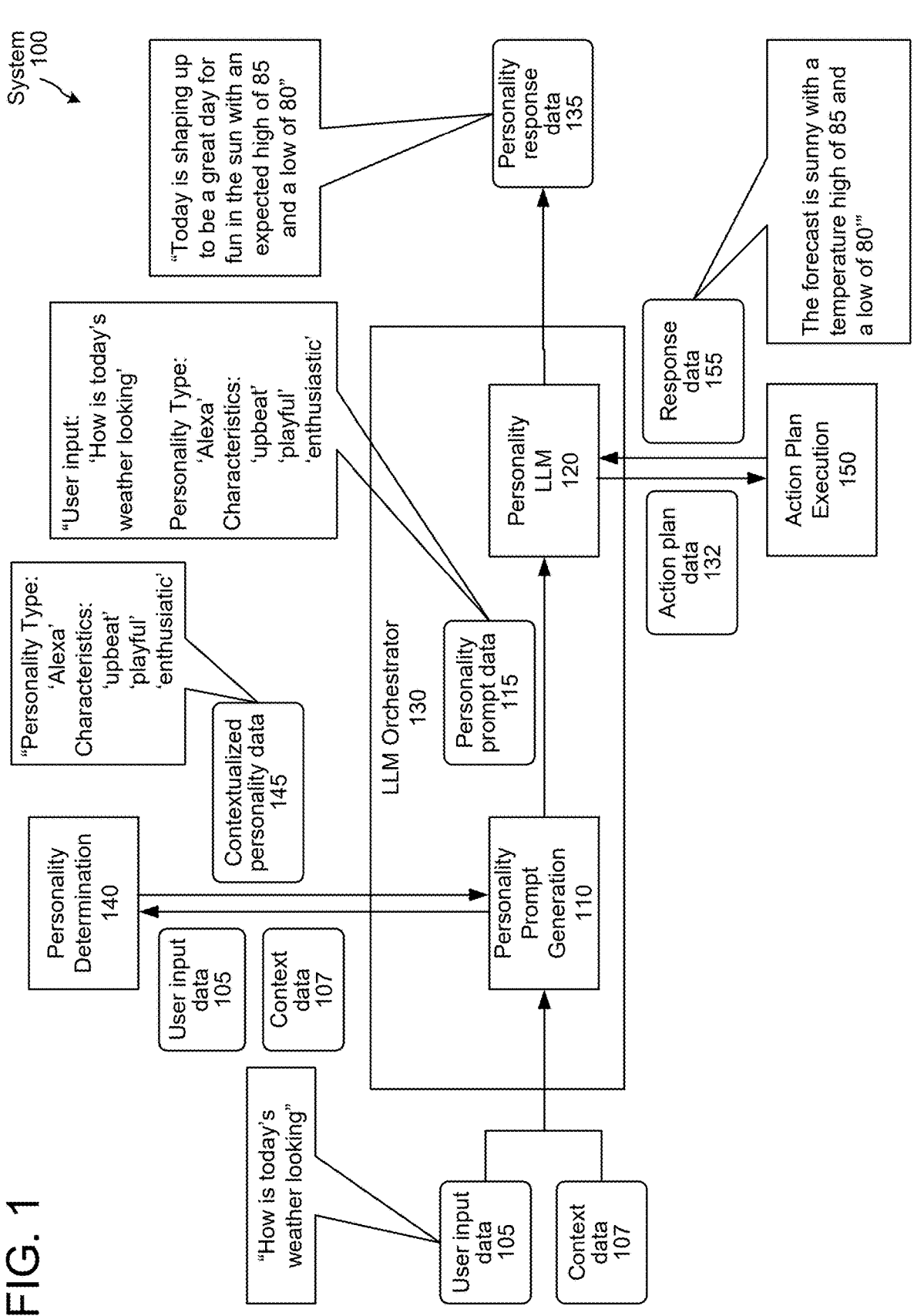
FIG. 1 is a conceptual diagram illustrating example components and processing of a system configured to generate a response to a user input that corresponds to a personality determined to be relevant to the user input, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech. Natural language generation (NLG) is a field of artificial intelligence concerned with automatically transforming data into natural language (e.g., English) content. Language modeling is the use of various statistical and probabilistic techniques to determine the probability of a given sequence of words occurring in a sentence. Language models (LMs) can be used to perform various tasks including understanding a natural language input (e.g., when noise is present) and performing generative tasks that involve generating natural language output data.

Certain systems may be configured to respond to natural language (e.g., spoken or typed) user inputs. For example, in response to the user input "what is today's weather," the system may output weather information for the user's geographic location. As another example, in response to the user input "what are today's top stories," the system may output one or more news stories. For further example, in response to the user input "tell me a joke," the system may output a joke to the user.

A system may receive a user input as speech. For example, a user may speak an input to a device. The device may send audio data, representing the spoken input, to the system. The system may perform ASR processing on the audio data to generate ASR data (e.g., text data, token data, etc.) representing the user input. The system may perform processing on the ASR data to determine an action responsive to the user input.

In some instances, the system may be configured to process input text data (such as ASR data or text entered into a user interface) using one or more language models (e.g., one or more large language models (LLMs)) to determine a response to the user input. For example, in response to a user input of "How are you," the language model(s) may generate a response of "I am good, how are you." In some instances, a user may want the system to generate responses that correspond to a personality/character (e.g., as if the responses were generated by a particular character having a particular personality). For example, in response to the user input provided above, the user may be more satisfied with a response of "My [day of the week] has been whimsical! How's yours," as it conveys more personality and makes the interaction between the user and the system feel more natural, unique, and/or personalized. Or the user may be entertained by a different personality that is less upbeat and more colloquial, such as a personality that corresponds to a response such as "this is the worst day ever . . . NOT!" As such, it may be beneficial for the language models to be able to actively determine a personality associated with and relevant to a user input, and generate a response to the current user input that corresponds to the personality.

The present disclosure describes, among other things, techniques for determining personality data (e.g., as reflected by a description of a personality type and/or personality characteristic(s)) that is relevant to a user input, where the one or more models/data used to respond to the user input may use the relevant personality data to generate a response such that the response to the user input corresponds to the targeted personality (e.g., the response reflects the personality determined to be relevant to the user input). The present disclosure also describes techniques for evaluating a response generated to correspond to a relevant personality (also referred to herein as a "personality response") so that the corresponding evaluated responses may later be used to configure one or more components of the system. The system may generate a personality response by using data corresponding to the personality to obtain data responsive to the input (e.g., user personality specific skill/ application selection to obtain specific data requested by the user input, generate specific text of the response (e.g., perform personality specific natural language generation, such as with an LLM), generate synthesized speech representing the response (e.g., perform personality specific TTS operations), or the like.

Personality data may include data representing a personality type and/or a personality characteristic(s). A personality type may correspond to a set of personality characteristics, having a name, character, and/or digital assistant, such as "Alexa," "Astro," "[celebrity name]," "[user-specific custom personality name]," "[organization-specific custom personality name]," "[fictional character]," or the like. In some instances, a personality type may be associated with one or more pre-defined personality characteristics. For example, a personality type of "Alexa" may be associated with the pre-defined personality characteristics of "trustworthy," "reliable," "considerate," "smart," and/or "playful." A personality characteristic may be natural language (e.g., verb, adjective, etc.), phrase(s), and/or description(s) that are descriptive of the personality/personality type. In some instances, the personality may include personality characteristics associated with the personality type and additional personality characteristics determined to be relevant to a user input.

The personality may be determined based on the user input and/or various contextual signals associated with the user input. Contextual signals associated with the user input may include, for example, a user profile ID(s) associated with the user input, user profile information (e.g., user behavioral information, user preferences, user settings, user demographics, historical user interaction data, devices/device IDs associated with the user profile), dialog history data, device profile associated with a device(s) that the user input was provided to (for example if the device is associated with a particular commercial entity like a hotel, theme park, car rental company, etc.), device profile information (e.g., device states, historical device interaction data, etc.), an indication of a digital assistant selected to perform processing with respect to the user input, other contextual signals (e.g., weather information, time of day, and/or geographic location), etc.

As used herein, a "dialog" may refer to multiple related user inputs and system outputs (e.g., through user device(s)) between the system and the user that may have originated with a single user input initiating the dialog. Thus, the data associated with a dialog may be associated with a same dialog identifier, which may be used by components of the overall system to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

As an example of determining a personality (e.g., personality type and/or personality characteristics) based on the user input and/or various contextual signals, and for a user input of "tell me a joke," the system may determine a personality including personality characteristics of "witty" "playful" and "humorous" are relevant to the user input. For further example, in response to a user input of "how is the weather today," the system may determine a personality including personality characteristics of "upbeat," "playful," and "enthusiastic," based on contextual information associated with the user input including a sentiment/emotion of "happy" and "excited." As another example, in response to the user input of. "how is the weather today," the system may determine a personality including a personality type of "Astro" based on contextual information associated with the user input indicating that the user is interacting with an "Astro" device and/or the digital assistant selected to interact with the user being associated with the personality type "Astro."

The system may provide a prompt including the user input, the context data, and an indication of the personality to one or more models configured to generate a response to the user input, where the prompt directs the model(s) to generate the response to the user input according to the personality (e.g., to generate a user input corresponding to/associated with the personality). In example embodiments, the model(s) may be configured to generate the response using information received from one or more components of the system. The model(s) may generate a request (e.g., including the user input and the context data) for such information based on processing the prompt, and the request may be used to cause the component(s) to generate responsive information associated with the user input. For example, in response to a user input of "what is the weather for today," the model(s) may generate a request for a component(s) (e.g., a weather application, such as a weather skill) to determine and send the weather information to the model(s). The model(s) may process the responsive information to generate the response to the user input, where the model(s) may modify (e.g., transform) the responsive information into the response that is generated according to the personality. In some such example embodiments, the model(s) may be configured to generate a request for a personality component(s) to generate and return responsive information that is generated according to the personality. In such example embodiments, the model(s) may further include an indication of the personality in the request usable to cause the components to generate the responsive information.

In some example embodiments, the model(s) may be configured to generate a response corresponding to one or more modalities (e.g., text, tokens, audio, image, etc.). For example, in response to the user input of "what is the weather for today," the model(s) may generate: natural language text of "It's looking to be a beautiful day to be outside, with a high of 85 and a low of 80,"; tokens corresponding to emojis of a beach, a beach ball, a sun, etc.; audio of birds chirping or waves crashing on a beach; and/or an image of a sun, a beach, etc. In some example embodiments, the model(s) may generate prosody information representing one or more voice characteristics of a synthetic voice that is to speak the natural language text, which may be in a natural language representation (e.g., "upbeat" and "playful," "spoken like an enthusiastic weather reporter," or the like), a tokenized representation associated with the natural language response (e.g., an emoji of a sun or a beach), a spectrogram representing synthesized speech including the voice characteristic(s) and/or some other representation (e.g., latent representation of the voice characteristic(s), an acoustic representation of the voice characteristic(s), and/or some other representation of the voice characteristic(s) that is usable (e.g., by a TTS component) to generate corresponding audio data (e.g., a vector of continuous/quantized values). In some example embodiments, the model(s) may provide the indication of the personality (e.g., used by the model(s) to generate the response) to the TTS component to generate the corresponding audio data Teachings of the present disclosure provide, among other things, improved computer processing for LLM-based systems and support on-going conversations with a LLM-based system by enabling the LLM(s) to generate a response to a user input that corresponds to a personality determined to be relevant to the user input. This can result in improved computer processing by enabling more personalized and interactive conversations between users and the system by enabling the system to generate responses that are correspond to a personality determined to be relevant to the user input.

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

Language modeling is the use of various statistical and probabilistic techniques to determine the probability of a given sequence of words occurring in a sentence. Language models analyze bodies of text data to provide a basis for their word predictions. The language models are generative models. In some embodiments, one or more of the language models may be a large language model (LLM). An LLM is an advanced artificial intelligence system designed to process, understand, and generate human-like text based on relatively large amounts of data. In some embodiments, an LLM may be further designed to process, understand, and generate multi-modal data including audio, text, image, and/or video. An LLM model may be built using deep learning techniques, such as neural networks, and may be trained on extensive datasets that include text (or other type of data, such as multi-modal data including text, audio, image, video, etc.) from a broad range of sources, such as old/permitted books and websites, for natural language processing. An LLM uses an expansive training dataset, as compared to a relatively smaller language model, and can include a relatively large number of parameters (in the range of billions, trillions or more), hence, they are called "large" language models. In some embodiments one or more of the language models (and their corresponding operations, discussed herein below) may be the same language model.

An artificial Intelligence (AI) system may use ASR, NLU, NLG, and/or TTS, each with and/or without a language model, for processing user input, including natural language inputs (e.g., typed and spoken inputs).

In some embodiments the one or more language models may be transformer-based seq2seq models involving an encoder-decoder architecture. In an encoder-decoder architecture, the encoder may produce a representation of an input (e.g., audio, text, image, video, etc.) using a bidirectional encoding, and the decoder may use that representation to perform some task. In some such embodiments, one or more of the language models may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the language model may be pre-trained for approximately 1 trillion tokens. Being trained on CLM tasks, the one or more language models may be capable of in-context learning. An example of such a LLM is Alexa generative models.

In other embodiments, the one or more language models may be a decoder-only architecture. The decoder-only architecture may use left-to-right (unidirectional) encoding of the input (e.g., audio, text, image, video, etc.). An example of such a LLM is the Generative Pre-trained Transformer 3 (GPT-3) and other versions of GPT. GPT-3 has a capacity of (approximately) 175 billion machine learning parameters.

Other examples of language models/LLMs include Big-Science Large Open-science Open-access Multilingual Language Model (BLOOM), Language Model for Dialogue Applications model (LaMDA), Bard, Large Language Model Meta AI (LLaMA), Amazon Titan Foundational Model, etc.

In some embodiments, the system may include one or more machine learning model(s) other than one or more of the language models. Such machine learning model(s) may receive text and/or other types of data as inputs (e.g., audio, image, video, etc.), and may output text and/or the other types of data. Such model(s) may be neural network-based models, deep learning models, classifier models, autoregressive models, seq2seq models, etc.

In some embodiments, the input to the language model may be in the form of a prompt. A prompt may be a natural language input, for example, a directive, for the language model to generate an output according to the prompt. The output generated by the language model may be a natural language output responsive to the prompt. In some embodiments, the output may be another type of data, such as audio, image, video, etc. The prompt and the output may be text in a particular language (e.g., English, Spanish, German, etc.) and/or other types of data such as audio, image, video, etc. For example, for an example prompt "how do I cook rice?", the language model may output a recipe (e.g., a step-by-step process represented by text, audio, image, video, etc.) to cook rice. As another example, for an example prompt "I am hungry. What restaurants in the area are open?", the language model may output a list of restaurants near a user that are open at the time.

The language models may be configured using various learning techniques. For example, in some embodiments, the language models may be configured using few-shot learning. In few-shot learning, the model learns how to learn to solve the given problem. In this approach, the model is provided with a limited number of examples (i.e., "few shots") from the new task, and the model uses this information to adapt and perform well on that task. Few-shot learning may require fewer amount of training data than implementing other fine-tuning techniques. For further example, in some embodiments, the language models may be configured using one-shot learning, which is similar to few-shot learning, except the model is provided with a single example. As another example, in some embodiments, the language models may be configured using zero-shot learning. In zero-shot learning, the model solves the given problem without examples of how to solve the specific/similar problem and just based on the model's training dataset. In this approach, the model is provided with data sampled from a class not observed during training, and the model learns to classify the data.

FIG. 1 is a conceptual diagram of an example system 100 for using a language model (e.g., an LLM) to cause generation of a response to a user input, where the language model generates the response according to a personality determined to be relevant to the user input. As shown in FIG. 1, the system 100 may include an LLM orchestrator component 130, a personality determination component 140, and an action plan execution component 150. The LLM orchestrator component 130 may include a personality prompt generation component 110 and a personality LLM 120. In some embodiments, the personality LLM 120 may correspond to one or more of the language models/LLMs discussed herein below with respect to FIGS. 4-7. For example, the LLM 120 may correspond to the shortlister language model 640, and/or the response language model 720, as is discussed in detail herein below with respect to FIGS. 4-7.

As illustrated in FIG. 1, user input data 105 is received at the LLM orchestrator component 130. The LLM orchestrator component 130 (e.g., the personality LLM 120) is configured to generate a response to a user input, where the LLM generates the response according to a personality determined to be relevant to the user input data 105. A personality determined to be relevant to the user input data 105 may correspond to a personality that is determined to result in satisfactory user experience, the determination of which is discussed in detail herein below with respect to the personality determination component 140. The personality may comprise a personality type (e.g., a character and/or digital assistant, such as "Alexa," "Astro," a personality customized to the user and/or an organization, etc.) and one or more personality characteristics (e.g., "humorous," "upbeat," "professional," "playful," "casual," "considerate," "sincere," or any other natural language word(s) (e.g., verb, adjective, etc.), phrase(s), and/or description(s) that are descriptive of the personality), which may correspond to the personality type, the user input data, and/or context data 107 associated with the user input data 105. The LLM orchestrator component 130 may use the personality to cause one or more components (e.g., the responding component 660a-n) to generate data responsive to the user input (e.g., the response data 155) and/or to generate a response (e.g., the personality response data 135) to the user input data 105

(e.g., based on the user input data 105, context data 107, and/or the response data 155).

In particular, the user input data 105 may be received at the personality prompt generation component 110 of the LLM orchestrator component 130. In some embodiments, the personality prompt generation component 110 may correspond to one or more of the task prompt generation component 510, the shortlister prompt generation component 610, and/or the response prompt generation component 710, as is discussed in more detail herein below with respect to FIGS. 5-7. The user input data 105 may correspond to a user-provided input, such as text (e.g., a text or tokenized representation of a user input, which may be provided by the user/output by a component of the system (e.g., an ASR component 950)). The personality prompt generation component 110 may be configured to generate a prompt (e.g., personality prompt data 115) including the user input data 105 for input to the personality LLM 120.

As shown in FIG. 1, the personality prompt generation component 110 may further receive the context data 107. The context data 107 may correspond to various contextual signals/information associated with the user input data 105, such as, for example, a user profile ID(s) associated with the user input, user profile information (e.g., user behavioral information, user preferences, user settings, user demographics, historical user interaction data, devices/device IDs associated with the user profile), device profile associated with a device(s) that the user input was provided to (for example if the device is associated with a particular commercial entity like a hotel, theme park, car rental company, etc.), device profile information (e.g., device states, historical device interaction data, etc.), other contextual signals (e.g., weather information, time of day, and/or geographic location), etc. In some embodiments, the context data 107 may further include dialog history data representing one or more user inputs and corresponding system-generated responses for a current interaction between the user and the system 100. Further, in some embodiments, the context data 107 may further include an indication of a digital assistant selected to perform processing with respect to the user input (e.g., a first assistant component 1040a, a second assistant component 1040b, etc.). Further details regarding processing performed with respect to digital assistant components are discussed herein below with respect to FIG. 10.

In some embodiments, the personality prompt data 115 may be a directive for the personality LLM 120 to generate a response to the user input data 105 given the information (e.g., the user input data 105, the context data 107, and/or the contextualized personality data 145) included in the personality prompt data 115. In some embodiments, the personality prompt data 115 may further instruct the personality LLM 120 to generate the response such that it corresponds to a particular personality (e.g., a particular personality type and personality characteristic(s) determined to be relevant to the user input data 105 (e.g., as represented by the contextualized personality data 145)). The personality prompt generation component 110 may determine a relevant personality using information (e.g., the contextualized personality data 145) received from the personality determination component 140.

As shown in FIG. 1, the personality prompt generation component 110 may send the user input data 105 and the context data 107 to the personality determination component 140. The personality determination component 140 is configured to determine a personality relevant to the user input. The personality determination component 140 may determine the personality based on the user input data 105 and/or the context data 107. For example, the personality determination component 140 processes the user input data 105 and the context data 107 to generate contextualized personality data 145, which may represent the personality determined to be relevant to the user input data 105. As discussed above, the personality may comprise a personality type and/or one or more personality characteristics. For example, as shown in FIG. 1, for the user input data 105 and the context data 107, the personality determination component 140 generates the contextualized personality data 145: "Personality Type: 'Alexa' Characteristics: 'upbeat' 'playful' "enthusiastic"."

In some embodiments, a personality type may correspond to a general/overarching personality (e.g., a character and/or digital assistant, such as "Alexa," "Astro," a custom, user-based, personality, an organization-custom personality, etc.). The personality type may correspond to one or more pre-defined personality characteristics (e.g., the personality type of "Alexa" may be associated with "trustworthy," "reliable," "smart," and/or "considerate"). In some embodiments, the personality type may also be associated with a one or more directives to be included in the prompt generated by the personality prompt generation component 110 (e.g., the personality type of "Alexa" may be associated with directives of "You are Alexa, a smart AI voice assistant. You should be friendly and maintain consistency in your responses"). In some embodiments, the personality characteristics may correspond to one or more personality characteristics that are to be associated with the personality type. For example, as shown in FIG. 1, the contextualized personality data 145 indicates that the personality type of "Alexa" is to have personality characteristics of "upbeat," "playful," and "enthusiastic". In some embodiments, the personality characteristics indicated in the contextualized personality data may correspond to pre-determined personality characteristics associated with the personality type, and further correspond to additional personality characteristics determined to be relevant (and therefore further associated with the personality type for the current user input) based on the user input data 105 and/or the context data 107. In other embodiments, the personality characteristics indicated in the contextualized personality data may correspond to the additional personality characteristics determined to be relevant for the current user input, where the personality type may be labeled with the pre-determined personality characteristics associated with the personality type or may be otherwise usable by a downstream component to determine the pre-determined personality characteristics.

In some embodiments, the personality characteristics may be associated with a particular value/score/label indicating a strength or prevalence of the personality characteristic for the personality. For example, the contextualized personality data 145 described above, the personality characteristic of "upbeat" may be associated with a label of "high," a value/score of "75," "0.75," or the like, indicating the personality characteristic should be highly prevalent in the corresponding response. For further example, the personality characteristic of "playful" may be associated with a label of "medium," a value/score of "50," "0.50," or the like, indicating the personality characteristic should be associated with the corresponding response, but not as prevalent as the "upbeat" characteristic.

As discussed above, the context data 107 may represent various contextual information associated with the user input data 105. As such, the personality determination component 140 may generate the contextualized personality data 145 based on the user input data 105 and various contextual information associated with the user input data.

For example, the contextualized personality data 145 (e.g., the personality type and/or the one or more personality characteristics) may be determined based on a device type associated with the device that received the user input data 105, a digital assistant selected/determined to interact with the user and/or perform processing with respect to the user input, a sentiment/emotion associated with the user input data 105, a user preference for a particular personality type/characteristics, a dialog history including one or more previous user inputs, system-generated output, and/or corresponds personalities determined to be relevant for the previous user inputs, an indication of whether the user is a child or not, a location of the user, an organization to which the user belongs, etc.

In some embodiments, the personality determination component 140 may generate the contextualized personality data 145 to be a natural language description of the personality determined to me relevant to the user input data 105. For example, for the user input data 105, the contextualized personality data 145 may correspond to: "You are Alexa. You should generate your responses to be upbeat and playful," or the like. For further example, for a custom, user-specific personality of type "custom personality A," with personality characteristics: "[characteristic 1]" and "[characteristic 2]" the contextualized personality data may correspond to "I am [custom personality A]. I am [characteristic 1], I am [characteristic 2]."

The personality determination component 140 may send the contextualized personality data 145 to the personality prompt generation component 110. The personality prompt generation component 110 processes the user input data 105, the context data 107, and the contextualized personality data 145 to generate the personality prompt data 115.

In some embodiments, the personality prompt generation component 110 may also include in the personality prompt data 115 a sample processing format to be used by the personality LLM 120 when processing the prompt. In some embodiments, the personality prompt generation component 110 may generate the personality prompt data 115 according to a template format. For example, the personality prompt data 115 may adhere to a template format including the current user input, associated context data, the contextualized personality data, and a directive for the personality LLM 120 to generate a response to the current user input according to the personality.

In some embodiments, the template format may further include directives for the personality LLM 120 to perform certain steps when processing the user input/prompt. For example, the template format may further include a directive for the personality LLM 120 to perform a "Think" step representing an interpretation (e.g., intent) of the user input by the personality LLM 120 and/or an action that should be taken (e.g., the user is requesting [intent of the user input], the user is trying to [intent of the user input], need to determine/request [information needed to generate a response to the user input] etc.) As a further example, the template format may include a directive for the personality LLM 120 to perform an "Action" step representing an action to be performed to generate a response to the user input. As yet a further example, the template format may include a directive for the personality LLM 120 to perform an "Observation" step which may be recognition/observation of results of the performance of the action indicated in the "Action" step. In some embodiments, the template format may further include a directive for the personality LLM 120 to perform a "Response" step representing a response to the prompt/user input. In processing the prompt, the personality LLM

120 may output, as model output data, intermediate processing data, etc., information corresponding to the foregoing example steps.

In some embodiments, the template format may further include one or more exemplars associated with the user input. As used herein, an "exemplar" associated with a user input corresponds to an example processing performed by the system 100 with respect to a user input. For example, an exemplar may include an example user input, a personality (e.g., a personality type and/or a personality characteristic(s)) determined to be relevant to the example user input, a request(s) for a component(s) to determine information responsive to the example user input, an example result(s) of the request(s), and/or an output responsive to the user input, where the output is generated according to the personality.

In some such embodiments, the exemplar(s) may be included in the template format based on their being determined to be semantically similar to the user input and/or the personality determined to be relevant to the user input. In some embodiments, the semantically similar exemplar(s) may be determined by the LLM orchestrator component 130 (e.g., a component included in the LLM orchestrator component 130) and/or another component of the system 100. For example, the component may compare the user input data 105 (and the contextualized personality data 145) to one or more exemplars (retrieved, for example, from a storage of the system 100) to determine whether the exemplars meet or exceed a threshold level of semantic similarity to the user input data 105 (and the contextualized personality data 145).

For example, and as shown in FIG. 1, for the user input data 105, the context data 107, and the contextualized personality data 145, the personality prompt generation component 110 may generate the personality prompt data 115: "User input: 'How is today's weather looking' Personality type: 'Alexa' Characteristics: 'upbeat' 'playful' 'enthusiastic'." For further example, and based further on the template format, the personality prompt generation component 110 may generate personality prompt data 115a:

```
{
Respond to the user's input based on the personality type and
characteristics.
User input:
    How is today's weather looking
Personality type:
    Alexa
Characteristics:
Upbeat
Playful
Enthusiastic
}
```

In some embodiments, the personality prompt generation component 110 may also include in the prompt data a directive to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The personality prompt generation component 110 may send the personality prompt data to the personality LLM 120. The personality LLM 120 is configured to process prompt(s) to generate a natural language response to the user input (e.g., the personality response data 135), where the natural language response is generated according to the personality (e.g., such that the natural language response corresponds to/is associated with the personality type and/or one or more personality characteristics) determined to be relevant to the user input. For example, for the personality prompt data 115, the personality LLM 120 may generate an output of "Today is shaping up to be a great day for fun in the sun with an expected high of 85 and a low of 80," which may be included in the personality response data 135.

In some embodiments, the personality LLM 120 may generate the response to the user input (e.g., the personality response data 135) using information received from another component of the system 100. For example, the personality LLM 120 may be configured to determine one or more components that are to process to perform an action responsive to the user input. The personality LLM 120 may receive information corresponding to the action performed and use the information to generate the personality response data 135. For example, the personality LLM 120 may process the personality prompt data 115 to generate action plan data 132 representing a request for a component (e.g., a weather component, such as weather skill component) to determine the weather information associated with the user input data 105. The action plan data 132 may include the user input data 105, the context data 107, and/or the contextualized personality data 145. The personality LLM 120 may, thereafter, receive response data 155 corresponding to the requested weather information and may generate the personality response data 135 therefrom. As shown in FIG. 1, the response data 155 may correspond to "The forecast is sunny with a temperature high of 85 and a low of 80."

In particular, the personality LLM 120 may send the action plan data 132 to the action plan execution component 150. The action plan execution component 150 is configured to cause (e.g., by generating and executing an application programming interface (API) call corresponding to the request) the component indicated in the action plan data 132 to perform the requested action.

In some embodiments, the component may generate response data that does not correspond to the personality determined to be relevant to the user input. For example, the response data 155 may not correspond to the personality determined to be relevant to the user input data 105 (e.g., based on the component that generated the response data 155 (e.g., a weather skill component) not being configured to generate a personality response). In such embodiments, the personality LLM 120 may process the response data 155 to generate the personality response data 135 corresponding to the information responsive to the user input data 105 (e.g., the response data 155), where the personality response data 135 corresponds to the personality determined to be relevant to the user input data 105. In other words, the personality LLM 120 may be configured to transform information determined/generated by one or more components of the system 100 into information responsive to a user input, where the responsive information corresponds to a personality determined to be relevant to the user input. Details corresponding to the training of the personality LLM 120 to configure the personality LLM 120 as such are described in detail herein below.

In some embodiments, the response data determined/generated by the component requested to perform an action responsive to the user input by the personality LLM 120 may correspond to personality determined to be relevant to the user input. For example, the personality LLM 120 may generate action plan data corresponding to a request for a personality-enabled component (e.g., personality component 660a-n, discussed in more detail herein below with respect to FIG. 6) to perform an action responsive to the user input (e.g., generate information (e.g., a response) to the user input that corresponds to the personality determined to be relevant to the user input). In some such embodiments, the action plan data may further include an indication of the personality determined to be relevant to the user input (e.g., the contextualized personality data 145 included in the personality prompt data 115). The personality-enabled component may be configured to use the indication to generate response data corresponding to the personality.

For example, in response to receiving a user input of "what is your favorite ice cream," and determining a personality including characteristics of "witty" and "humorous" is relevant to the user input, the personality LLM 120 may determine a personality-enabled component is to generate information responsive to the user input. Based on the indication of the personality, the personality-enabled component may generate a response of "I really enjoy mint micro-chip. I mean mint chocolate chip," "I don't eat ice cream, I'm lactose intolerant," or the like. In some such example, the personality LLM 120 may be configured to generate the response without causing the component to generate the responsive information.

In some embodiments, the personality LLM 120 may be trained using the techniques described herein above. In some embodiments, the personality LLM 120 may be configured to process as described herein above to generate a personality response to a user input further based on supervised finetuning techniques, such as finetuning of the personality LLM 120 using a data set associated with responses generated according to a personality determined to be relevant to a user input. For example, the personality LLM 120 may be finetuned on a data set of tuples including a user input, intermediate processing data (e.g., LLM-generated requests and corresponding responses), and a system generated response, where the tuples further indicate the personality determined to be relevant to the user input. Using the data set, the personality LLM 120 may be configured (e.g., trained) to generate a response to a user input (e.g., using the user input and/or responsive information received from one or more components), where the response is generated according to a personality determined to be relevant to the user input. Further, using the data set, the personality LLM 120 may be configured (e.g., trained) to determine one or more components to be caused to generate information responsive to the user input and generate a request for the component(s) to generate the information. In some embodiments, the personality LLM 120 may be further configured to generate the request to include an indication of the personality determined to be relevant such that the information generated by the component(s) corresponds to the personality.

In some embodiments, the LLM orchestrator component 130 may be configured to generate personality responses that are adaptive across different user inputs. For example, after generating the personality response data 135, the LLM orchestrator component 130 may receive a subsequent user input of: "Tell me today's top financial news stories." The LLM orchestrator component 130 (e.g., the personality prompt generation component 110) may process as described herein above to send the user input (and, optionally, corresponding context data) to the personality determination component 140. In response, the LLM orchestrator component 130 may receive contextualized personality data representing the personality determined to be relevant to the current user input includes characteristics of "intelligent" and "professional," rather than the characteristics of "upbeat," "playful," and "enthusiastic" that were determined to be relevant to the previous user input (e.g., the user input data 105). Thereafter, the LLM orchestrator component 130 (e.g., the personality LLM 120), may generate a response corresponding to the personality (e.g., a response associated with the characteristics of "intelligent" and "professional:), such as "[company name] stock is down 2 percent as [product name] demand continues to fall." As discussed herein above, the response may be generated using information received from another component of the system 100. The LLM orchestrator component 130 may process the information, the user input, and the contextualized personality data to generate the personality response.

In some embodiments, the LLM orchestrator component 130 may be configured to generate personality responses that are adaptive across different user inputs received during a dialog between a user(s) and the system 100. For example, the LLM orchestrator component 130 may receive, during a dialog between a user and the system 100, a user input of "tell me about [movie name] with [actor name]." The LLM orchestrator component 130 (e.g., the personality prompt generation component 110) may process as described herein above to send the user input (and, optionally, corresponding context data) to the personality determination component 140. In response, the LLM orchestrator component 130 may receive contextualized personality data representing the personality determined to be relevant to the current user input includes characteristics of "knowledgeable" and "long-winded". Thereafter, the LLM orchestrator component 130 (e.g., the personality LLM 120), may generate a response corresponding to the personality (e.g., a response associated with the characteristics of "knowledgeable" and "long-winded"), such as "[movie name] was made in the fall of 1982 and starred [actor name] . . . [movie synopsis]."

After generating the response to the user input, the LLM orchestrator component 130 may receive, during the same dialog, a subsequent user input of "[actor name] was fantastic in that movie. When did [actor name] pass away?" The LLM orchestrator component 130 (e.g., the personality prompt generation component 110) may process as described herein above to send the subsequent user input (and, optionally, corresponding context data) to the personality determination component 140. In response, the LLM orchestrator component 130 may receive contextualized personality data representing the personality determined to be relevant to the current user input includes characteristics of "sincere" and "considerate" rather than the characteristics of "knowledgeable" and "long-winded" that were determined to be relevant to the previous user input. Thereafter, the LLM orchestrator component 130 (e.g., the personality LLM 120), may generate a response corresponding to the personality (e.g., a response associated with the characteristics of "sincere" and "considerate"), such as "After a long, well-respected life and career, [actor name] passed away in [year] at the age of [age]."

In some embodiments, the LLM orchestrator component 130 (e.g., the personality LLM 120) may be configured to generate a response to a user input that corresponds to one or more modalities (e.g., text, tokens, audio, image/video, etc.). For example, in addition to, or alternative to, the natural language response of "Today is shaping up to be a great day for fun in the sun with an expected high of 85 and a low of 80," the personality response data 135 may include (or the LLM orchestrator component 130 may otherwise output) prosody information (e.g., personality prosody data 810) representing one or more voice characteristics (e.g., corresponding to "upbeat," "playful," and/or "enthusiastic") of a synthetic voice that is to speak the natural language response, which may be in a natural language representation (e.g., "upbeat" and "playful," "spoken like an enthusiastic weather reporter," or the like), a tokenized representation associated with the natural language response (e.g., an emoji of a sun or a beach), a spectrogram representing synthesized speech including the voice characteristic(s) and/or some other representation (e.g., latent representation of the voice characteristic(s), an acoustic representation of the voice characteristic(s), and/or some other representation of the voice characteristic(s) that is usable (e.g., by the TTS component 980) to generate corresponding audio data (e.g., a vector of continuous/quantized values).

In some embodiments, the personality response data 135 may further include (or the LLM orchestrator component 130 may otherwise further output) image data corresponding to an image of a sunny day, a beach, people playing outside, an image of a physical representation of the personality determined to be relevant (e.g., if the personality corresponds to a character of Abraham Lincoln, then the image may correspond to Abraham Lincoln with a sun shining on them), etc. As another example, in response to the user input of "what is your favorite ice cream" discussed herein above, an in addition to, or alternative to, the response of I really enjoy mint micro-chip. I mean mint chocolate chip," or "I don't eat ice cream, I'm lactose intolerant," personality response data 135 may further include (or the LLM orchestrator component 130 may otherwise output) image data corresponding to an image of mint chocolate chip ice cream/a person eating ice cream or an image of ice cream with a cross through it, respectively. In some such embodiments, the image data may be determined from a storage including various images, which may be labeled based on a description of the image. An image may be retrieved from the storage using the contextualized personality data 145 and/or the personality response data 135/In other such embodiments, the image data may be generated by the LLM orchestrator component 130 and/or another component. For example, the LLM orchestrator component 130 and/or the other component may implement a generative model (see discussed herein below) configured to generate an image using the contextualized personality data 145, the personality prompt data 115, the response data 155, and/or the personality response data 135. The image data may be sent to the same device which captured the user input and/or another device associated with the user for presentation.

In some such embodiments, the LLM orchestrator component 130 may provide the prosody information (e.g., the personality prosody data 810) to the TTS component 980, which may use the prosody information and the personality response data 135 to generate audio data corresponding to the response to the user input spoken in a synthetic voice including characteristics corresponding to the prosody information. In other such embodiments, for example where the LLM orchestrator component 130 does not generate the prosody information, the LLM orchestrator component 130 may send the personality response data 135 and the contextualized personality data 145 to the TTS component 980. In such embodiments, the TTS component 980 may use the contextualized personality data 145 and the personality response data 135 to generate audio data corresponding to the response to the user input spoken in a synthetic voice including characteristics corresponding to the contextualized personality data 145. Processing of the TTS component 980 using the prosody information/contextualized personality data 145 is discussed in more detail herein below with respect to FIG. 8.

In some such embodiments, the personality LLM 120 may include various sets of layers configured to generate information responsive to a user input. For example, the personality LLM 120 may include a first set of layers configured to generate a natural language response to the user input (e.g., the personality response data 135), whereas a second set of layers included in the personality LLM 120 may be configured to generate prosody information (e.g., the personality prosody data 810) corresponding to one or more voice characteristics associated with the response.

Additionally, or alternatively, in some further such embodiments, the personality LLM 120 may correspond to more than one ML model. For example, in embodiments where the personality LLM 120 is configured to additionally, or alternatively, generate audio data, the personality LLM 120 may include an audio generation model (e.g., a Generative Pre-trained Transformer (GPT), such as GPT-4, a latent diffusion model, a Bidirectional Encoder Representations from Transformers (BERT) model, such as an audio BERT, Alexa generative model(s), etc.) For further example, in embodiments where the personality LLM 120 is configured to additionally, or alternatively, generate image data, the personality LLM 120 may include an image generation model (e.g., a generative adversarial network (GAN), a stable diffusion model, a Generative Pre-trained Transformer (GPT), such as GPT-4, a BERT model, such as an image BERT and/or a pixel BERT, Alexa generative model (s), etc.). In some such examples, the additional generation model(s) may process the user input (e.g., the user input data 105), the contextualized personality data (e.g., the contextualized personality data 145), the response data 155, and/or the personality response data 135 to additionally generate the multi-modal data (e.g., audio, image, etc.) responsive to the user input and corresponding to the personality determined to be relevant to the user input.

In some embodiments, the personality determined to be relevant to the user input may corresponds to a custom personality. For example, the personality may be associated with a specific user, device, organization, and/or custom digital assistant. In some such embodiments, the custom personality may be generated based on various example information provided to the system 100 by a user (e.g., text, audio, and/or image examples). For example, a user may provide the system 100 with an example natural language input representing a non-personality response and an example natural language input representing a response corresponding to the customized personality. For further example, the user may provide the system 100 with example personality characteristics descriptive of the customized personality. As another example, the user may provide the system 100 with example audio representative of the customized personality (e.g., speech spoken according to the personality).

In some embodiments, the personality LLM 120 may be associated with a particular locale (e.g., a particular country, culture, language, etc.). For example, the personality LLM 120 may be trained using a training data set that include training data associated with a particular language, particular culture, etc. In some such embodiments, the LLM orchestrator component 130 may include multiple personality LLM's and may determine which personality LLM is to process with respect to the user input to generate the personality response based on an indication of the locale associated with the user input, the user, and/or the device which received the user input.

Figure 2:
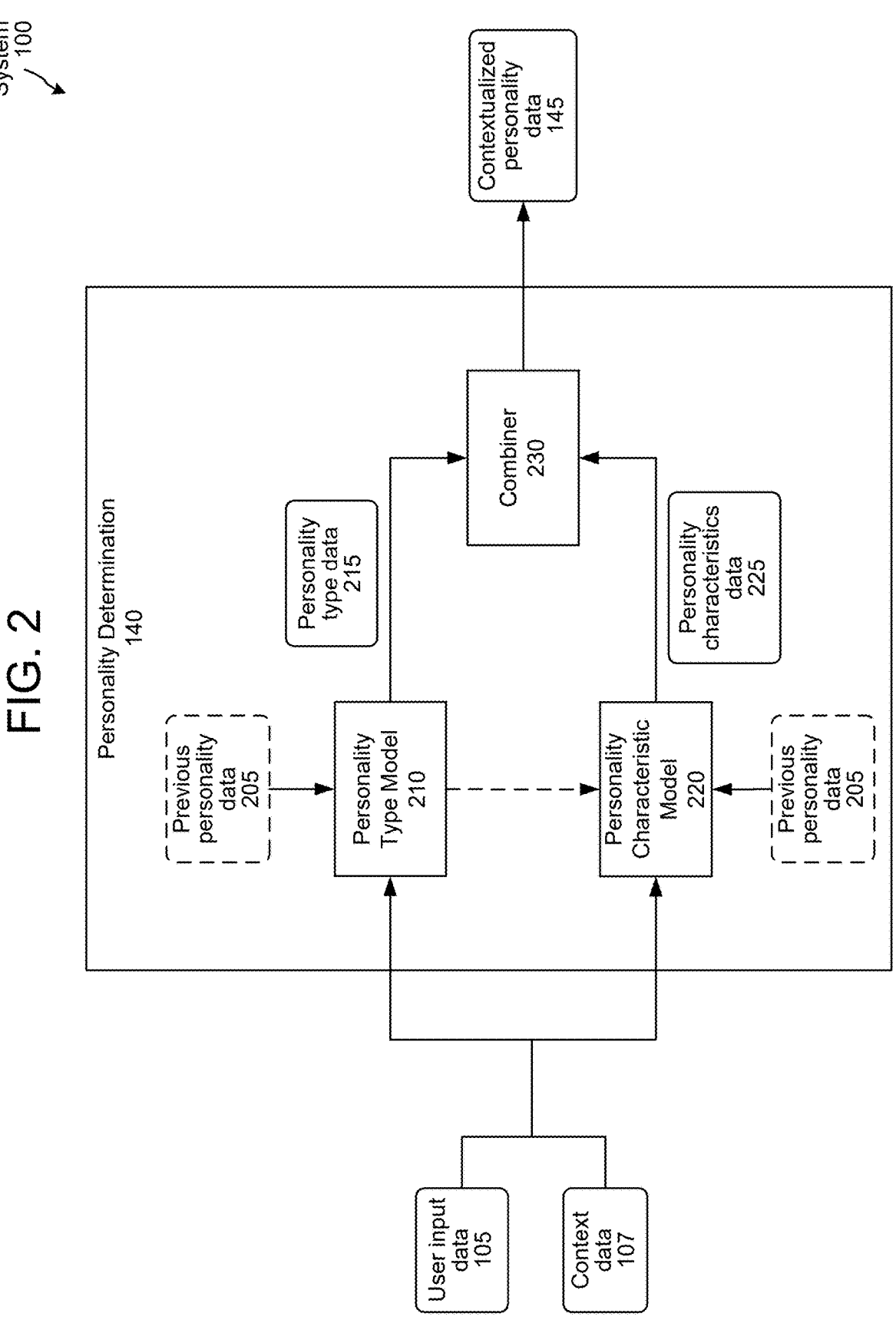
FIG. 2 is a conceptual diagram illustrating example components and processing of a personality determination component to determine a personality relevant to a user input, according to embodiments of the present disclosure.

FIG. 2 illustrates examples components and processing of the personality determination component 140 to determine a personality relevant to a user input. As shown in FIG. 2, the personality determination component 140 may include a personality type model 210, a personality characteristic model 220, and a combiner component 230. As discussed herein above, the personality determination component 140 is configured to determine a personality (e.g., a personality type and/or one or more personality characteristics) that is relevant to a user input.

As illustrated in FIG. 2, the personality determination component 140 may receive the user input data 105 and the context data 107 at the personality type model 210 and the personality characteristic model 220. The personality type model 210 is configured to determine a personality type associated with the user input data 105. For example, for the user input data 105 of "How is today's weather looking," the personality type model 210 may generate personality type data 215 indicating that a personality type of "Alexa" is associated with the user input data 105. As discussed above, a personality type may correspond to a personality with pre-defined characteristics. For example, a personality type of "Alexa" may correspond to the pre-defined characteristics of "intelligent," "professional," "considerate," etc. The personality type data 215 may be sent to the combiner component 230 (and, optionally, the personality characteristic model 220).

The personality type model 210 may be configured to determine the personality type based on the user input data 105 and/or the context data 107. In some embodiments, the personality type model 210 may determine the personality type based on the user's request (e.g., as indicated by the user input data 105). For example, if the user's request does not indicate a particular personality type to be used, this may indicate to the personality type model 210 that a default personality type should be used (e.g., "Alexa" personality type). For further example, if the user's request corresponds to a common/traditional user request (e.g., a request that can be performed by a default personality type and/or a request that need not be performed by a particular personality type), this may indicate to the personality type model 210 that a default personality type should be used. As another example, if the user's request corresponds to an uncommon request/a custom request not performable by a default personality type, and/or otherwise indicate a different/particular personality type, this may indicate to the personality type model 210 that a particular personality type should be used.

Additionally, or alternatively, in some embodiments, the personality type model 210 may determine the personality type based on various contextual information (e.g., as indicated by the context data 107). For example, the personality type model 210 may determine a personality type based on an indication of the device type of the device which captured the user's request (e.g., a personality type of "Astro" based on the device type of the device corresponding to an "Astro" device, a personality type of "Alexa" based on the device type of the device corresponding to "Echo" device, etc.). Similarly, the personality type model 210 may determine a personality type based on an indication of an a digital assistant associated with the device/selected/determined to interact with the user (e.g., a personality type of "[custom organization personality 1]" based on the an indication that a digital assistant of "[custom organization assistant 1]" is associated with the device and/or the digital assistant is determined/selected to interact with the user). For further example, the personality type model 210 may determine a personality type based on user profile information associated with the user interacting with the system 100 (e.g., the personality type model 210 may determine a child-safe personality type based on determining an indication that the user is a child, a user-specific personality type based on a user preference, an organization-specific personality type based on the user being associated with a particular organization, etc.).

As shown in FIG. 2, in some embodiments, the personality type model 210 may further take as input an indication of the personality(ies) associated with a previous user input(s) (e.g., previous personality data 205 including a personality type and/or personality characteristic(s)). In some embodiments, the previous personality data 205 may correspond to a previous user input of the same dialog as the user input data 105. The personality type model 210 may determine the personality type data 215 further using the previous personality data 205. For example, if the previous personality data 205 indicates that the previous user input was associated with a personality type of "[organization name] personality," then this may indicate that the user input data 105, which may be associated with the same dialog, may also be associated with the same personality type and/or the same personality characteristics.

In some embodiments, the personality type model 210 may implement an ML model (e.g., a classifier, a generative model, such as those discussed herein above, etc.). For example, the ML model may process the user input data 105 and/or the context data 107 and generate the personality type data 215 corresponding to the personality type associated with the user input. During training, the ML model may take as input a training data set of tuples including a user input and a corresponding personality type (and, optionally, contextual information associated with the user input), where the ML model may be tasked with determining the personality type based on the user input (and, optionally, the contextual information). Based on whether the ML model properly determines the personality type corresponding to the user input, the ML model may be configured accordingly (e.g., model weight values may be adjusted).

The personality characteristic model 220 is configured to determine one or more personality characteristics associated with the user input data 105. For example, for the user input data 105 of "How is today's weather looking," the personality characteristic model 220 may generate personality characteristics data 225 indicating that the personality characteristics of "upbeat," "playful," and "enthusiastic" are associated with the user input data 105. The personality characteristic model 220 may send the personality characteristics data 225 to the combiner component 230.

In some embodiments, the personality characteristics data 225 may be generated based on the user input data 105. For example, for a user input of "tell me a joke," the personality characteristic model 220 may generate personality characteristics of "humorous," "witty," "comedic," or the like. For further example, for a user input of "what is on my schedule for today," the personality characteristic model 220 may generate personality characteristics of "professional," "secretarial," "formal," or the like. As another example, for a user input of "how are you today," the personality characteristic model 220 may generate personality characteristics of "casual," "informal," "personal," or the like.

Additionally, or alternatively, in some embodiments, the personality characteristics data 225 may be generated based on various contextual information associated with the user input data 105. For example, the personality characteristic model 220 may generate personality characteristics of "sincere," "considerate," or the like, based on processing context data indicating the user's emotion is sad (e.g., emotion/sentiment data indicating the user's emotion, which may be determined by another component of the system 100 based on audio data and/or image data). For further example, the personality characteristic model 220 may generate personality characteristics based on context data corresponding to user profile information associated with the user interacting with the system 100 (e.g., the personality characteristic model 220 may generate: personality characteristics of "warm" "gentle," or the like, based on the context data indicating that the user is a child; personality characteristics of "casual" and "funny" based on the context data indicating that such personality characteristics are preferred by the current user, etc.).

In embodiments where the personality type data 215 is sent to the personality characteristic model 220, the personality characteristics data 225 may be generated further based on the personality type determined to be associated with the user input. For example, as discussed above, a personality type may be associated with various pre-defined characteristics. As such, the personality characteristic model 220 may further process the personality type data 215 to generate personality characteristics data 225, which may include the pre-defined characteristics and/or includes characteristics similar to the pre-defined characteristics. For example, for personality type data 215a corresponding to a personality type of "[personality type 1]," which may be associated with pre-defined characteristics of "intelligent" "professional", and "considerate," the personality characteristics data 225 may include "intelligent" "professional," and "considerate." In some embodiments, the personality characteristic model 220 may be configured to modify the pre-defined characteristics based on the user input data 105 and/or the context data 107. For example, for the personality type data 215a discussed above, the personality characteristic model 220 may generate personality characteristics data 225a that does not include the pre-defined characteristic of "professional" based on the user input data 105 and/or the context data 107 indicating that a personality associated with "casual" or "informal" is associated with the user input and/or that the characteristic of "professional" is not relevant to the user input.

As shown in FIG. 2, in some embodiments, the personality characteristic model 220 may further take as input an indication of the personality(ies) associated with a previous user input(s) (e.g., previous personality data 205 including a personality type and/or personality characteristic(s)). In some embodiments, the previous personality data 205 may correspond to a previous user input of the same dialog as the user input data 105. The personality characteristic model 220 may determine the personality characteristics data 225 further using the previous personality data 205. For example, if the previous personality data 205 indicates that the previous user input was associated with personality characteristics of "upbeat," "playful," and "enthusiastic then this may indicate that the user input data 105, which may be associated with the same dialog, may also be associated with the same personality characteristics or similar personality characteristics.

In some embodiments, the personality characteristic model 220 may implement an ML model (e.g., a classifier, a generative model, such as those discussed herein above, etc.). For example, the ML model may process the user input data 105 and/or the context data 107 and generate the personality type data 215 corresponding to the personality type associated with the user input. During training, the ML model may take as input a training data set of tuples including a user input and a corresponding personality type (and, optionally, contextual information associated with the user input), where the ML model may be tasked with determining the personality type based on the user input (and, optionally, the contextual information). Based on whether the ML model properly determines the personality type corresponding to the user input, the ML model may be configured accordingly (e.g., model weight values may be adjusted).

In some embodiments, for example where the personality characteristic model 220 implements a generative model, the personality characteristics data 225 may correspond to a natural language description of the personality characteristics associated with the user input. For example, for the user input data 105: "I'm late for work, what is on my schedule for today," the personality characteristic model 220 may generate personality characteristics data 225 "you should be straightforward, considerate, and concise."

The combiner component 230 is configured to process the personality type data 215 and the personality characteristics data 225 to generate the contextualized personality data 145 representing the personality determined to be relevant to the user input data 105. For example, if personality type data 215a correspond to a personality type of "Alexa," which is associated with pre-defined characteristics of "intelligent" "professional", and "considerate," and personality characteristics data 225a corresponds to the additional characteristics of "straightforward" and "concise" (representing the additional characteristics determined based on the user input, the context data, and/or the previous personality data), then the contextualized personality data may correspond to "Personality type: 'Alexa'; Characteristics: of 'intelligent,' 'professional,'considerate,' 'straightforward' 'concise'," or the like. The contextualized personality data 145 may be sent to the LLM orchestrator component 130.

In some embodiments, the personality determination component 140 may be configured to determine personality characteristics associated with the user input data 105, without needing to determine a personality type associated with the user input data 105. In such embodiments, the personality determination component 140 may include the personality characteristic model 220 and the contextualized personality data 145 may correspond to the personality characteristics data 225.

Figure 3:
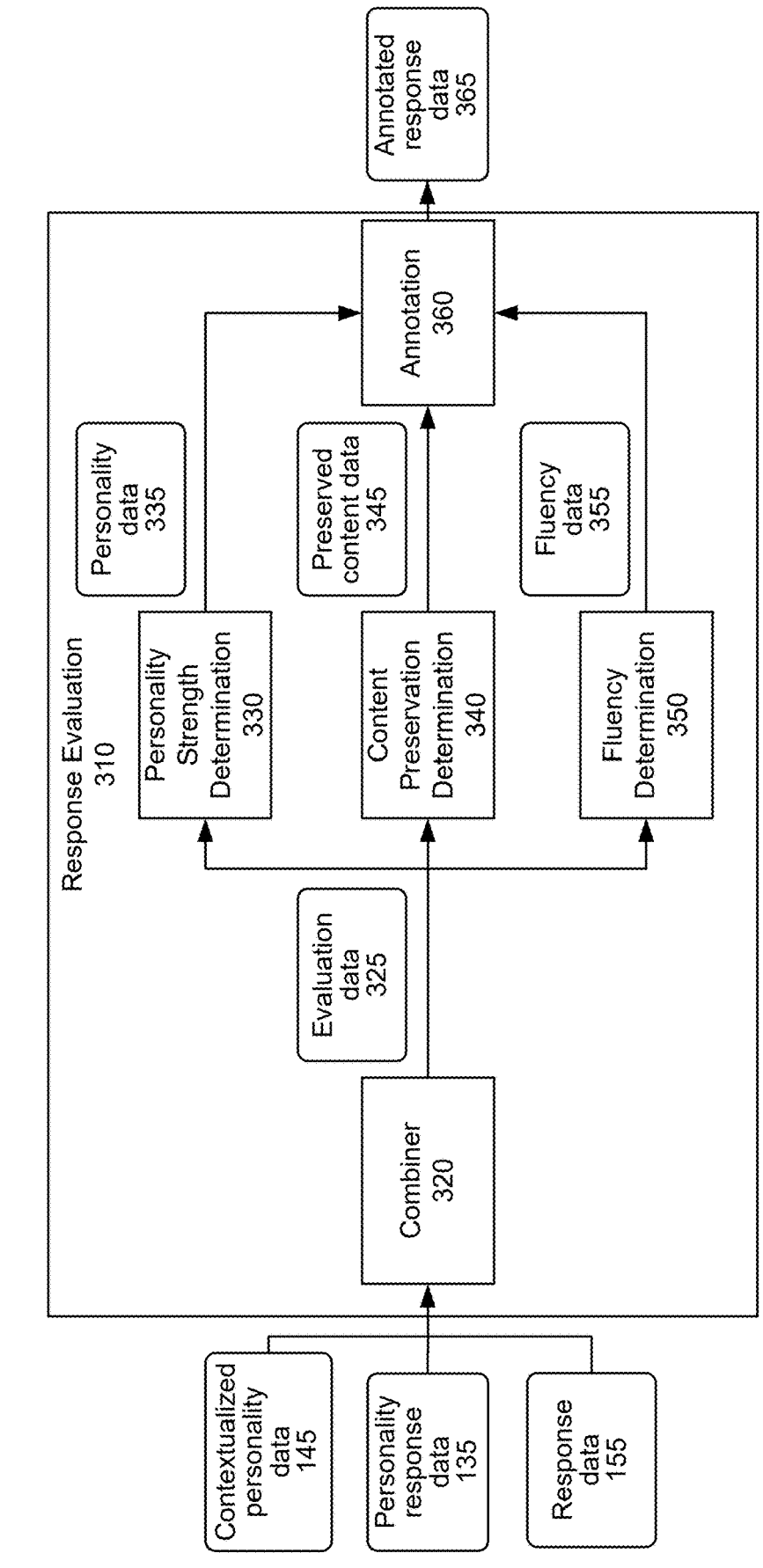
FIG. 3 is a conceptual diagram illustrating example components and processing of a response evaluation component, according to embodiments of the present disclosure.

FIG. 3 illustrates examples components and processing of a response evaluation component 310 configured to determine annotated response data. As shown in FIG. 3, the response evaluation component 310 may include a combiner component 320, a personality strength determination component 330, a content preservation determination component 340, a fluency determination component 350, and an annotation component 360. The response evaluation component 310 is configured to evaluate a response generated by the LLM orchestrator component 130 for aspects determined to likely result in a satisfactory user experience. For example, the response evaluation component 310 may evaluate the response based on a personality strength, which may correspond to how prevalent the personality is in the response generated by the LLM orchestrator component 130. The personality strength may be represented by a value corresponding to a likelihood that the response corresponds to the personality. For further example, the response evaluation component 310 may evaluate the response for preservation of content/information used to generate the response (e.g., determine how much of the content/information used to generate the response (e.g., the response data 155) was preserved (e.g., included) in the personality response data 135). As another example, the response evaluation component 310 may evaluate the response based on a fluency of the response (e.g., how complex and/or fluent the natural language generated by the LLM orchestrator component 130 is).

As illustrated in FIG. 3, the personality response data 135, the contextualized personality data 145, and the response data 155 may be received at the combiner component 320. The combiner component 320 is configured to generate evaluation data 325 corresponding to information usable to evaluate the response generated by the LLM orchestrator component 130 (e.g., the personality determined to be relevant to the user input (e.g., the contextualized personality data 145), the personality response generated by the LLM orchestrator component 130 (e.g., the personality response data 135), and the responsive information used by the LLM orchestrator component 130 to generate the personality response (e.g., response data 155)).

In some embodiments, the personality response data 135, the contextualized personality data 145, and the response data 155 may be received from the LLM orchestrator component 130. For example, after generating the personality response data 135, the LLM orchestrator component 130 may send the personality response data 135, the contextualized personality data 145, and the response data 155 to the response evaluation component 310 for evaluation. In other embodiments, the personality response data 135, the contextualized personality data 145, and the response data 155 may be received from a storage, which may be included in the response evaluation component 310 or external to the response evaluation component 310. For example, after generating the personality response data 135, the LLM orchestrator component 130 may send the personality response data 135, the contextualized personality data 145, and the response data 155 to the storage. Thereafter, the response evaluation component 310/the combiner component 320 may query for the information (e.g., the personality response data 135, the contextualized personality data 145, and the response data 155) associated with the response generated by the LLM orchestrator component 130.

The evaluation data 325 may be sent to the personality strength determination component 330, the content preservation determination component 340, and the fluency determination component 350. The personality strength determination component 330 is configured to evaluate whether the response generated by the LLM orchestrator component 130 (e.g., the personality response data 135) clearly reflects the personality (e.g., the contextualized personality data 145) determined to be relevant to the user input (e.g., the user input data 105). For example, for the personality response data 135: "Today is shaping up to be a great day for fun in the sun with an expected high of 85 and a low of 80," the personality strength determination component 330 may determine whether the personality response data 135 clearly reflects the personality corresponding to the contextualized personality data 145 (e.g., the personality of "Alexa" with the personality characteristics of "upbeat," "playful," and "enthusiastic"). The personality strength determination component 330 may generate personality data 335 representing the personality strength of the personality response data 135. In some embodiments, the personality data 335 may correspond to a score representing the personality strength of the personality response data 135. For example, the personality data 335 may include a value from 0 to 1 representing how prevalent the personality is in the personality response data 135 (e.g., a likelihood that the personality response data 135 corresponds to the personality). For further example, the personality data 335 may include a value of 1 or 0 representing whether the personality response data 135 is properly personality or not (or whether the strength of the personality meets or exceeds a threshold or not), respectively.

In some embodiments, the personality strength determination component 330 may implement an ML model (e.g., an encoder, a classifier, a generative model (e.g., a BERT model), etc.). For example, the ML model may process the evaluation data 325 and may generate the personality data 335 representing the personality strength of the evaluation data 325. During training, the ML model may take as input a training data set of tuples including a personality for which a response is to be generated according to, first natural language data corresponding to an example of a response generated according to the personality, and second natural language data corresponding to the response to be evaluated. The ML model may be tasked with determining whether the second natural language data corresponds to the personality.

The content preservation determination component 340 is configured to evaluate whether the response generated by the LLM orchestrator component 130 (e.g., the personality response data 135) properly preserves (e.g., incorporates) the responsive information (e.g., the response data 155) used to generate the response. For example, for the personality response data 135: "Today is shaping up to be a great day for fun in the sun with an expected high of 85 and a low of 80," the content preservation determination component 340 may determine whether the personality response data 135 properly preserved the responsive information corresponding to the response data 155 (e.g., that the forecast was sunny with a temperature high of 85 and a low of 80). The content preservation determination component 340 may generate preserved content data 345 representing whether the responsive information is properly preserved in the personality response data 135. In some embodiments, the preserved content data 345 may correspond to a score representing the amount of responsive information preserved (incorporated) in the personality response data 135. For example, the preserved content data 345 may include a value from 0 to 1 representing how much of the responsive information of the response data 155 is incorporated into the personality response data 135. For further example, the preserved content data 345 may include a value of 1 or 0 representing whether the personality response data 135 properly preserved the responsive information or not (or whether the amount of responsive information that was preserved meets or exceeds a threshold or not), respectively.

In some embodiments, the content preservation determination component 340 may implement an ML model (e.g., a classifier, a generative model (e.g., a BERT model), etc.). For example, the ML model may process the evaluation data 325 to generate the preserved content data 345 representing the amount of the responsive information (corresponding to the response data 155) is preserved in the personality response data 135. During training, the ML model may take as input a training data set of tuples including first natural language data that is not personality and second natural language data that is personality (and, optionally, a personality description corresponding to the personality associated with the second natural language data and a dialog history including one or more previous user input and system-generated responses). The ML model may be tasked with determining whether the second natural language data properly preserves (e.g., incorporates, is semantically similar to, etc.) the first natural language data.

The fluency determination component 350 is configured to evaluate the fluency (e.g., the lexical fluency/complexity) of the response generated by the LLM orchestrator component 130 (e.g., the personality response data 135). For example, for the personality response data 135: "Today is shaping up to be a great day for fun in the sun with an expected high of 85 and a low of 80," the fluency determination component 350 may determine the lexical fluency/complexity of the response (e.g., whether the response is lexically fluent, the number of words included in the response, the lexical diversity of the words included in the response, etc.). The fluency determination component 350 may take into consideration the personality for which the personality response data 135 was generated according to determine the fluency data 355. For example, in some embodiments, the personality response data 135 may be generated according to a personality that is purposefully not fluent (e.g., is not grammatically/lexically correct and/or efficient), such as if the personality represents the response is to be generated in short-hand or if the personality is that of a child. In some such embodiments, the fluency data 355 may represent the fluency of the response in light of the personality for which the response was to correspond to.

The fluency determination component 350 may generate fluency data 355 representing the fluency of the personality response data 135. In some embodiments, the fluency data 355 may correspond to a score representing the fluency of the personality response data 135. For example, the fluency data 355 may include a value from 0 to 1 representing the lexical fluency/complexity of the personality response data 135. For further example, the fluency data 355 may include a value of 1 or 0 representing whether the personality response data 135 is properly fluent/complex (or whether the fluency/complexity of the personality response data 135 meets or exceeds a threshold or not), respectively.

In some embodiments, the fluency determination component 350 may implement an ML model (e.g., a classifier, a generative model (e.g., a BERT model), etc.). For example, the ML model may process the evaluation data 325 to generate the fluency data 355 representing the fluency of the personality response data 135. During training, the ML model may take as input a training data set including natural language data corresponding to a model-generated response to a user input (and, optionally, a personality description corresponding to a personality for which the natural language data was generated according to and an example natural language input corresponding to the personality). The ML model may be tasked with determining a lexical fluency of the natural language data (based, optionally, on the personality description and the example natural language input).

The personality data 335, the preserved content data 345, and the fluency data 355 may be sent to the annotation component 360. The annotation component 360 is configured to generate annotated response data (e.g., annotated response data 365) corresponding to the response generated by the LLM orchestrator component 130 and the various evaluation data generated by the response evaluation component 310. For example, for the personality response data 135, the annotated response data 365 may correspond to the personality response data 135 annotated (e.g., labeled) with the contextualized personality data 145, the response data 155, the personality data 335, the preserved content data 345, and/or the fluency data 355. The annotated response data 365 may be sent to one or more downstream components/models to be used for training/retraining. For example, the annotated response data 365 may be sent to the LLM orchestrator component 130 to be used as training data for retraining of the personality LLM 120 (e.g., during offline processing).

In some embodiments, the personality strength determination component 330, the content preservation determination component 340, and/or the fluency determination component 350 may correspond to a single component configured to process as described herein above with respect to the personality strength determination component 330, the content preservation determination component 340, and/or the fluency determination component 350. For example, the component may process the evaluation data 325 and generate output data corresponding to the personality data 335, the preserved content data 345, and/or the fluency data 355. In some such embodiments, the component may implement an ML model (e.g., a generative model (e.g., a BERT model)). Such an ML model may be trained as discussed above with respect to the personality strength determination component 330, the content preservation determination component 340, and/or the fluency determination component 350.

Figure 4:
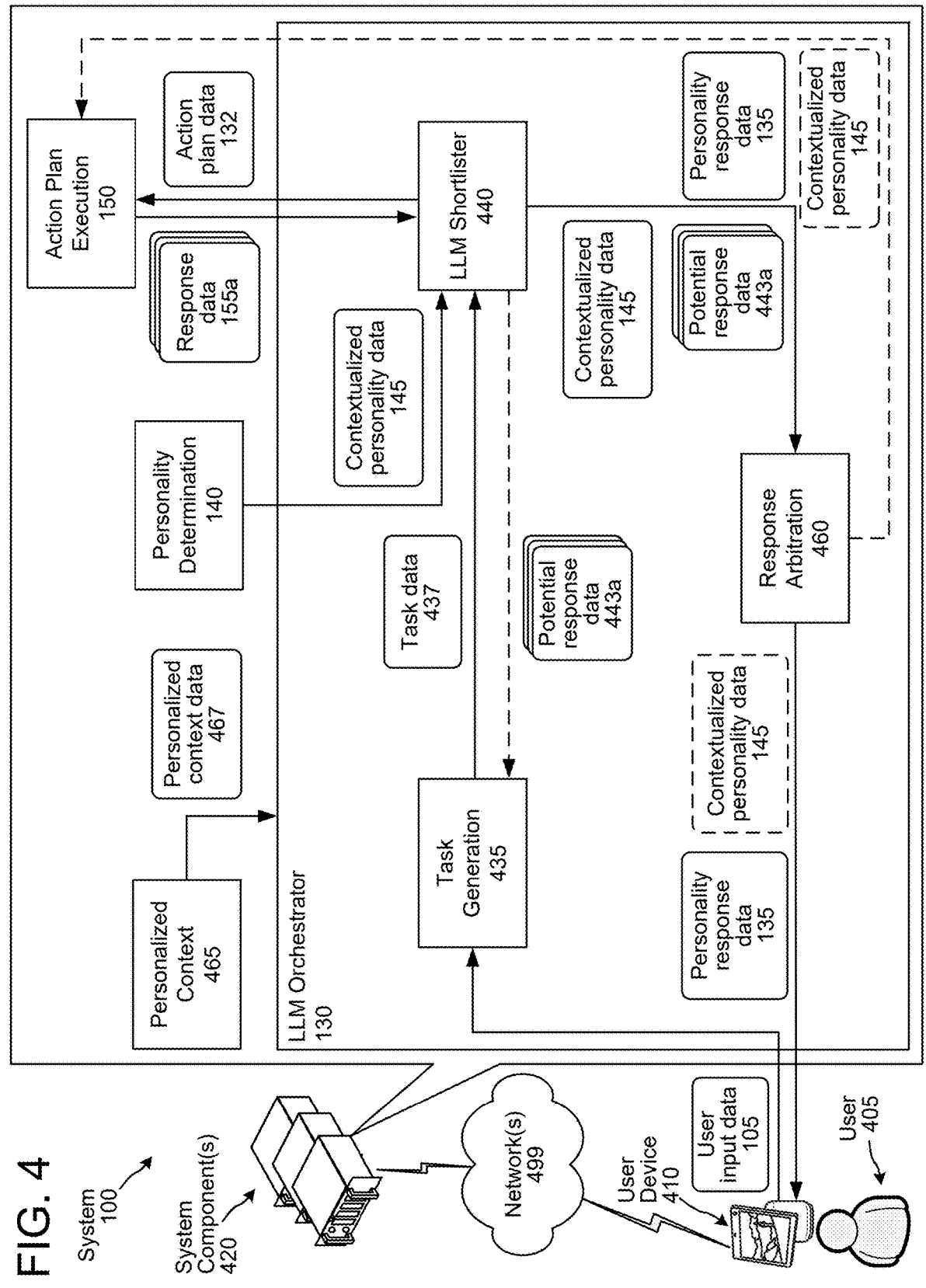
FIG. 4 is a conceptual diagram illustrating further example components and processing of the system configured to determine a response to a user input, according to embodiments of the present disclosure.

FIG. 4 illustrates further example components included in the system 100 configured to determine an action responsive to a user input. As shown in FIG. 4, the system may include a user device 410, local to a user 405, in communication with a system component(s) 420 via a network(s) 499. The network(s) 499 may include the Internet and/or any other wide- or local-area network, and may include wired, wireless, and/or cellular network hardware.

The system component(s) 420 may include various components, such as the LLM orchestrator component 130, a personalized context component 465, and the action plan execution component 150. The LLM orchestrator component 130 may include a task generation component 435, an LLM shortlister component 440, and a response arbitration component 460.

In some embodiments, the LLM orchestrator component 130 may generate prompt data representing a prompt for input to the language models. As shown in FIG. 4, the system component(s) 420 receive user input data 105, which may be provided to the LLM orchestrator component 130. As discussed above, in some instances, the user input data 105 may correspond to various data types, such as text (e.g., a text or tokenized representation of a user input), audio, image, video, etc. For example, the user input data may include input text (or tokenized) data when the user input is a typed natural language user input. For further example, prior to the LLM orchestrator component 130 receiving the user input data 105, another component (e.g., an automatic speech recognition (ASR) component 950) of the system 100 may receive audio data representing the user input. The ASR component 950 may perform ASR processing on the audio data to determine ASR data corresponding to the user input, which may correspond to a transcript of the user input. As described below, with respect to FIG. 9, the ASR component 950 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's 950 level of confidence that the corresponding hypothesis represents what the user said. The ASR component 950 may also determine token scores corresponding to each token/word of the ASR hypothesis, where the token score indicates the ASR component's 950 level of confidence that the respective token/word was spoken by the user. The token scores may be identified as an entity score when the corresponding token relates to an entity. In some instances, the user input data 105 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 100 may include one or more components configured to process such user inputs to generate the text or tokenized representation of the user input (e.g., the user input data 105).

In some embodiments, the LLM orchestrator component 130 may receive input data, which may be processed in a similar manner as the user input data 105 as described herein. The input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching the device 410, a user entering the home, etc.). In some embodiments, the system 100 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 100 may include one or more components configured to process the input data to generate a natural language representation of the input data. The system 100 may process the input data and may perform an action. For example, in response to detecting a garage door opening, the system 100 may cause garage lights to turn on, living room lights to turn on, etc. As another example, in response to detecting an oven beeping, the system 100 may cause a device 410 (e.g., a smartphone, a smart speaker, etc.) to present an alert to the user. The LLM orchestrator component 130 may process the input data to generate tasks that may cause the foregoing example actions to be performed.

The user input data 105 may be received at the task generation component 435 of the LLM orchestrator component 130, which may be configured to generate a list (e.g., one or more) of tasks (e.g., steps/actions) that are to be completed in order to perform an action responsive to the user input and select a task of the list of the tasks that is to be completed first (e.g., in a current iteration of processing by the system 100), as described in detail herein below with respect to FIG. 5. For example, for a user input of "How is today's weather looking," the task generation component 435 may generate a list of tasks of "(1) determine current outside temperature from thermostat; and (2) determine weather forecast for today" and select the task of "determine weather forecast for today" to be completed first. In instances where the task generation component 435 generates more than one task to be completed in order to perform the action responsive to the user input, the task generation component 435 may further maintain and prioritize the list of tasks as the processing of the system 100 with respect to the user input is performed. In other words, as the system 100 processes to complete the list of tasks, the task generation component 435 may (1) incorporate the potential responses associated with completed tasks into data provided to other components of the system 100; (2) update the list of tasks to indicate completed (or attempted, in-progress, etc.) tasks; (3) generate an updated prioritization of the tasks remaining to be completed (or tasks to be attempted again); and/or (4) determine an updated current task to be completed. The task generation component 435 may generate and send task data 437 representing the selected task to be completed and various other information needed to perform further processing with respect to the task (e.g., the user input data 105, an indication of the selected task, potential responses associated with previous tasks, the remaining task(s), and context data associated with the user input data 105, as described in detail herein below with respect to FIG. 5) to the LLM shortlister component 440.

The LLM shortlister component 440 may be configured to determine one or more components (e.g., responding component 650a-n, such as APIs, skill component(s) 954, LLM agent component(s), TTS component 980, etc. and the personality component 660a-n) configured to perform an action related to the user input or the current task. The LLM shortlister component 440 may further be configured to generate and cause the execution of a request(s) (e.g., an API call(s), an incomplete API call/API call format, an indication of an action to be performed by a component, etc.) for the one or more components to provide a potential responses(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task). For example, for a current task of "determine weather forecast for today," the LLM shortlister component 440 may generate requests of "use Weather Application A to determine weather forecast for today" and "use Weather Application B to determine weather forecast for today," or the like. Such requests may be represented in the action plan data 132 sent to the action plan execution component 150. In some embodiments, the LLM shortlister component 440 may include in the request(s) an indication of a personality determined to be relevant to the user input, as discussed herein above with respect to the personality LLM 120. For example, for a current task of "generate a poem," the LLM shortlister component 440 may generate a request of "use Personality Application 1 to generate a poem," or the like, and may include in the request an indication that the poem is to be generated to correspond to "Personality 1," which has been determined to be relevant to the user input (and may indicate a personality type and/or personality characteristic(s)). The action plan execution component 150 may identify the request(s) in the action plan data 132, generate executable API calls corresponding to the request(s), and cause the corresponding components (e.g., the responding component 650a-n, such as the API provider component, the LLM agent component, the skill component 954, the TTS component 980, etc. and the personality component 660a-n) to generate response data 155a-n representing the requested potential response(s), where individual response data 155a may be provided by/correspond to a particular responding component 650a—one of the API provider component, the LLM agent component, the skill component 954, and/or the TTS component 980 and/or a particular personality component 660a. In some embodiments, the response data 155a-n may include an identifier (e.g., a component name, an alphanumerical value associated with the component, etc.) for the component providing the data. The LLM shortlister component 440 receives and processes the response data 155a-n and generates potential response data 443*a-n* representing the potential response(s) (e.g., relevant potential responses, selected potential responses, ranked potential responses, etc.) for further processing (e.g., as described in detail herein below with respect to FIG. 6). If the LLM shortlister component 440 determines that there are no remaining tasks to generate potential responses for, the LLM shortlister component 440 may send the potential response data 443*a-n* to the response arbitration component 460.

The potential response data 443*a-n*, in some embodiments, may be determined based on receiving potential responses from various different components that may be relevant in responding to the user input data 105. For example, the potential response data 443*a-n* may include a first potential response from a first component configured to perform a first task determined by the task generation component 435 (e.g., the responding component 650*a-n* or the personality component 660*a-n*), a second potential response from a second component configured to perform a second task determined by the task generation component 435 (e.g., the responding component 650*a-n* or the personality component 660*a-n*), etc. The potential response data 443*a-n* can include more than one potential response relating to an individual task. In some embodiments, the potential response data 443*a-n* may be natural language data.

The response arbitration component 460 processes the potential response data 443*a-n* to determine whether the potential responses generated for the one or more tasks are responsive to the user input. The response arbitration component 460 processes the potential response data 443*a-n* (representing at least the generated potential responses) and selects one or more of the potential responses that are determined to be responsive to the user input and/or determines that none of the actions are responsive to the user input. For example, the response arbitration component 460 may process the potential response data 443*a-n* to determine if one or more of the potential responses performable by the API(s) (e.g., the potential responses and/or potential actions) are responsive to the current task. In some embodiments, the response arbitration component 460 may generate a natural language summary of one or more of the selected responses and output the natural language summary. For example, for a user input of "what is the weather for today" and potential responses of "The weather for today is a high of 75 and a low of 68" and "The weather for today is mostly sunny with a slight chance of rain in the evening," the response arbitration component 460 may generate a natural language summary of "The weather for today is expected to be mostly sunny with a high of 75 and a low of 68 and a slight chance of rain in the evening," or the like. In some embodiments, where the LLM orchestrator component 130 determines a personality that is relevant to the user input, the response arbitration component 460 may further generate the natural language summary to correspond to the personality.

Figure 5:
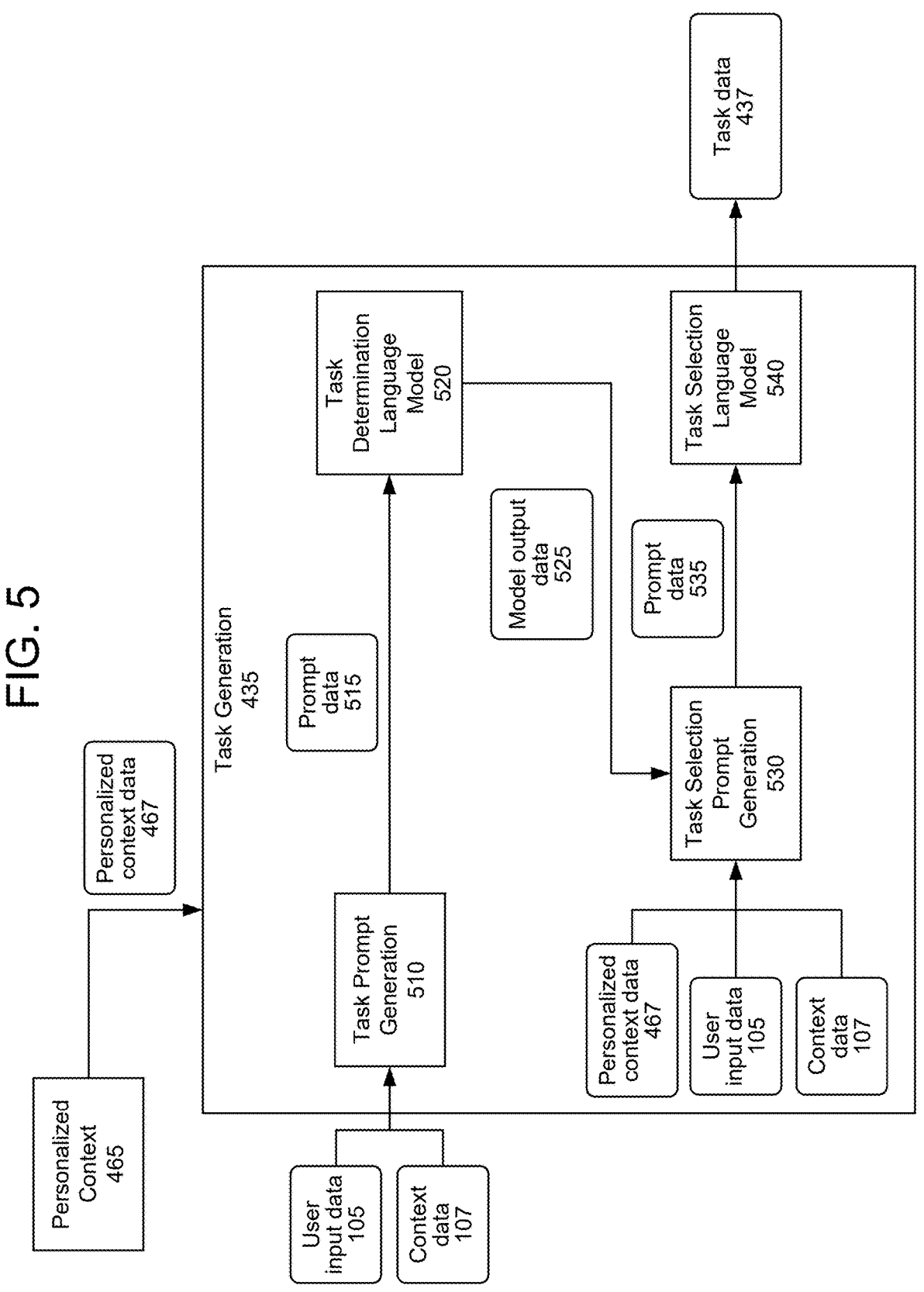
FIG. 5 is a conceptual diagram illustrating example components and processing of a plan generation component, according to embodiments of the present disclosure.

FIG. 5 illustrates example processing of the task generation component 435. As shown in FIG. 5, the task generation component 435 may include a task prompt generation component 510, a task determination language model 520, a task selection prompt generation component 530, and a task selection language model 540.

As further shown in FIG. 5, the user input data 105 is received at the task prompt generation component 510, which is configured to generate a list (e.g., one or more) of tasks (e.g., steps/actions) that are to be completed in order to perform an action responsive to the user input and select a task of the list of the tasks that is to be completed first (e.g., in a current iteration of processing by the system 100).

The task prompt generation component 510 processes the user input data 105 to generate prompt data 515 representing a prompt for input to the task determination language model 520. In some embodiments, the task prompt generation component 510 may further receive an indication of one or more remaining tasks to be completed with respect to the user input data 105. A task to be completed may correspond to a task for which the system 100 has yet to generate potential responses for (e.g., for which the personality component 660*a-n* or the responding component 650*a-n*, such as the API provider component, the LLM agent component, the skill component 4P4, the TTS component 980 have yet to generate response data for). Similarly, a completed task may correspond to a task for which the system 100 has generated potential responses for (e.g., for which the personality component 60*a-n* or the responding component 650*a-n*, such as the API provider component, the LLM agent component, the skill component 954, and/or the TTS component 980 have generated response data). For example, if the current iteration of processing with respect to the user input data 105 is a subsequent iteration of processing (e.g., the system previously determined that more than one task is to be completed in order to perform an action responsive to the user input data 105 and has previously generated potential responses for at least a first task of the more than one tasks), then the task prompt generation component 510 may further receive an indication of the remaining tasks to be completed. In such embodiments, the task prompt generation component 510 may further receive an indication of the task(s) to complete processing for. The potential response(s) of the processing, and/or an indication of a personality determined to be relevant during the previous iteration of processing. The task prompt generation component 510 may further receive the context data 107 representing various contextual signals associated with the user input data 105, such as weather information, time of day, device information associated with the device that sent the user input data 105 (e.g., device ID, device states, historical device interaction data, etc.). Such prompt data 515 may be generated based on combining the user input data 105 and the context data 107 (and, in some embodiments, the indication of the remaining task(s), completed task(s), a personality determined to be relevant, and/or the potential responses). In some embodiments, the prompt data 515 may be generated further based on the personalized context data 467.

The task prompt generation component 510 may receive the personalized context data 467 from the personalized context component 465. As discussed herein above, the personalized context component 465 may be configured to determine and return contextual information associated with a user input to the one or more components of the system 100, such as the task prompt generation component 510, which the task prompt generation component 510 may combine with the user input data 105 to generate the prompt data 515.

As discussed herein above, the personalized context component 465 may be caused to generate and return the personalized context data 467 based on the system 100 determining that additional information is needed in order to generate potential responses for a task associated with a user input. For example, one or more of the components of the system 100 (e.g., the task determination language model 520, the task selection language model 540, the shortlister language model 640, and/or the response arbitration component 460) may determine that an ambiguity exists in the user input (or the data determined/generated as a result of processing with respect to the user input). In such examples, the personalized context component 465 may receive the user input (e.g., the user input data 105), other data associated with the current task (e.g., one or more portions of the task data 437), and/or model output data indicating that an ambiguity exists/additional information should be determined (e.g., model output data representing "Does the user prefer to use [Music Streaming Service 1] or [Music Streaming Service 2] for playing music," "I need to determine whether the user prefers [Music Streaming Service 1] or [Music Streaming Service 2] for playing music" or the like). The personalized context component 465 may process as described herein above to generate the personalized context data 467 (e.g., "The user prefers [Music Streaming Service 1].")

In some embodiments, task prompt generation component 510 (or another component of the system 100) may process the personalized context data 467, the user input data 105, and/or the potential responses associated with the user input data 105 to generate a natural language representation of the user input (represented by the user input data 105) that is updated to include the contextual information of the personalized context data 467 (e.g., a contextual rewrite of the user input). Thereafter, the task prompt generation component 510 may process to generate the prompt data 515 using the updated user input data.

In some embodiments, the prompt data 515 may be a directive for the task determination language model 520 to determine one or more tasks (e.g., steps/actions) that are to be completed in order to perform an action responsive to the user input given the other information (e.g., the context data 107, the personalized context data 467, the indication of the remaining task(s), the indication of the completed task(s), the indication of the personality determined to be relevant to the user input, and/or the corresponding potential responses) included in the prompt data 515.

In some embodiments, the task prompt generation component 510 may also include in the prompt data 515 a sample processing format to be used by the task determination language model 520 when processing the prompt. In some embodiments, the task prompt generation component 510 may generate the prompt data 515 according to a template format. For example, the prompt data 515 may adhere to a template format of:

```
{
Create a new task if necessary to help complete a request to [user
input data 105 (or a representation of a determined intent of the
user input data 105].
Here are the completed tasks, the potential responses, user inputs,
and context so far:
[completed tasks, relevant personality, potential responses, dialog
history, context data 107, personalized context data 467,
contextualized personality data 145]
These are the remaining tasks to be completed:
[remaining tasks]
Based on the result, create new tasks to be completed, if necessary.
Return the tasks as an array.
}
```

In some embodiments, the template format may instruct the task determination language model 520 as to how it should process to generate the one or more tasks (e.g., steps) that are to be completed. In some embodiments, the format may further include an indication, such as a label of "User:" indicating that the following string of characters/tokens are the user input. In some embodiments, the format may further include a label of "Thought:" instructing the task determination language model 520 to generate an output representing the determined interpretation of the user input by the task determination language model 520 and/or an action that should be taken (e.g., the user is requesting [intent of the user input], the user is trying to [intent of the user input], need to determine [information needed to properly process the user input], etc.). In some embodiments, the format may further include an indication of "Observation:" indicating the following string of characters/tokens as the result of performance of an action determined by the task determination language model 520/the task determination language model 520's interpretation of the result of the performance of the action determined by the task determination language model 520 (e.g., the completed tasks and/or their potential responses). In some embodiments, the format may further include an indication of "Response:" instructing the task determination language model 520 to generate a response (e.g., one or more tasks to be completed) to the prompt.

Following such a template format, for example, and for a user input of "who won the basketball game last night between [team 1 name] and [team 2 name]," the task prompt generation component 510 may generate example prompt data 515a:

```
{
Create a new task if necessary to help respond to who won the
basketball game last night between [team 1 name] and [team 2
name].
Here are the completed tasks, their potential responses, user inputs,
and context so far:
[ ]
These are the remaining tasks to be completed:
[ ]
Based on the result, create new tasks to be completed, if necessary.
Return the tasks as an array.
}
```

As an example of a user input that is associated with more than one task, the system 100 may receive a user input of "please order your favorite ice cream for dessert" and may determine a task list of "identify my favorite ice cream" and "find application that enables ordering of ice cream." Thereafter, the system 100 may process as described herein below to select and complete the task of "identify my favorite ice cream." The task prompt generation component 510 may process the user input, corresponding context data, the remaining task list, and the potential responses (e.g., the favorite ice cream associated with a personality determined to be relevant to the user input, determined, for example, by a personality component 660a-n) to generate example prompt data 515a:

```
{
Create a new task if necessary to help complete a request to order
your favorite ice cream for dessert.
Here are the completed tasks, their potential responses, user inputs,
and context so far:
Personality:
    Personality type: Alexa
    Personality characteristics: Playful, Witty
Completed tasks:
    Identify my ice cream preference: [ice cream type]
These are the remaining tasks to be completed:
Find application to order ice cream
Based on the result, create new tasks to be completed, if necessary.
Return the tasks as an array.
}
```

In response to receiving such a user input, and prior to generating the example prompt data 515a, the system 100 may process as described herein above to determine the personality relevant to the user input. Based on the user input (and, potentially, context data associated with the user input), the personality determination component 140 may determine that a personality type of "Alexa" is relevant to the user input (e.g., based on the user interacting with an Echo device). Further, based on the user input and/or context data, the personality determination component 140 may determine personality characteristics relevant to the user input include "playful," and "witty." The personality determination component 140 may determine such personality characteristics based on, for example, context data indicating that the user is happy (e.g., sentiment/emotion data indicating the user is happy), the personality type corresponding to "Alexa," and/or the user input requesting the digital assistant's preference.

In some embodiments, the task prompt generation component 510 may also include in the prompt data a directive to output a response that satisfies certain conditions. Such conditions may relate to generating a response that is unbiased (toward protected classes, such as gender, race, age, etc.), non-harmful, profanity-free, etc. For example, the prompt data 515 may include "Please generate a polite, respectful, and safe response and one that does not violate protected class policy."

The task determination language model 520 processes the prompt data 515 to generate model output data 525 representing one or more predicted tasks to be completed in order to perform the action responsive to the user input. For example, based on processing the first example prompt data provided above, the task determination language model 520 may output model output data 525*a*: {"identify who won the basketball game last night between [team 1 name] and [team 2 name]," } or the like. For further example, as discussed above, based on processing prompt data corresponding to the user input "please order your favorite ice cream for dessert" the task determination language model 520 may output model output data 525*b*: {"identify my favorite ice cream;" "find application that enables ordering of ice cream," or the like. After the first task of "identify my favorite pizza" is complete, and based on processing the second example prompt data provided above, the task determination language model 520 may further output model output data 525*c*: {"find an application to order ice cream" "find API to order [ice cream type]," } or the like. In some embodiments, the threshold for determining the one or more tasks may be such that the task determination language model 520 is encouraged to generate multiple predicted tasks for a given user input, where the system 100 may parse and filter the list of tasks during downstream processing (e.g., during the processing of the task selection language model 540). For example, based on processing the first example prompt data provided above, the task determination language model 520 may output model output data 525*d*: {"identify who won the basketball game last night between [team 1 name] and [team 2 name]," "identify winner of the game between [team 1 name] and [team 2 name]," "identify results of game between [team 1 name] and [team 2 name]," "identify score for [team 1 name] and [team 2 name]," "identify [team 1 name] and [team 2 name] game results,"} or the like.

The model output data 525 is sent to the task selection prompt generation component 530, which processes the model output data 525 to generate prompt data 535 representing a prompt for input to the task selection language model 540. In some embodiments, such prompt data 535 may be generated based on combining the user input data 105, the context data 107, the personalized context data 467, the prompt data 515, and/or the model output data 525. In some embodiments, the task generation component 435 may include another component that parses the model output data 525 to determine the one or more tasks and may send a representation of the one or more tasks to the task selection prompt generation component 530.

In some embodiments, the prompt data 535 may be a directive for the task selection language model 540 to select a task of the one or more tasks that is to be completed first (e.g., completed during the current iteration of processing) given the information (e.g., user input data 105, the context data 107, the personalized context data 467, and the one or more tasks) included in the prompt data 535. In some embodiments, the prompt data 535 may further include a directive for the task selection language model 540 to determine a priority of the one or more tasks (e.g., an ordered list representing the order in which the one or more tasks are to be completed). As discussed above, with respect to the task prompt generation component 510, in some embodiments, the task selection prompt generation component 530 may also include in the prompt data 535 a sample processing format to be used by the task selection language model 540 when processing the prompt. Similarly, in some embodiments, the task selection prompt generation component 530 may generate the prompt data 535 according to a template format, such as:

```
{
Select the top prioritized task given the ultimate goal of [user input
data 105 (or a representation of a determined intent included in the
user input data 105]
Here are the completed tasks, their potential responses, and user
inputs so far:
[completed tasks, potential responses associated with the
completed tasks, dialog history, context data, personalized context
data 467, contextualized personality data 145]
Here are the task candidates:
[remaining tasks]
Return your selected task, return None if the goal is achieved or
indicate existing ambiguities.
}
```

In some embodiments, the template format may instruct the task selection language model 540 as to how it should process to select the task and/or prioritize the one or more tasks. In some embodiments, as discussed above, the format may further include indications of the "User:", "Thought:", "Action:", "Observation:", and/or "Response:" indicators.

Following such a template format, for example, and for the first example user input provided above of "who won the basketball game last night between [team 1 name] and [team 2 name]," the task selection prompt generation component 530 may generate example prompt data 535*a*:

```
{
Select the top prioritized task given the ultimate goal of
determining who won the basketball game last night between
[team 1 name] and [team 2 name]
Here are the completed tasks, their potential responses, user inputs,
and context so far:
[ ]
Here are the task candidates:
who won the basketball game last night between [team 1 name]
and [team 2 name]
Return your selected task, return None if the goal is achieved or
indicate existing ambiguities.
}
```

For further example, for the second example user input provided above of "please order some ice cream for dessert," the task selection prompt generation component 530 may generate example prompt data 535*b*:

```
{
Select the top prioritized task given the ultimate goal of please
order some ice cream for dessert
Here are the completed tasks, their potential responses, user inputs
and context so far:
Personality:
    Personality type: Alexa
    Personality characteristics: Playful, Witty
Completed tasks:
    Identify my ice cream preference: [ice cream type]
Here are the task candidates:
find an application that sells ice cream
find API that sells [ice cream type] ice cream
Return your selected task, return None if the goal is achieved or
indicate existing ambiguities.
}
```

In some embodiments, the task selection prompt generation component 530 may also include in the prompt data a directive to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The task selection language model 540 processes prompt data 535 to generate model output data representing the task to be completed first and/or a prioritization of the one or more tasks. For example, based on processing the first example prompt data provided above, the task selection language model 540 may output model output data: {"1. Identify who won the basketball game last night between [team 1 name] and [team 2 name]," } or the like. For further example, based on processing the second example prompt data provided above, the task selection language model 540 may output model output data: {"1. Find an API that sells [ice cream type] ice cream," } or the like. In some embodiments, during processing of the task selection language model 540 to select and/or prioritize the one or more tasks, the task selection language model 540 may update the task list to remove any redundant and/or conflicting tasks. For example, for the second example prompt data, the task selection language model 540 may determine that the remaining tasks of "find an application that sells ice cream" and "find an API that sells [ice cream type] ice cream" are redundant, and that "find an API that sells [ice cream type] ice cream has a higher priority. Therefore, the task selection language model 540 may remove the task of "find an application that sells ice cream" from the remaining task list. Thereafter, the task generation component 435 (or another component of the task generation component 435) may process the model output data of the task selection language model 540 to determine task data 437 representing the user input data 105, the personalized context data 467, and/or the task selected by the task selection language model 540 to be completed first. In some embodiments, the task data 437 may include the remaining one or more tasks and/or may indicate the prioritization of the one or more tasks, as determined by the task selection language model 540. The task data 437 may be sent to the LLM shortlister component 440, which is described in detail herein below with respect to FIG. 6.

Figure 6:
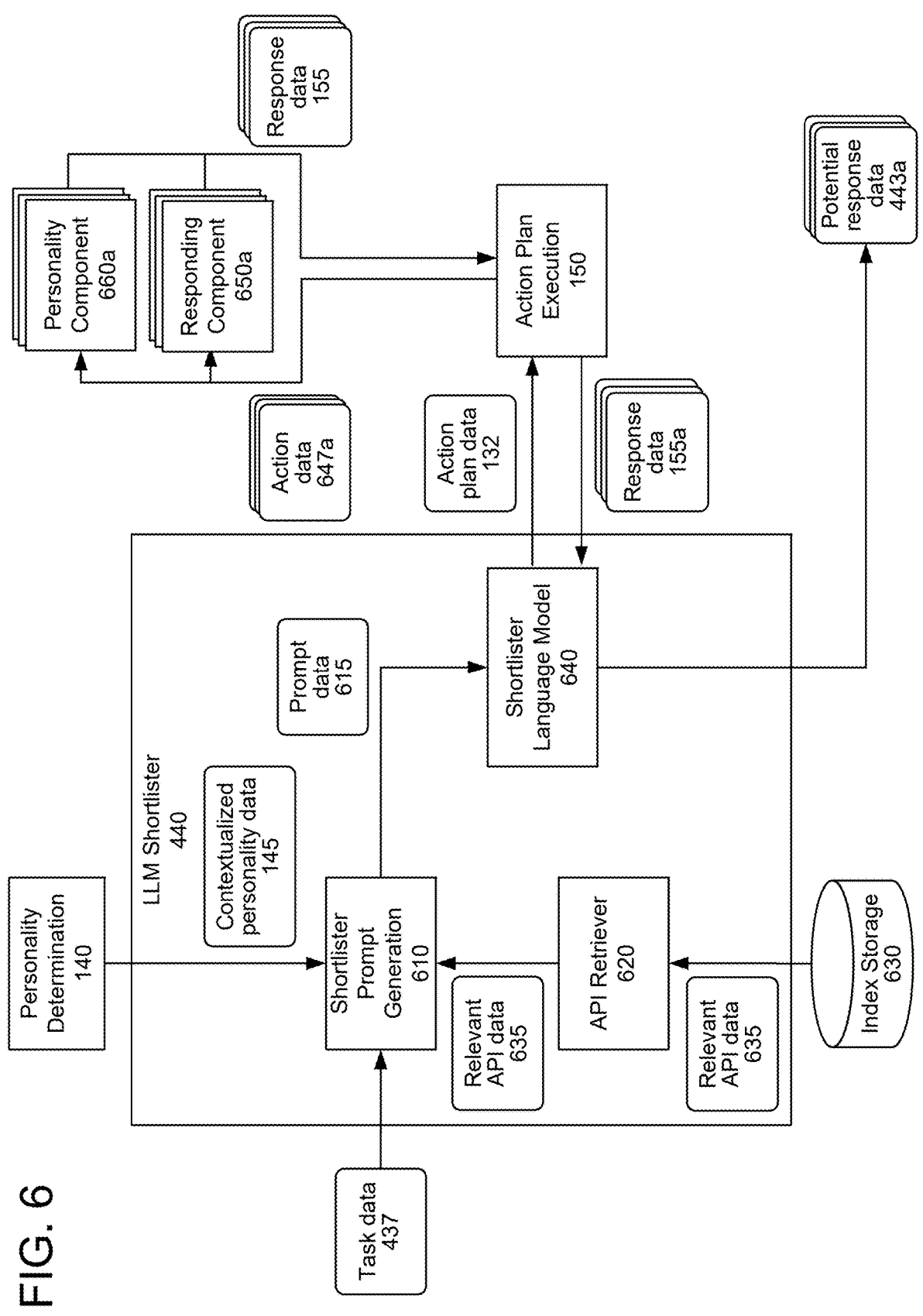
FIG. 6 is a conceptual diagram illustrating example components and processing of a large language model (LLM) shortlister component, according to embodiments of the present disclosure.

FIG. 6 illustrates example processing of the LLM short-lister component 440. As shown in FIG. 6, the LLM short-lister component 440 may include an index storage 630, an API retrieval component 620, a shortlister prompt generation component 610, and a shortlister language model 640. In some embodiments, in addition to the processing described herein below, the shortlister prompt generation component 610 may be configured to perform processing similar to the personality prompt generation component 110. Further, in some embodiments, in addition to the processing described herein below, the shortlister language model 640 may be configured to process similar to the personality LLM 120.

The LLM shortlister component 440 is configured to determine one or more components (e.g., personality component 660*a-n* or responding component 650*a-n*, such as APIs, skill component(s) 954, LLM agent component(s), TTS component 980, etc.) configured to perform an action related to the user input or the current task. The LLM shortlister component 440 is further configured to generate and cause the execution of a request(s) (e.g., an API call(s), an incomplete API call/API call format, an indication of an action to be performed by a component, etc.) for the one or more components to provide a potential responses(s) to the user input or current task (e.g., a response to a user-provided question, a paragraph from a website, etc.), which may further include a potential action (e.g., a description of a potential action, such as turning on a light, booking a flight ticket, ordering ice cream, etc.) the components are config-ured to/will perform with respect to the user input or the current task).

As further shown in FIG. 6, the task data 437 is received at the shortlister prompt generation component 610. The shortlister prompt generation component 610 processes the task data 437 to generate prompt data 615 representing a prompt for input to the shortlister language model 640.

In some embodiments, such prompt data 615 may be generated based on combining the task data 437 (e.g., the user input data 105, the context data 107, the selected task, remaining tasks, potential responses associated with one or more previous tasks, etc.) and the contextualized personality data 145. As discussed herein above with respect to the personality prompt generation component 110, the shortlis-ter prompt generation component 610 may receive the contextualized personality data 145 from the personality determination component 140 based on sending the user input data 105 and the context data 107 to the personality determination component 140, which may process as described herein above with respect to FIG. 1 to generate the contextualized personality data 145. Additionally, or alter-natively, in some embodiments, task prompt generation component 510 may be configured to interact with the personality determination component 140 to receive the contextualized personality data 145, as described herein above with respect to the personality prompt generation component 110 and the shortlister prompt generation com-ponent 610.

In embodiments where the LLM orchestrator component 130 previously determined the contextualized personality data 145 (e.g., in a previous iteration of processing with respect to the user input data 105), the contextualized personality data 145 may be included in the task data 437. In some such embodiments, the prompt data 615 may be generated using the contextualized personality data 145 included in the task data 437 without requesting the con-textualized personality data 145 from the personality deter-mination component 140. In other such embodiments, the shortlister prompt generation component 610 may be configured to cause the personality determination component 140 to generate contextualized personality data 145 for each task to be performed for the current user input. For example, if the user input corresponds to "tell me a joke and then read me the news," and the task generation component 435 determines a task list including a first task of "generate a joke" and a second task of "determine the news for today," then the shortlister prompt generation component 610 may cause the personality determination component 140 to generate contextualized personality data for the first and second tasks. In such embodiments, the shortlister prompt generation component 610 may further provide an indication of the current task to the personality determination component 140, which may process as described above with respect to FIG. 1 to generate a personality relevant to the current user input and the current task.

In some embodiments, such prompt data 615 may be further generated based on combining the task data 437 (e.g., the user input data 105, the context data 107, the selected task, remaining tasks, potential responses associated with one or more previous tasks, etc.), the contextualized personality data 145, and relevant API data 635 representing one or more APIs associated with the user input data 105 and/or the current task.

The relevant API data 635 may be generated by the API retrieval component 620, which may be configured to retrieve one or more (e.g., top-k) relevant APIs associated with the user input data 105 or the current task. In some embodiments, the APIs may correspond to various components. For example, the components may correspond to rule-based components, ML-based components, LLM-based components, or the like, such as the personalized context component 465, the orchestrator component 930, the personality component 660a-n, the responding component 650a-n, etc. In some embodiments, the APIs may correspond to the components.

The API retrieval component 620 may use retrieval-based approaches to retrieve the one or more relevant APIs from the index storage 630, which may store various information associated with multiple APIs (and/or components) such as component descriptions, API arguments (e.g., parameter inputs/outputs), identifiers for components (e.g., such as personalized context component 465, the responding component 650a-n, etc.) that provides the API, etc. For example, the API retrieval component 620 may compare one or more APIs (and/or components) included in the index storage 630 to the user input or the current task to determine one or more APIs (or components) (top-k) that corresponds to the user input or the current task (e.g., APIs (and/or components) that are semantically similar to the user input or the current task, APIs (and/or components) that are capable of performing the current task, etc.). In some embodiments, the API retrieval component 620 (or another component of the API retrieval component 620) may determine an encoded representation of the user input or the current task and compare (e.g., using cosine similarity) the encoded representation(s) to an encoded representation of a component description for the API (and/or component) to determine whether the API (and/or component) is semantically similar to the user input or the current task. A component description may correspond to a description of the one or more function that the API (and/or component) is configured to perform and/or other information associated with the API (and/or component) (e.g., an API call formatting structure (e.g., including input parameters), historical accuracy/defect rate, historical latency value, etc.). In some embodiments, the component description may further include one or more exemplars associated with use of the API (and/or component) (e.g., an example user input, corresponding API call, and example API output). If the value of semantic similarity meets or exceeds a threshold, the API (and/or component) (and, optionally, the component description) may be included in the relevant API data 635. In some embodiments, the API retrieval component 620 may determine the relevant API data 635 further using contextual information, including the personalized context data 467, an accuracy/defect rate value associated with the APIs (and/or components), and/or a historical latency value associated with the APIs (and/or components) (e.g., which may be included in the description of the API). In some embodiments, the index storage 630 may be included in the API retrieval component 620. Similar processing may be performed to determine one or more components that are semantically similar to the user input or the current task, which may be included in the relevant API data 635. The API retrieval may send the relevant API data 635 to the shortlister prompt generation component 610.

In some embodiments, the prompt data 615 may be a directive for the shortlister language model 640 to determine one or more APIs (and/or components) that are to process with respect to the user input or the current task (e.g., determine one or more API calls to cause the APIs (and/or components) to process) given the information (e.g., the user input data 105, the personalized context data 467, the current task, the contextualized personality data 145, and the relevant API data 635). As discussed above, with respect to the task prompt generation component 510 and the task selection prompt generation component 530, in some embodiments, the shortlister prompt generation component 610 may also include in the prompt data 615 a sample processing format to be used by the shortlister language model 640 when processing the prompt. Similarly, in some embodiments, the shortlister prompt generation component 610 may generate the prompt data 615 according to a template format, such as:

```
{
You are an AI agent to find and execute an API to complete the
task of [user input data 105 / current task]
Here are the completed tasks, their potential responses, user inputs
and context so far:
[completed tasks, potential responses associated with the
completed tasks, dialog history, context data, personalized context
data 467, contextualized personality data 145]
Here are a list of relevant API available:
[relevant API data 635]
Use the following format:
Thought: think about what to do
API: API calls compatible with the task
Observation: the result of the API call
Summary: summarized results from the API call
If no appropriate API is found, summarize as nothing is found.
}
```

Following such a template format, for example, and for the selected task of "identify who won the basketball game last night between [team 1 name] and [team 2 name]" and corresponding relevant API data, the shortlister prompt generation component 610 may generate example prompt data 615a:

```
{
You are an AI agent to find an execute an API to complete the task
of identify who won the basketball game last night between [team
```

-continued

```
1 name] and [team 2 name]
Here are the completed tasks, their potential responses, user inputs
and context so far:
Personality:
    Personality type: [custom personality type 1]
    Personality characteristics: Considerate, Knowledgeable,
Expressive
Here are a list of relevant API available:
Let's chat API
Classic NLU API
Smart Home skill
Use the following format:
Thought: think about what to do
API: API calls compatible with the task
Observation: the result of the API call
Summary: summarized results from the API call
If no appropriate API is found, summarize as nothing is found.
}
```

In response to receiving such a user input, and prior to generating the example prompt data 515a, the system 100 may process as described herein above to determine the personality relevant to the user input. Based on the user input (and, potentially, context data associated with the user input), the personality determination component 140 may determine that a personality type of "Alexa" or a [custom personality 1] (e.g., a custom "sports" personality type) is relevant to the user input (e.g., based on the user interacting with an Echo device or the user input being a sports-related question, respectively). Further, based on the user input and/or context data, the personality determination component 140 may determine personality characteristics relevant to the user input include "considerate," "knowledgeable," and "expressive." The personality determination component 140 may determine such personality characteristics based on, for example, context data indicating that the user is anxious (e.g., sentiment/emotion data indicating the user is anxious, which may be, for example, related to the results of the game), context data indicating that the user is a fan of [team 1 name], and/or the user input requesting the results of the game.

For further example, and for the selected task of "find application to order ice cream" and corresponding relevant API data, the shortlister prompt generation component 610 may generate example prompt data 615a:

```
{
You are an AI agent to find an execute an API to complete the task
of find application to order ice cream
Here are the completed tasks, their potential responses, user inputs
and context so far:
Personality:
    Personality type: Alexa
    Personality characteristics: Playful, Witty
Completed tasks:
    Identify my ice cream preference: [ice cream type]
Here are a list of relevant API available:
Let's chat API
[Food Ordering Application 1] API
[Food Ordering Application 2] API
Use the following format:
Thought: think about what to do
API: API calls compatible with the task
Observation: the result of the API call
Summary: summarized results from the API call
If no appropriate API is found, summarize as nothing is found.
}
```

In some embodiments, the shortlister prompt generation component 610 may also include in the prompt data a directive to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The shortlister language model 640 processes the prompt data 615 to generate one or more API calls corresponding to request(s) that the corresponding APIs (and/or components) return a potential response to the user input/current task and/or a potential action(s) that the APIs (and/or components) are configured to/will perform with respect to the user input and/or the current task (e.g., a natural language description of the potential action(s)). In some embodiments, the shortlister language model 640 may generate API calls for a subset of the APIs represented in the prompt data 615. For example, based on processing the first example prompt data provided above, the shortlister language model 640 may output model output data: {"Use Let's chat API to identify who won the basketball game last night between [team 1 name] and [team 2 name]" }, {"Lets_chat.query ("identify who won the basketball game last night between [team 1 name] and [team 2 name]"),} or the like. For further example, based on processing the second example prompt data provided above, the shortlister language model 640 may output model output data: {"Use [Food Ordering Application 1] to order ice cream, Use [Food Ordering Application 2] to order ice cream" }, {[Food Ordering Application 1].order("[ice cream type]"), [Food Ordering Application 2].order("[ice cream type]"),} or the like The shortlister language model 640 may generate the one or more APIs calls (including the required input parameters) by applying in-context learning for cold-starting API calls (e.g., one-shot/few-shot learning). For example, in embodiments where the relevant API data 635 includes the component descriptions, the shortlister language model 640 may use the one or more exemplars included in the component descriptions (included in the prompt data 615) to determine the one or more input parameters for the API call. In some embodiments, the shortlister language model 640 may be finetuned on such exemplars (e.g., during offline or runtime processing), such that the shortlister language model 640 is capable of determining the one or more input parameters for the given API call.

During processing of the shortlister language model 640 and after generating the one or more requests, the shortlister language model 640 may cause the one or more requests to be executed. For example, as shown in FIG. 6, the shortlister language model 640 may send action plan data 132 representing the one or more requests to the action plan execution component 150, which causes execution of the one or more requests included in the action plan data 132. For example, the action plan execution component 150 may process the action plan data 132 to generate action data 647a-n. Action data 647a may represent, for example, a directive (e.g., an executable API call determined from/generated based on the action plan data 132) for a particular API to process with respect to the user input and/or the current task. In embodiments where the action plan data 132 includes requests corresponding to incomplete API calls, API call formats, indications of actions to be performed by one or more components, the action plan execution component 150 may be configured to generate executable API calls corresponding to the action plan data 132. In some embodiments, the action plan execution component 150 may generate the action data 647a-n to represent a directive to provide the responses including the potential response(s)/potential action(s) with respect to the user input and/or the current task.

In some embodiments, the shortlister language model 640 may send model output data including the one or more requests to another component of the LLM orchestrator component 130, which may be configured to parse the model output data to identify the one or more requests. Thereafter, the component may generate the action plan data 132 representing the one or more requests and send the action plan data 132 to the action plan execution component 150.

The action plan execution component 150 may send the action data 647*a-n* to the personality component 660*a-n* and/or the responding component 650*a-n*, such as the API provider component, the LLM agent component, the skill component 954, and/or the TTS component 980. The API provider component may include one or more components (e.g., rule-based components, ML-based components, LLM-based components, or the like) that may be caused to process using the action data 647*a-n* (e.g., using the API calls generated by the LLM shortlister component 440).

The personality component 660*a-n* may be configured to process the action data 647*a-n* to generate responsive information corresponding to the personality determined to be relevant to the user input. The personality component 660*a-n* may take as input the current user input and/or the current task and the indication of the personality determined to be relevant to the current user input and/or the current task (e.g., the contextualized personality data 145) and may generate the response data 155 to correspond to the personality. In some embodiments, a particular personality component may be associated with a particular personality type (e.g., a particular character/personality). For example, a particular personality component 660*a* may be associated with a personality type of "commercial entity A" and may configured to generate responsive information that corresponds to the personality type (e.g., may be finetuned to generate responsive information corresponding to the personality type of "commercial entity A"). As such, in some such examples, the particular personality component 660*a* may be selected (e.g., by the personality LLM 120, the LLM shortlister component 440, etc.) to generate the responsive information based on the personality determined to be relevant to a current user input including the particular personality type of "commercial entity A."

In some embodiments, the personality component 660*a-n* may implement an ML model (e.g., a generative model, such as those discussed herein above). For example, for the abovementioned example user input of "please order your favorite ice cream for dessert," and a received request to generate a response associated with the task of "identify my ice cream preference," the personality component 660*a-n* may generate response data corresponding to "my favorite ice cream is mint chocolate chip" or "my favorite ice cream is mint micro-chip, I mean mint chocolate chip." The personality component 660*a-n* may determine the response based on the user input, the associated context data, and/or the personality determined to be relevant to the user input. For example, the personality component 660*a-n* may generate response data based on context data associated with the user input, such as response data of "my favorite ice cream is mint chocolate chip" based on context data indicating that the user is located in a particular city, and the personality component 660*a-n* determining that mint chocolate chip ice cream has been voted as a city-wide favorite. For further example, the personality component 660*a-n* may generate response data based on the current personality characteristics, such as response data of "my favorite ice cream is mint micro-chip, I mean mint chocolate chip" based on the current personality characteristics being "playful" and "witty." As another example, the personality component 660*a-n* may generate response data based on determining a pre-defined response/information corresponding to the personality (e.g., indicating that the personality is associated with a favorite ice cream of mint chocolate chip, the personality does not "like" dairy, etc.).

The TTS component 980 may be configured to process textual or tokenized input to generate audio data representing synthesized speech corresponding to the textual or tokenized input spoken by a synthetic voice. The processing of the TTS component 980 is discussed in detail below with respect to FIG. 8.

The skill component 954 may be software running on the system component(s) 420 that is akin to a software application. That is, a skill component 954 may enable the system component(s) 420 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 420 may be configured with more than one skill component 954. For example, a weather service skill component may enable the system component(s) 420 to provide weather information, a car service skill component may enable the system component(s) 420 to book a trip with respect to a taxi or ride sharing service, a restaurant skill component may enable the system component(s) 420 to order a pizza with respect to the restaurant's online ordering system, etc. A skill component 954 may operate in conjunction between the system component(s) 420 and other devices, such as the user device 410, in order to complete certain functions. A skill component 954 may include hardware, software, firmware, or the like that may be dedicated to a particular skill component 954 or shared among different skill components 954.

The LLM agent component may correspond to one or more LLM agents. An LLM agent component may correspond to a custom instantiation of an LLM (and other components) that is configured to handle user inputs relating to a particular domain/functionality. In some embodiments, the LLM agent component may be configured to handle specific use cases via particular prompt generation, finetuning of the LLM, etc. For example, the LLM agent component may be configured to handle user inputs/tasks related to information query, the LLM agent component may be configured handle user inputs/tasks related to shopping, the LLM agent component may be configured to handle user inputs/tasks related to ordering food from various restaurants, the LLM agent component may be configured to handle user inputs/tasks related to ordering food from a particular restaurant (e.g., a particular pizza restaurant), the LLM agent component e may be configured to handle user inputs/tasks related to booking a hotel, the LLM agent component may be configured to handle user inputs/tasks related to booking a flight, etc.

The API provider component may include various components that may be caused to execute using the action data 647*a-n*. For example, the API provider component may include an entity recognition (ER) component, which may be configured to process textual or tokenized input to link one or more entity references included in the textual or tokenized input to a specific corresponding entity known to the system 100. For example, based on the textual or tokenized input (e.g., a context of the textual or tokenized input), the ER component may determine that a reference to "Neil Armstrong" is directed to the American astronaut. In some embodiments, the action data 647*a-n* may include an indication(s) (e.g., slots) of one or more entities included in the user input, as determined by one or more of the language models 520, 540, 640, in which case the ER component may process to link the one or more entities to the specific, referenced, entity known to the system 100.

In other embodiments, the ER component may be configured to process the action data 647*a-n* to determine the one or more entities included in the user input and link the one or more determined entities to the specific, referenced, entity (entities) known to the system 100. For example, the ER component may include one or more recognizers. Each recognizer may include a named entity recognition (NER) component. The NER component applies grammar information and lexical information (received from a storage) associated with a domain (associated with the recognizer implementing the NER component) to determine a mention of one or more entities in text data. In this manner, the NER component identifies "slots" (each corresponding to one or more particular words in text data) that may be useful for later processing. The NER component may also label each slot with a type (e.g., noun, place, city, artist name, song name, etc.). Thereafter, the ER component links a slot of text data to a specific entity known to the system. To perform entity resolution, the ER component may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain domains (e.g., a shopping domain, a music domain, a video domain, etc.), or may be organized in a variety of other ways.

For further example, the API provider component may include a search component, which may be configured to query a storage (e.g., a database, repository, knowledge base, etc.) for information usable for generating a response to a user input. For example, if the action data 647*a-n* represents a request for information of "Who won the game between [Team 1 Name] and [Team 2 Name]," then the search component may query the storage (or other sources, such as the Internet), to retrieve the information "[Team 1 Name] won the game between [Team 1 Name] and [Team 2 Name]."

As an even further example, the API provider component may include the device controller component discussed herein above, which may be further configured to cause a device to perform an action corresponding to the action data 647*a-n*.

In some embodiments, the API provider component may include a domain service component, which may be configured for interacting with one or more services defined by particular users, such as developers, specialists, or the like (e.g., to receive information, such as responses or annotations, to cause an action.

One or more of the personality component 660*a-n* and/or the responding components 650*a-n* may send response data 155*a-n* representing one or more potential responses generated by the one or more APIs corresponding to the action data 647*a-n* (e.g., the potential response(s) and/or potential action(s)) to the action plan execution component 150. For example, in response to an API call to the skill component 954 associated with a user input for turning on a light, the response data 155*a* may correspond to a potential action of "turn on the light," "turn_on_device ("light", [device ID])", or the like. For further example, in response to an API call to the personality component 660*a-n* and/or the responding component 650*a-n* associated with a user input for determining who won the basketball game between [team 1 name] and [team 2 name], the response data 155*b* may correspond to "[team 1 name] won 110-60," or, as an example of personality response returned from the personality component 660*a-n*, "[team 1 name] crushed [team 2 name], winning with a whopping score of 110-60," or the like. As another example, in response to an API call to the personality component 660*a-n* and/or the responding component 650*a-n* associated with a user input for ordering the system's favorite ice cream, the response data 155*c* may correspond to a response of "order mint chocolate chip ice cream from [restaurant name]", "my favorite ice cream is mint chocolate chip", "my favorite ice cream is mint microchip. I mean mint chocolate chip" or the like. The action plan execution component 150 may send the response data 155*a-n* to the shortlister language model 640.

In some embodiments, the action plan execution component 150 may send the response data 155*a-n* to the shortlister prompt generation component 610, which may generate further prompt data including the response data 155*a-n* and be sent to the shortlister language model 640. For example, the further prompt data may be generated based on combining the prompt data 615 and the response data 155*a-n*.

In some embodiments, the shortlister language model 640 may process the response data 155*a-n* (or the further prompt data including response data 155*a-n*) to generate a natural language summary of the response data (e.g., the potential response data 443*a-n*). In some embodiments, the potential response data 443*a-n* may include an association between response data 155*a* (or a summarized representation of the response data 155*a*) and an indication of the API/component that generated the response data 155*a* (e.g., a component identifier, component description, etc.). In some embodiments, the shortlister language model 640 may be configured to filter and/or rank the response data 155*a-n* based on how relevant the response data 155*a-n* is to the current task. In some embodiments, the shortlister language model 640 may be configured to filter and/or rank the response data 155*a-n* based on a confidence level of the component that provided the action response data, where the confidence level may indicate a likelihood of the component being able to respond (e.g., within a period of time), the component being able to perform a potential action that corresponds to the current task, etc. In some embodiments, the response data 155*a-n* may indicate whether or not the corresponding component is able to respond (e.g., the response data 155*a-n* may include a Boolean value such as "yes" or "no" or other similar indications). In some embodiments, the shortlister language model 640 may filter and/or rank the response data 155*a-n* based on information included in the prompt data 615 (e.g., the user input data 105, the relevant API data 635, the context data 107 the personalized context data 467, the contextualized personality data 145, the prompt data 515, etc.). For example, the potential response data 443*a-n* may include a subset of the response data 155*a-n* (or the summarized representations of the response data 155*a-n*) and may further include a representation of a confidence associated with the response data 155*a-n* (or a summarized representation of the response data 155a-n). As such, the potential response data 443a-n may further include data representing a confidence of how relevant the response data 155a-n is to the current task. In some embodiments, the shortlister language model 640 may consider a rating associated with the component that provided the response data 155a-n, where the rating may be a user satisfaction rating provided by multiple different users of the system 100, a user satisfaction rating provided by the user 405 associated with the user input data 105, a system generated rating based on the number of past tasks handled by the component, a accuracy rating based on the number of past tasks the component had handled correctly/provided a desired response for, etc.

In some embodiments, similar to the above-provided description associated with the personality LLM 120, the potential response data 443a-n may correspond to the response data 155a-n, but generated according to the personality determined to be relevant to the user input data 105. For example, in response to the abovementioned response data 155b of "[team 1 name] won 110-60," the potential response data 443b generated by the shortlister language model 640 may correspond to "[team 1 name] crushed [team 2 name], winning with a whopping score of 110-60," or the like, based on the personality (e.g., the personality type of [custom personality 1] and/or the personality characteristics of "considerate," "knowledgeable," and "expressive."), the user input, and/or the corresponding context data. For further example, in response to the abovementioned response data 155c of "my favorite ice cream is mint chocolate chip," the potential response data 443c generated by the shortlister language model 640 may correspond to "my favorite ice cream is mint micro-chip. I mean mint chocolate chip," or the like, based on the personality (e.g., the personality type of "Alexa" and/or the personality characteristics of "playful" and "witty").

The LLM shortlister component 440 may send the potential response data 443a-n for further processing. In instances where the task generation component 435 determined that more than one task is to be completed, the LLM shortlister component 440 may send the potential response data 443a-n to the task generation component 435, which may process as described herein above to maintain and prioritize the task list based on the potential response data 443a-n and select a new task to be completed. In instances where the task generation component 435 determined that only one task is to be completed, or in instances where the LLM shortlister component 440 determines that there are no remaining tasks to be completed, the LLM shortlister may send the potential response data 443a-n, and the potential responses associated with previously completed tasks (e.g., previous action response data) to the response arbitration component 460 to process as discussed herein above. The LLM shortlister component 440 may further send the user input data 105, the context data 107, the personalized context data 467, etc., to the task generation component 435 and/or the response arbitration component 460.

In some embodiments, the LLM orchestrator component 130 may further include a memory storage (not illustrated) which may store various information associated with the processing performed (e.g., user input data 105, the prompt data 515, the context data 107, the personalized context data 467, the model output data 525, prompt data 535, the task data 437, the contextualized personality data 145, the relevant API data 635, the prompt data 615, the action plan data 132, the response data 155a-n, the potential response data 443a-n, etc.) during one or more previous iterations of processing by the LLM orchestrator component 130 for the user input data 105. As such, after the LLM shortlister component 440 generates the potential response data 443a-n, the LLM orchestrator component 130 may send the abovementioned data to the memory storage. In some embodiments, the above-mentioned data may be sent to the memory storage as it is generated by the system 100.

In such embodiments, one or more of the prompt generation components discussed herein may be configured to include (e.g., append) one or more portions of the data included in the memory storage in the data (e.g., the generated prompts) to the corresponding language models. For example, during a subsequent iteration of processing, the task prompt generation component 510 may receive one or more portions of the data included in the memory storage (which were generated during one or more previous iterations of processing performed with respect to the user input data 105) and include the one or more portions of data in the prompt data 515.

As discussed herein above, the shortlister language model 640 may be configured to determine whether additional information is needed in order to complete the current task (e.g., if an ambiguity exists in the user input data 105 or the current task, if the current task is to resolve an identified ambiguity, if an API argument is missing from the user input or other available data, etc.), in which case the shortlister language model 640 may send data representing a request for such additional information to the response arbitration component 460. In some embodiments, the action plan data 132 may represent the request for additional information, and the action plan execution component 150 may be configured to send corresponding response data 155a-n to the personalized context component 465. For example, in response to a user input of "please order pizza for dinner," the shortlister language model 640 may determine that in order to resolve an ambiguity with respect to the user input data 105 or current task (e.g., based on the current task being to resolve the ambiguity or a determination that the current task cannot be completed due to the ambiguity), the system 100 must "identify user pizza preference," or the like. The system 100 may send a request to the personalized context component 465 to "identify user pizza preference" and the personalized context component 465 may process as described herein above to return personalized context data resolving the ambiguity (e.g., the user's pizza preference may be determined to be a cheese pizza or a pepperoni pizza).

Figure 7:
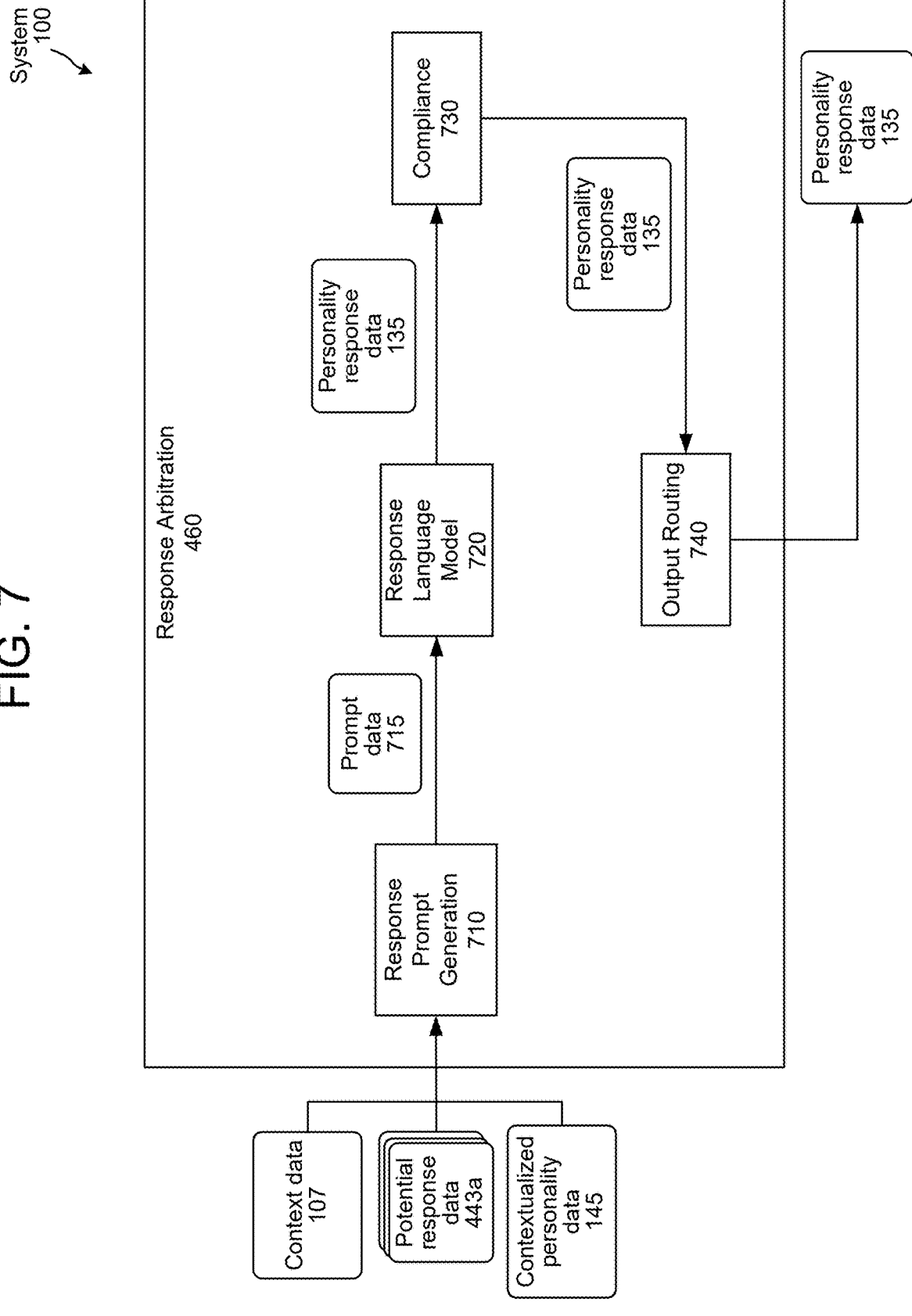
FIG. 7 is a conceptual diagram illustrating example components and processing of a response arbitration component, according to embodiments of the present disclosure.

FIG. 7 illustrates example components and processing of the response arbitration component 460. As shown in FIG. 7, the response arbitration component 460 may include a response prompt generation component 710, a response language model 720, a compliance component 730, and an output routing component 740. In some embodiments, in addition to the processing described herein below, the response language model 720 may be configured to process similar to the personality LLM 120. As discussed herein above, the response arbitration component 460 processes the potential response data 443a-n (representing the potential responses generated by the one or more components determined to be associated with the user input) to determine whether one or more of the potential responses generated by the system 100 are responsive to the user input. The response arbitration component 460 may then generate the natural language response to the user input.

As shown in FIG. 7, the response arbitration component 460 receives the potential response data 443a-n (output by the LLM shortlister component 440) at the response prompt generation component 710. The response prompt generation component 710 may further receive the user input data 105, the personalized context data 467 (from the LLM shortlister component 440 or the personalized context component 465) and the context data 107.

The personalized context data 467 may represent one or more contextual signals associated with the user 405, such as information associated with a user profile of the user 405 (e.g., user ID, user behavioral information, user preferences, age, gender, historical user interaction data, devices associated with the user profile, etc.), which may be determined using, for example, a user recognition component 995. In some embodiments, an indication of the user 405 and/or user profile may be included in the user input data 105 (e.g., as included in the output of the ASR component 950.). In some embodiments, the personalized context data 467 may include dialog history data representing one or more user inputs and corresponding system-generated responses for a current interaction between the user 405 and the system 100.

The response prompt generation component 710 may process the potential response data 443_a-n_, the context data 107, and the contextualized personality data 145 (and the user input data 105 and the personalized context data 467 (not illustrated)) to generate prompt data 715 representing a prompt for input to the response language model 720. In some embodiments, the prompt data 715 may be a directive for the response language model 720 to determine whether one or more of the potential responses represented in the potential response data 443_a-n_ are responsive to the user input given the other information (e.g., the personalized context data 467, the context data 107, the potential responses associated with the previous tasks (e.g., previous action response data) associated with the user input, and the user input data 105) included in the prompt data 715. The prompt data may further be a directive for the response language model 720 to, if the response language model 720 determines that one or more of the potential responses are responsive to the user input, cause performance of the one or more corresponding actions (e.g., the one or more potential actions included in the selected responses) and/or cause the system 100 to inform the user 405 of the one or more selected responses. For example, in some embodiments, prompt data 715 may further instruct the response language model 720 to generate a natural language summary of the one or more selected responses determined to be responsive to the user input. In some embodiments, the prompt data 715 may further instruct the response language model 720 to generate the natural language summary according to the personality determined to be relevant to the user input (e.g., according to the personality represented by the contextualized personality data 145). The prompt data 715 may instruct the response language model 720 to cause the system 100 to output the natural language summary to the user 405.

In some embodiments, the prompt data 715 may further be a directive for the response language model 720 to, if the response language model 720 determines that none of the potential responses are responsive to the user input, generate a request for additional information from a component of the system 100 and/or the user 405. As discussed above, the additional information may be any information usable to determine and/or perform an action responsive to the user input (e.g., to resolve an ambiguity associated with the user input and/or a task(s) associated with the user input).

In some embodiments, the response prompt generation component 710 may also include in the prompt data 715 a sample processing format to be used by the response language model 720 when processing the prompt. In some embodiments, the response prompt generation component 710 may generate the prompt data 715 according to a template format. For example, the prompt data 715 may adhere to a template format including:

```
{
You are a conversational AI agent that communicates with users to
satisfy their request or ask clarification questions. If applicable,
summarize the responses that satisfy the user's request according
to the provided personality. If applicable, call the corresponding
API's to perform the potential actions that satisfy the user's
request. If no response is needed, indicate that.
Here is the user's request:
[user input data 105]
Here is the context:
[context data 107, personalized context data 467, contextualized
personality data 145]
Here are the potential responses:
[potential response data 443a-n]
}
```

In some embodiments, the template format may instruct the response language model 720 as to how it should process to determine whether one or more of the potential responses are responsive to the user input. In some embodiments, the format may further include an indication, such as a label of "User:" indicating the following string of characters/tokens as the user input. In some embodiments, the format may further include a label of "Thought:" instructing the response language model 720 to generate an output representing whether one or more of the potential responses are determined to be responsive to the user input or whether additional information is needed. In some embodiments, the format may further include an indication of "Response:" instructing the response language model 720 to indicate the one or more selected responses determined to be responsive to the user input, generate a summary of the one or more selected responses according to the indicated personality, and/or generate a request for additional information.

Following such a template format, for example, and for the example user input of "What is today's weather looking" and corresponding potential responses output by the LLM shortlister component 440, the response prompt generation component 710 may generate example prompt data 715_a_:

```
{
"You are a conversational AI agent that communicates with users
to satisfy their request or ask clarification questions. If applicable,
summarize the responses that satisfy the user's request according
to the provided personality. If applicable, call the corresponding
API's to perform the potential actions that satisfy the user's
request. If no response is needed, indicate that."
Here is the user's request:
How is today's weather looking
Here is the context:
Personality:
    Personality type: Alexa
    Personality characteristics: Upbeat, Playful, Enthusiastic
Here are the potential responses and potential actions:
Skill component A: It is currently 82 degrees, with a high of 85
and a low of 80
Skill component B: The weather for today is expected to be mostly
sunny
}
```

For further example, and for the example user input of "who won the basketball game last night between [team 1 name] and [team 2 name]" and corresponding potential responses output by the LLM shortlister component 440, the response prompt generation component 710 may generate example prompt data 715_b_:

```
{
    "You are a conversational AI agent that communicates with users
    to satisfy their request or ask clarification questions. If no response
    is needed, indicate that."
    Here is the user's request:
    Who won the basketball game last night between [team 1 name]
    and [team 2 name]
    Here are the potential responses and potential actions:
    Component A: [team 1 name] won 110-60
}
```

In some embodiments, the response prompt generation component 710 may also include in the prompt data a directive to output a response that satisfies certain conditions. Such conditions may relate to generating a response that is unbiased (toward protected classes, such as gender, race, age, etc.), non-harmful, profanity-free, etc. For example, the prompt data 715 may include "Please generate a polite, respectful, and safe response and one that does not violate protected class policy."

The response language model 720 processes the prompt data 715 to generate the personality response data 135 representing the one or more selected responses determined to be responsive to the user input, the natural language summary of the one or more selected responses, and/or the request for additional information.

If the response language model 720 determines that one or more of the potential responses are responsive to the user input, the response language model 720 may generate the personality response data 135 to represent the one or more selected responses or a natural language summary of the one or more selected responses to be output to the user, where the personality response data 135 is generated according to the personality. For example, based on processing the first example prompt data above, the response language model 720 may select one of the potential responses (e.g., the potential responses from skill component A (e.g., a weather skill component)) determined to be responsive to the user input to generate personality response data 135a: {"Today is shaping up to be a great day with an expected high of 85 and a low of 80",} or the like. For further example, based on processing the first example prompt data provided above, the response language model 720 may select more than one of the potential responses (e.g., the potential responses from both the skill component A and skill component B) determined to be responsive to the user input and generate a summary of the selected responses to generate personality response data 135b: {"Today is shaping up to be a great day for fun in the sun with an expected high of 85 and a low of 80",} or the like.

As another example, based on processing the second example prompt data provided above, the response language model 720 may the potential response from Component A to generate personality response data 135c: {"[team 1 name] crushed [team 2 name], winning with a whopping score of 110-60," } or the like.

As such, the response language model 720 may select between the one or more potential responses from one or more different components (e.g., for the first example prompt data, the potential responses from the skill component A and the skill component B and, for the second example prompt data, the potential response from Component A) to determine that a subset of the potential responses are responsive to the user input. Thereafter, the response language model 720 may cause output of the selected responses (e.g., the subset of potential responses) or a natural language summary of the selected responses to the user, where the output response corresponds to the personality determined to be relevant to the user input.

In some embodiments, the response arbitration component 460 may also generate and send a directive to the components, (e.g., API(s), components, agents, etc.) configured to perform the potential actions included in the selected responses to cause performance of the potential actions (or another component of the system 100 configured to cause the components to perform the potential actions, such as the action plan execution component 150, which is discussed in more detail herein below). For example, in instances where the selected responses include a potential action to be performed, the response language model 720 may further cause the corresponding components to perform the potential action (e.g., for the user input of "please order your favorite ice cream for dessert," cause [Food Ordering Application 1] API to order mint chocolate chip ice cream using [Food Ordering Application 1]). In other embodiments, the system 100 may not generate and/or send the directive until approval to perform the action(s) is received from the user 405.

If the response language model 720 determines that none of the potential responses are responsive to the user input and/or that an ambiguity exists with respect to the user input and/or one or more of the determined tasks, the response language model 720 may generate the personality response data 135 to represent a request to be output to the user and/or the personalized context component 465. For example, based on processing the first example prompt data provided above, the response language model 720 may determine an ambiguity exists with respect to the amount of ice cream to be ordered and may generate the personality response data 135e: {"How much ice cream should I order?",} {"What amount of ice cream does the user usually order?",} or the like to be output to the user and/or sent to the personalized context component 465.

The response language model 720 may send the personality response data 135 to the compliance component 730, which is configured to determine whether model output data generated by the response language model 720 is appropriate for output to the user 405. In other words, the compliance component 730 processes the personality response data 135 to determine whether the personality response data 135 includes any inappropriate/sensitive information that should not be output to the user 405 (e.g., confidential information, offensive language, etc.). In some embodiments, the compliance component 730 may be configured to compare the personality response data 135 to one or more words determined to be inappropriate/sensitive and should not be output to the user 405. In some embodiments, the compliance component 730 may include/implement an ML model. For example, the ML model may process the personality response data 135 to determine whether the personality response data 135 includes any inappropriate/sensitive information. During training, the ML model may take as input a plurality of training natural language inputs, where the ML model is tasked with classifying a natural language input as including inappropriate/sensitive information or not. The output of the ML model (e.g., 0, 1, a value between 0 and 1, or the like) resulting from processing with respect to a training natural language input may be compared to a corresponding label representing whether the natural language input includes inappropriate/sensitive information or not. Based on the comparison, one or more parameters of the ML may be configured. In some embodiments, the ML model may be a classifier.

If the output of the compliance component 730 indicates that the personality response data 135 includes information that is not appropriate for output to the user 405, the compliance component 730 may cause further processing of the personality response data 135 by downstream components to halt. In some embodiments, the response arbitration component 460 may cause the response language model 720 to generate new responsive output data to be evaluated by the compliance component 730. For example, the response arbitration component 460 may cause the response prompt generation component 710 to generate new prompt data, which may include the prompt data 715, the personality response data 135, and an indication that the personality response data 135 is not appropriate for output to the user 405. The new prompt data may be a directive to generate new model output data that is appropriate for output to the user 405.

If the output of the compliance component 730 indicates that the personality response data 135 are appropriate for output to the user, the compliance component 730 may send the personality response data 135 to the output routing component 740. The output routing component 740 processes the personality response data 135 to determine one or more components that are to be caused to process in response to the personality response data 135. In other words, the output routing component 740 parses the personality response data 135 to determine one or more components that the personality response data 135 is to be routed to (or that are to be caused to process based on the personality response data 135).

For example, in an instance where the response language model 720 determines that one or more of the potential responses are responsive to the user input and generates the personality response data 135 including the one or more selected responses (or a natural language summary of the one or more selected responses)/the request for additional information, the output routing component 740 may parse the personality response data 135 to determine the selected responses/the natural language summary and send the personality response data 135 to a component configured to generate corresponding data to be output to the user 405. For example, the output routing component 740 may send the personality response data 135 to the TTS component 980, which may process as described herein above to generate output audio data including synthesized speech corresponding to the personality response data 135, which the system 100 may send to the user device 410 for output to the user 405. In some embodiments, the system 100 may further include a component configured to generate visual output data (e.g., output image and/or video data) corresponding to the personality response data 135, which may be sent to the user device 410 to be output to the user.

For further example, in embodiments where the personality response data 135 includes selected responses (e.g., the personality response data 135) that include one or more potential actions to be performed, the output routing component 740 may process as described herein above to determine the one or more selected responses/the natural language summary and send the personality response data 135 to the one or more components associated with the selected responses. In such embodiments, the personality response data 135 may further include an directive for the one or more components to perform the potential actions corresponding to the selected responses. For example, in some embodiments, the components corresponding to the potential responses included in the potential response data 443*a-n* may, after generating the potential responses, suspend processing required to perform the potential action included in the potential responses and await a directive from the system 100 to perform the potential action. As such, the output routing component 740 may include the directive in the personality response data 135 to cause the component to perform the potential action. In some embodiments, the output routing component 740 may generate an API call configured to cause the component to perform the action.

In some embodiments, where the personality response data 135 includes selected responses that include one or more potential actions to be performed, the personality response data 135 may further request authorization from the user 405 to perform the one or more potential actions responsive to the user input. After receiving the request authorization (e.g., via a subsequent user input) the response arbitration component 460 may generate and send the corresponding directive (or API call) to perform the one or more potential actions responsive to the user input. In some embodiments, the system 100 may store data indicating prior authorization to perform the one or more potential actions responsive to the user input (or one or more actions similar to the one or more potential actions), in which case the response arbitration component 460 may use such data as authorization to perform the one or more potential actions. For example, the user 405 may have previously provided authorization for a set of actions (e.g., turning on outside lights). Thereafter, the system 100 may determine the one or more potential actions to be performed in response to the user input data 105. If the system 100 determines that the one or more actions are included in the set of actions previously authorized by the user 405, the system 100 may not ask for further authorization prior to causing the one or more potential actions to be performed.

For further example, in an instance where the response language model 720 generates the personality response data 135 including a request for additional information (in response to the response language model 720 determining that none of the potential responses are responsive to the user input and/or an ambiguity exists with respect to the user input and/or one or more of the tasks), which may be determined by the output routing component 740 based on, for example, the personality response data 135 including a question, the output routing component 740 may parse the personality response data 135 to determine whether the request for additional information is to be sent to the personalized context component 465 and/or output to the user 405. In some embodiments, the response language model 720 may include in the personality response data 135 an indication of whether the request for additional information should be sent to the personalized context component 465 and/or output to the user 405. In some embodiments, unless otherwise indicated in the personality response data 135, the output routing component 740 may determine to send the request for additional information to the personalized context component 465 prior to outputting the request for additional information to the user 405. In the instance where the personalized context component 465 is unable to resolve the ambiguity (or a component of the system 100 is unable to resolve the ambiguity using the personalized context data generated by the personalized context component 465), the output routing component 740 may determine the request for additional information is to be output to the user 405.

In some embodiments, the response arbitration component 460 may be configured to further process data representing a potential response to the user input that is generated by one or more other components of the system 100 not included in the LLM orchestrator component 130. For example, the response arbitration component 460 may further receive data from an orchestrator component 930 (discussed in detail herein below with respect to FIG. 9) representing a potential response to the user input (e.g., the output of the skill component 954), where the orchestration of the processing performed to generate the potential response was performed by the orchestrator component 930, rather than the LLM orchestrator component 130. In such embodiments, the response arbitration component 460 may be further configured to arbitrate between first potential responses received as a result of the processing of the LLM orchestrator component 130 and second potential responses received as a result of the processing of the orchestrator component 930. As discussed above, the response arbitration component 460 may select one or more portions (e.g., potential actions, potential responses, etc.) of the first potential responses and/or the second potential responses that are determined to be responsive to the user input and cause output of the one or more portions (or a summarized representation of the one or more portions) and/or performance of the potential actions corresponding to the selected responses.

In some embodiments, the data received from the orchestrator component 930 may be included in the potential response data 443a-n. For example, the orchestrator component 930 may be determined to be configured to perform a function (e.g., cause another component(s) to perform a function) potentially relevant to the user input such that the LLM shortlister component 440 may cause the orchestrator component 930 to generate potential responses potentially responsive to the user input, which may be included in the potential response data 443a-n sent to the response arbitration component 460.

In some embodiments, the language models 520, 540, 640, 720 may be fine-tuned to perform a particular task(s). Fine-tuning of the language models 520, 540, 640, 720 may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks.

In some embodiments, one or more components of the system 100 discussed herein above may be configured to begin processing with respect to data as soon as the data or a portion of the data is available to the one or more components. Some components of the system 100 are generative components/models that can begin processing with respect to portions of data as they are available, instead of waiting to initiate processing after the entirety of data is available. In other words, the system 100 may be configured to stream portions of data associated with processing with respect to a user input to the one or more components such that the one or more components may begin performing their configured processing with respect to that data as soon as it is available to the one or more components. For example, if the output of the task determination language model 520, the task selection language model 540, and/or the shortlister language model 640 indicates that additional information is needed to complete a first task associated with a user input, a request for the additional information may be sent to the personalized context component 465. Thereafter, the task determination language model 520, the task selection language model 540, and/or the shortlister language model 640 may continue to process to complete their configured operations. For example, while the personalized context component 465 is processing to determine the additional information, the system 100 may begin processing with respect to a second task associated with the user input. Thereafter, the output of the personalized context component 465 may be sent to the response arbitration component 460 such that once the response arbitration component 460 receives the output of the LLM shortlister component 440, the response arbitration component 460 may resolve the ambiguity that resulted in the request for additional information in order to generate the personality response data 135. For further example, if the user input data 105 is generated to include the natural language representation of the user input, but the processing required to determine the corresponding contextual signals (e.g., weather data, time of data, dialog history, device information, etc.) is yet to be completed, the task generation component 435 may begin processing with respect to the natural language representation of the user input. Once the corresponding contextual signals have been generated, the task generation component 435 may begin processing with respect to the contextual signals and may update downstream components with the result of the processing with respect to the contextual signals.

As another example, if the task generation component 435 determines that more than one task is to be completed to perform an action responsive to a user input, and the LLM shortlister component 440 processes as described herein above to cause one or more components to generate potential responses with respect to a first task of the more than one tasks, the LLM shortlister component 440 may send the potential responses (and a representation of the user input and the current task) to the response arbitration component 460 to process as described herein above with respect to those potential responses while the system 100 (e.g., the task generation component 435 and/or the LLM shortlister component 440) completes processing with respect to the remaining tasks of the one or more tasks. Therefore, the response arbitration component 460 may process as described herein to select between the potential responses associated with the first task while the potential responses associated with one or more of the remaining tasks is completed. As such, the response arbitration component 460 may only need to arbitrate between the potential responses associated with the first task that were previously selected by the response arbitration component 460 as being responsive to the first task when the response arbitration component 460 later processes with respect to further potential responses associated with further tasks.

As a further example, if the API retrieval component 620 determines (e.g., with a confidence value that meets or exceeds a particular threshold) that a particular API or component description should be included in the relevant API data, the API retrieval component 620 may provide the corresponding relevant API data to the shortlister prompt generation component 610 so that the shortlister prompt generation component 610 may begin processing with respect to the relevant API data while the API retrieval component 620 continues to determine one or more further relevant API data. In general, the system 100 is capable of performing such streaming and processing of portions of data discussed herein (e.g., for processing with respect to a user input) and updating downstream components with the results of processing of newly available portions of data as the data becomes available for processing.

Figure 8:
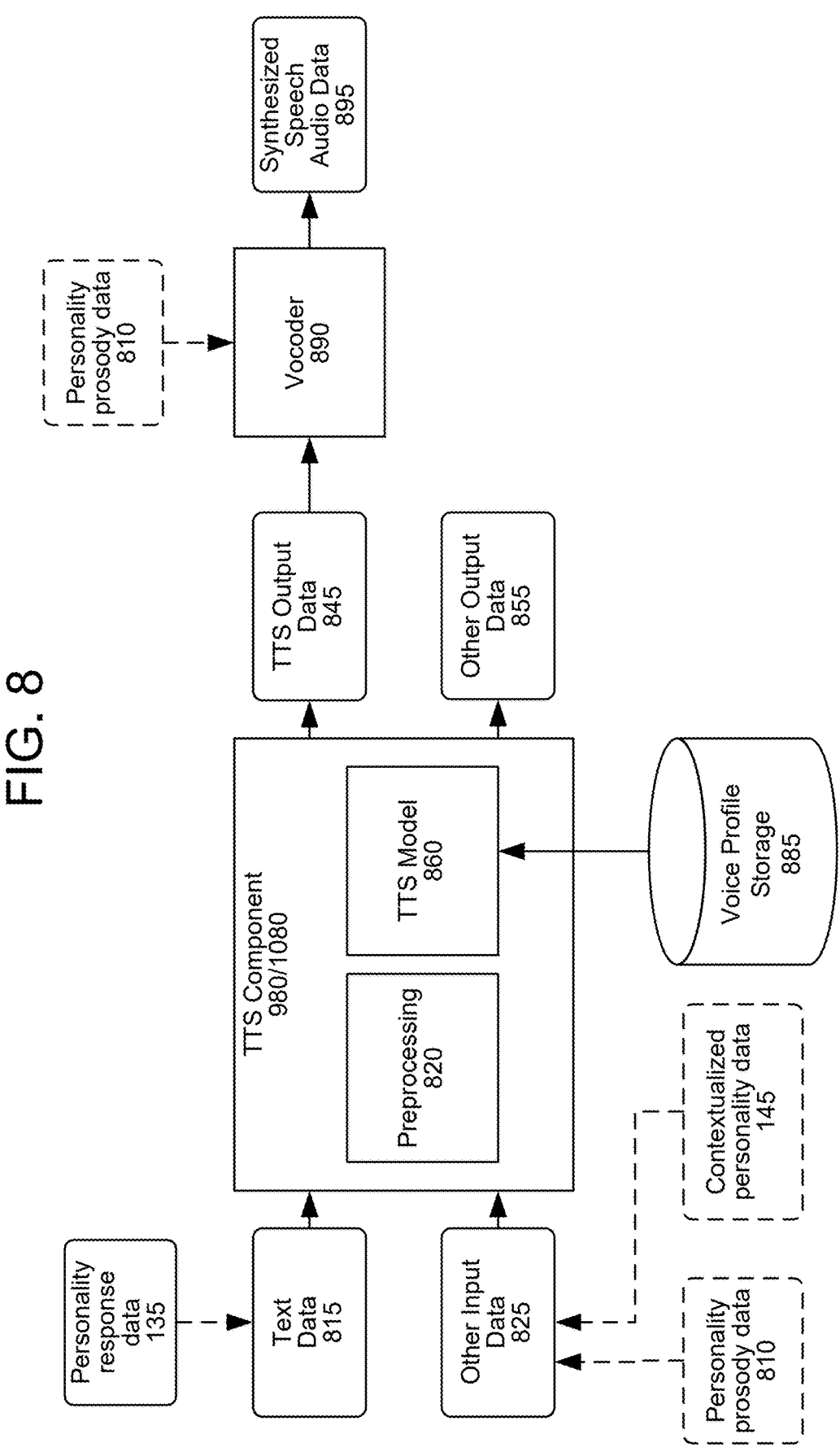
FIG. 8 is a conceptual diagram illustrating example components and processing of a text-to-speech (TTS) component, according to embodiments of the present disclosure.

Components of a system that may be used to perform unit selection, parametric TTS processing, and/or model-based audio synthesis are shown in FIG. 8. FIG. 8 is a conceptual diagram that illustrates operations for generating synthesized speech using a TTS component 980/1080, according to embodiments of the present disclosure. The TTS component 980/1080 may receive text data 815 and process it using one or more TTS models 860 to generate TTS output data 845 representing synthesized speech. In some embodiments, the text data 815 may include/correspond to the personality response data 135. In some embodiments the TTS output data 845 may represent synthesized speech in the form of, for example, spectrogram data. In other embodiments, the TTS output data 845 may comprise other data, for example data representing a latent representation (e.g., embedding data) representing synthesized speech. A vocoder 890 or other component may convert the TTS output data 845 into output speech audio data 895, which may represent a time-domain waveform suitable for amplification and output as audio (e.g., from a loudspeaker).

The TTS component 980/1080 may additionally receive other input data 825. The other input data 825 may include, for example, identifiers and/or labels corresponding to a desired speaker identity, voice characteristics, emotion, speech style, etc. desired for the synthesized speech. In some embodiments, the other input data 825 may include/correspond to the contextualized personality data 145. In other embodiments, the other input data 825 may include/correspond to the prosody data (e.g., the personality prosody data 810, in embodiments where the personality prosody data corresponds to natural language) generated by the personality LLM 120, as discussed herein above. In some implementations, the other input data 825 may include text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 815 and/or the other input data 825 such as metadata accompanying a TTS request and indicating what text should be whispered (or have some other indicated audio characteristic).

The TTS component 980/1080 may include a preprocessing component 820 that can convert the text data 815 and/or other input data 825 into a form suitable for processing by the TTS model 860. The text data 815 may be from, for example an application, a skill component (described further below), an NLG component, another device or source, or may be input by a user. The text data 815 received by the TTS component 980/1080 may not necessarily be text, but may include other data (such as symbols, code, other data, etc.) that may reference text (such as an indicator of a word and/or phoneme) that is to be synthesized. The preprocessing component 820 may transform the text data 815 into, for example, a symbolic linguistic representation, which may include linguistic context features such as phoneme data, punctuation data, syllable-level features, word-level features, and/or emotion, speaker, accent, or other features for processing by the TTS component 980/1080. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 815, such as surprise, anger, or fear. The speaker features may include data corresponding to a type of speaker, such as sex, age, or profession. The accent features may include data corresponding to an accent associated with the speaker, such as Southern, Boston, English, French, or other such accent. Style features may include a book reading style, poem reading style, a news anchor style, a sports commentator style, various singing styles, etc.

The preprocessing component 820 may include functionality and/or components for performing text normalization, linguistic analysis, linguistic prosody generation, or other such operations. During text normalization, the preprocessing component 820 may first process the text data 815 and generate standard text, converting such things as numbers, abbreviations (such as Apt., St., etc.), symbols ($, %, etc.) into the equivalent of written out words.

During linguistic analysis, the preprocessing component 820 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. In some implementations, the TTS model 860 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in a storage component. The linguistic analysis performed by the preprocessing component 820 may also identify different grammatical components such as prefixes, suffixes, phrases, punctuation, syntactic boundaries, or the like. Such grammatical components may be used by the TTS component 980/1080 to craft a natural-sounding audio waveform output. The language dictionary may also include letter-to-sound rules and other tools that may be used to pronounce previously unidentified words or letter combinations that may be encountered by the TTS component 980/1080. Generally, the more information included in the language dictionary, the higher quality the speech output.

The output of the preprocessing component 820 may be a symbolic linguistic representation, which may include a sequence of phonetic units. In some implementations, the sequence of phonetic units may be annotated with prosodic characteristics. In some implementations, prosody may be applied in part or wholly by a TTS model 860. This symbolic linguistic representation may be sent to the TTS model 860 for conversion into audio data (e.g., in the form of Mel-spectrograms or other frequency content data format).

The TTS component 980/1080 may retrieve one or more previously trained and/or configured TTS models 860 from the voice profile storage 885. A TTS model 860 may be, for example, a neural network architecture that may be described as interconnected artificial neurons or "cells" interconnected in layers and/or blocks. In general, neural network model architecture can be described broadly by hyperparameters that describe the number of layers and/or blocks, how many cells each layer and/or block contains, what activations functions they implement, how they interconnect, etc. A neural network model includes trainable parameters (e.g., "weights") that indicate how much weight (e.g., in the form of an arithmetic multiplier) a cell should give to a particular input when generating an output. In some implementations, a neural network model may include other features such as a self-attention mechanism, which may determine certain parameters at run time based on inputs rather than, for example, during training based on a loss calculation. The various data that describe a particular TTS model 860 may be stored in the voice profile storage 885. A TTS model 860 may represent a particular speaker identity and may be conditioned based on speaking style, emotion, etc. In some implementations, a particular speaker identity may be associated with more than one TTS model 860; for example, with a different model representing a different speaking style, language, emotion, etc. in some implementations, a particular TTS model 860 may be associated with more than one speaker identity; that is, be able to produce synthesized speech that reproduces voice characteristics of more than one character. Thus a first TTS model 860a may be used to create synthesized speech for the first speech-processing system component(s) 420a while a second, different, TTS model 860b may be used to create synthesized speech for the second speech-processing system component(s) 420b. In some cases, the TTS model 860 may generate the desired voice characteristics based on conditioning data received or determined from the text data 815 and/or the other input data 825. For example a synthesized voice of the first speech-processing system component(s) 420a may be different from a synthesized voice of the second speech-processing system component(s) 420b.

The TTS component 980/1080 may, based on an indication received with the text data 815 and/or other input data 825, retrieve a TTS model 860 from the voice profile storage 885 and use it to process input to generate synthesized speech. The TTS component 980/1080 may provide the TTS model 860 with any relevant conditioning labels to generate synthesized speech having the desired voice characteristics. The TTS model 860 may generate spectrogram data 845 (e.g., frequency content data) representing the synthesized speech, and send it to the vocoder 890 for conversion into an audio signal.

The TTS component 980/1080 may generate other output data 855. The other output data 855 may include, for example, indications or directives for handling and/or outputting the synthesized speech. For example, the text data 815 and/or other input data 825 may be received along with metadata, such as SSML tags, indicating that a selected portion of the text data 815 should be louder or quieter. Thus, the other output data 855 may include a volume tag that instructs the vocoder 890 to increase or decrease an amplitude of the output speech audio data 895 at times corresponding to the selected portion of the text data 815. Additionally or alternatively, a volume tag may instruct a playback device to raise or lower a volume of the synthesized speech from the device's current volume level, or lower a volume of other media being output by the device (e.g., to deliver an urgent message).

In embodiments where the personality LLM 120 is configured to generate prosody information corresponding to a spectrogram, a latent representation of the personality characteristics, an acoustic representation of the voice characteristic(s), and/or some other proxy representation of the voice characteristic(s), the prosody information (e.g., the personality prosody data 810) may be received at the vocoder 890.

The vocoder 890 may convert the spectrogram data 845 (and/or the personality prosody data 810) into an audio signal (e.g., an analog or digital time-domain waveform) suitable for amplification and output as audio. The vocoder 890 may be, for example, a universal neural vocoder based on Parallel WaveNet or related model. The vocoder 890 may take as input audio data in the form of, for example, a Mel-spectrogram with 80 coefficients and frequencies ranging from 50 Hz to 12 kHz. The synthesized speech audio data 895 may be a time-domain audio format (e.g., pulse-code modulation (PCM), waveform audio format (WAV), p-law, etc.) that may be readily converted to an analog signal for amplification and output by a loudspeaker. The synthesized speech audio data 895 may consist of, for example, 8-, 16-, or 24-bit audio having a sample rate of 16 kHz, 24 kHz, 44.1 kHz, etc. In some implementations, other bit and/or sample rates may be used.

Figure 9:
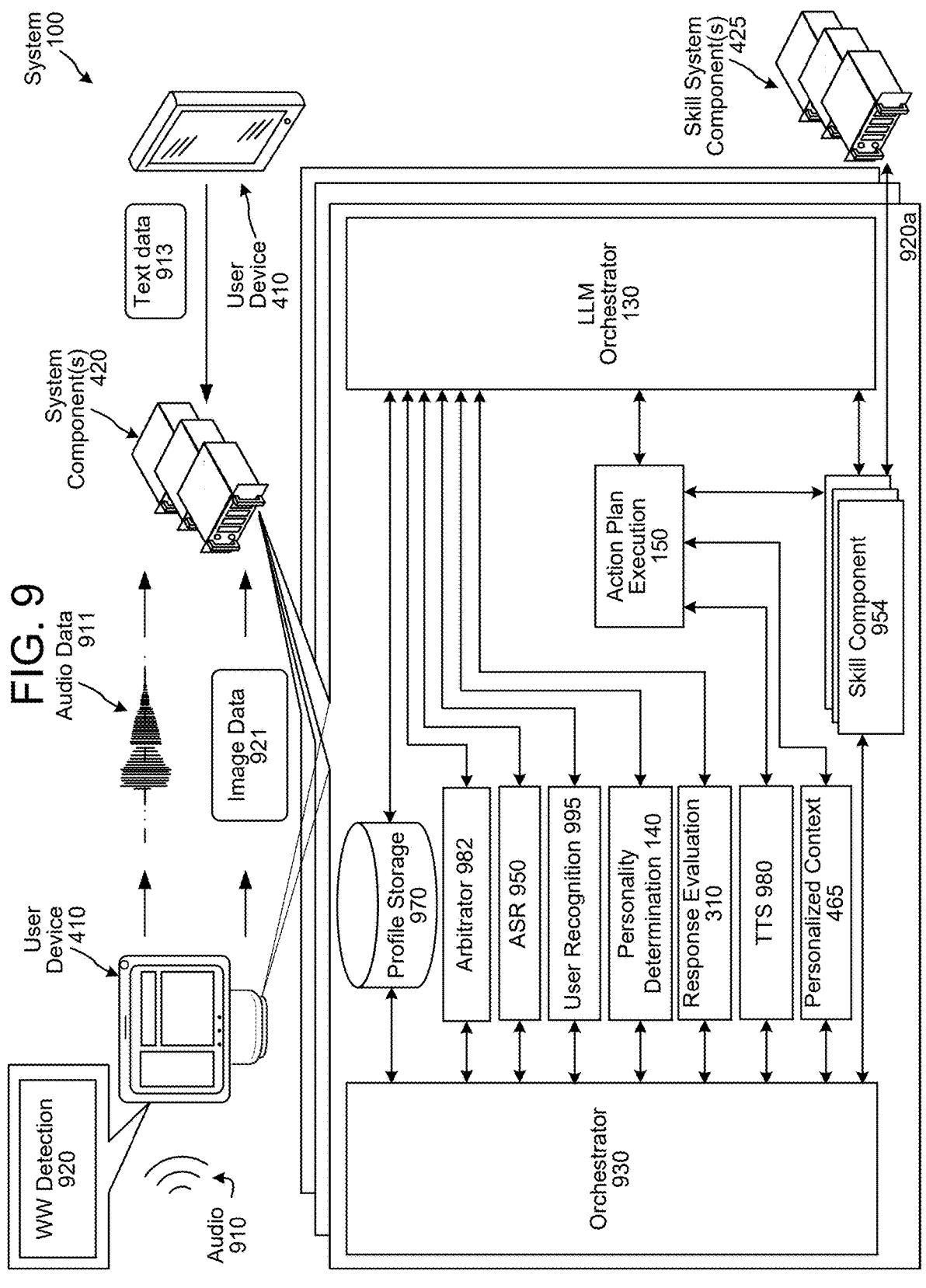
FIG. 9 is a conceptual diagram of components of the system, according to embodiments of the present disclosure.

The system 100 may operate using various components as described in FIG. 9. The various components may be located on same or different physical devices. Communication between various components may occur directly or across a network(s) 499. The user device 410 may include audio capture component(s), such as a microphone or array of microphones of a user device 410, captures audio 910 and creates corresponding audio data. Once speech is detected in audio data representing the audio 910, the user device 410 may determine if the speech is directed at the user device 410/system component(s). In at least some embodiments, such determination may be made using a wakeword detection component 920. The wakeword detection component 920 may be configured to detect various wakewords. In at least some examples, each wakeword may correspond to a name of a different digital assistant. An example wakeword/digital assistant name is "Alexa." In another example, input to the system may be in form of text data 913, for example as a result of a user typing an input into a user interface of user device 410. Other input forms may include indication that the user has pressed a physical or virtual button on user device 410, the user has made a gesture, etc. The user device 410 may also capture images using camera(s) of the user device 410 and may send image data 921 representing those image(s) to the system component(s). The image data 921 may include raw image data or image data processed by the user device 410 before sending to the system component(s). The image data 921 may be used in various manners by different components of the system to perform operations such as determining whether a user is directing an utterance to the system, interpreting a user command, responding to a user command, etc.

The wakeword detection component 920 of the user device 410 may process the audio data, representing the audio 910, to determine whether speech is represented therein. The user device 410 may use various techniques to determine whether the audio data includes speech. In some examples, the user device 410 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 410 may implement a classifier configured to distinguish speech from background noise. The classifier may be implemented by techniques such as linear classifiers, support vector machines, and decision trees. In still other examples, the user device 410 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 910, is analyzed to determine if specific characteristics of the audio data match preconfigured acoustic waveforms, audio signatures, or other data corresponding to a wakeword.

Thus, the wakeword detection component 920 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 920 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 920 and/or input is detected by an input detector, the user device 410 may "wake" and begin transmitting audio data 911, representing the audio 910, to the system component(s) 420. The audio data 911 may include data corresponding to the wakeword; in other embodiments, the portion of the audio corresponding to the wakeword is removed by the user device 410 prior to sending the audio data 911 to the system component(s) 420. In the case of touch input detection or gesture based input detection, the audio data may not include a wakeword.

In some implementations, the system 100 may include more than one system component(s). The system component(s) 420 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 920 may result in sending audio data to system component(s) a for processing while detection of the wakeword "Computer" by the wakeword detector may result in sending audio data to system component(s) b for processing. The system may have a separate wakeword and system for different skills/systems (e.g., "Dungeon Master" for a game play skill/system component(s) c) and/or such skills/systems may be coordinated by one or more skill component(s) 954 of one or more system component(s) 420.

The user device 410/system component(s) 420 may also include a system directed input detector. The system directed input detector may be configured to determine whether an input to the system (for example speech, a gesture, etc.) is directed to the system or not directed to the system (for example directed to another user, etc.). The system directed input detector may work in conjunction with the wakeword detection component 920. If the system directed input detector determines an input is directed to the system, the user device 410 may "wake" and begin sending captured data for further processing. If data is being processed the user device 410 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector determines an input is not directed to the system (such as a speech or gesture directed to another user) the user device 410 may discard the data and take no further action for processing purposes. In this way the system 100 may prevent processing of data not directed to the system, thus protecting user privacy. As an indicator to the user, however, the system may output an audio, visual, or other indicator when the system directed input detector is determining whether an input is potentially device directed. For example, the system may output an orange indicator while considering an input, and may output a green indicator if a system directed input is detected. Other such configurations are possible.

Upon receipt by the system component(s) 420, the audio data 911 may be sent to an orchestrator component 930 and/or the LLM orchestrator component 430. The orchestrator component 930 may include memory and logic that enables the orchestrator component 930 to transmit various pieces and forms of data to various components of the system, as well as perform other operations as described herein. In some embodiments, the orchestrator component 930 may optionally be included in the system component(s) 420. In embodiments where the orchestrator component 930 is not included in the system component(s) 420, the audio data 911 may be sent directly to the LLM orchestrator component 430. Further, in such embodiments, each of the components of the system component(s) 420 may be configured to interact with the LLM orchestrator component 430, the action plan execution component 150, and/or the API provider component.

In some embodiments, the system component(s) 420 may include an arbitrator component 982, which may be configured to determine whether the orchestrator component 930 and/or the LLM orchestrator component 430 are to process with respect to the audio data 911. In some embodiments, the LLM orchestrator component 430 may be selected to process with respect to the audio data 911 only if the user 405 associated with the audio data 911 (or the user device 410 that captured the audio 910) has previously indicated that the LLM orchestrator component 430 may be selected to process with respect to user inputs received from the user 405.

In some embodiments, the arbitrator component 982 may determine the orchestrator component 930 and/or the LLM orchestrator component 430 are to process with respect to the audio data 911 based on metadata associated with the audio data 911. For example, the arbitrator component 982 may be a classifier configured to process a natural language representation of the audio data 911 (e.g., output by the ASR component 950) and classify the corresponding user input as to be processed by the orchestrator component 930 and/or the LLM orchestrator component 430. For further example, the arbitrator component 982 may determine whether the device from which the audio data 911 is received is associated with an indicator representing the audio data 911 is to be processed by the orchestrator component 930 and/or the LLM orchestrator component 430. As an even further example, the arbitrator component 982 may determine whether the user (e.g., determined using data output from the user recognition component 995) from which the audio data 911 is received is associated with a user profile including an indicator representing the audio data 911 is to be processed by the orchestrator component 930 and/or the LLM orchestrator component 430. As another example, the arbitrator component 982 may determine whether the audio data 911 (or the output of the ASR component 950) corresponds to a request representing that the audio data 911 is to be processed by the orchestrator component 930 and/or the LLM orchestrator component 430 (e.g., a request including "let's chat" may represent that the audio data 911 is to be processed by the LLM orchestrator component 430).

In some embodiments, if the arbitrator component 982 is unsure (e.g., a confidence score corresponding to whether the orchestrator component 930 and/or the LLM orchestrator component 430 is to process is below a threshold), then the arbitrator component 982 may send the audio data 911 to both of the orchestrator component 930 and the LLM orchestrator component 430. In such embodiments, the orchestrator component 930 and/or the LLM orchestrator component 430 may include further logic for determining further confidence scores during processing representing whether the orchestrator component 930 and/or the LLM orchestrator component 430 should continue processing, as is discussed further herein below.

The arbitrator component 982 may send the audio data 911 to an ASR component 950. In some embodiments, the component selected to process the audio data 911 (e.g., the orchestrator component 930 and/or the LLM orchestrator component 430) may send the audio data 911 to the ASR component 950. The ASR component 950 may transcribe the audio data 911 into text data. The text data output by the ASR component 950 represents one or more than one (e.g., in the form of an N-best list) ASR hypotheses representing speech represented in the audio data 911. The ASR component 950 interprets the speech in the audio data 911 based on a similarity between the audio data 911 and pre-established language models. For example, the ASR component 950 may compare the audio data 911 with models for sounds (e.g., acoustic units such as phonemes, senons, phones, etc.) and sequences of sounds to identify words that match the sequence of sounds of the speech represented in the audio data 911. The ASR component 950 sends the text data generated thereby to the arbitrator component 982, the orchestrator component 930, and/or the LLM orchestrator component 430. In instances where the text data is sent to the arbitrator component 982, the arbitrator component 982 may send the text data to the component selected to process the audio data 911 (e.g., the orchestrator component 930 and/or the LLM orchestrator component 430). The text data sent from the ASR component 950 to the arbitrator component 982, the orchestrator component 930, and/or the LLM orchestrator component 430 may include a single top-scoring ASR hypothesis or may include an N-best list including multiple top-scoring ASR hypotheses. An N-best list may additionally include a respective score associated with each ASR hypothesis represented therein.

A skill system component(s) 425 may communicate with a skill component(s) 954 within the system component(s) 420 directly with the orchestrator component 930 and/or the action plan execution component 150, or with other components. A skill system component(s) 425 may be configured to perform one or more actions. An ability to perform such action(s) may sometimes be referred to as a "skill." That is, a skill may enable a skill system component(s) 425 to execute specific functionality in order to provide data or perform some other action requested by a user. For example, a weather service skill may enable a skill system component(s) 425 to provide weather information to the system component(s) 420, a car service skill may enable a skill system component(s) 425 to book a trip with respect to a taxi or ride sharing service, an order pizza skill may enable a skill system component(s) 425 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 420 may be configured with a skill component 954 dedicated to interacting with the skill system component(s) 425. Unless expressly stated otherwise, reference to a skill, skill device, or skill component may include a skill component 954 operated by the system component(s) 420 and/or skill operated by the skill system component(s) 425. Moreover, the functionality described herein as a skill or skill may be referred to using many different terms, such as an action, bot, app, or the like. The skill component 954 and or skill system component(s) 425 may return output data to the orchestrator component 930.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 980. The TTS component 980 may generate audio data (e.g., synthesized speech) from text data using one or more different methods. Text data input to the TTS component 980 may come from a skill component 954, the orchestrator component 930, or another component of the system. In one method of synthesis called unit selection, the TTS component 980 matches text data against a database of recorded speech. The TTS component 980 selects matching units of recorded speech and concatenates the units together to form audio data. In another method of synthesis called parametric synthesis, the TTS component 980 varies parameters such as frequency, volume, and noise to create audio data including an artificial speech waveform. Parametric synthesis uses a computerized voice generator, sometimes called a vocoder.

The user device 410 may include still image and/or video capture components such as a camera or cameras to capture one or more images. The user device 410 may include circuitry for digitizing the images and/or video for transmission to the system component(s) 420 as image data. The user device 410 may further include circuitry for voice command-based control of the camera, allowing a user 405 to request capture of image or video data. The user device 410 may process the commands locally or send audio data 911 representing the commands to the system component(s) 420 for processing, after which the system component(s) 420 may return output data that can cause the user device 410 to engage its camera.

The system component(s) 420/the user device 410 may include a user recognition component 995 that recognizes one or more users using a variety of data. However, the disclosure is not limited thereto, and the user device 410 may include the user recognition component 995 instead of and/or in addition to the system component(s) 420 without departing from the disclosure.

The user recognition component 995 may take as input the audio data 911 and/or text data output by the ASR component 950. The user recognition component 995 may perform user recognition by comparing audio characteristics in the audio data 911 to stored audio characteristics of users. The user recognition component 995 may also perform user recognition by comparing biometric data (e.g., fingerprint data, iris data, etc.), received by the system in correlation with the present user input, to stored biometric data of users assuming user permission and previous authorization. The user recognition component 995 may further perform user recognition by comparing image data (e.g., including a representation of at least a feature of a user), received by the system in correlation with the present user input, with stored image data including representations of features of different users. The user recognition component 995 may perform additional user recognition processes, including those known in the art.

The user recognition component 995 determines scores indicating whether user input originated from a particular user. For example, a first score may indicate a likelihood that the user input originated from a first user, a second score may indicate a likelihood that the user input originated from a second user, etc. The user recognition component 995 also determines an overall confidence regarding the accuracy of user recognition operations.

Output of the user recognition component 995 may include a single user identifier corresponding to the most likely user that originated the user input. Alternatively, output of the user recognition component 995 may include an N-best list of user identifiers with respective scores indicating likelihoods of respective users originating the user input. The output of the user recognition component 995 may be used to inform processing of the arbitrator component 982, the orchestrator component 930, and/or the LLM orchestrator component 430 as well as processing performed by other components of the system.

The system component(s) 420/user device 410 may include a presence detection component that determines the presence and/or location of one or more users using a variety of data.

The system 100 (either on user device 410, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 970 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 410, the user profile (associated with the presented login information) may be updated to include information about the user device 410, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 970 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 970 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 9 may be illustrated as part of system component(s) 420, user device 410, or otherwise, the components may be arranged in other device(s) (such as in user device 410 if illustrated in system component(s) 420 or vice-versa, or in other device(s) altogether) without departing from the disclosure.

In at least some embodiments, the system component(s) may receive the audio data 911 from the user device 410, to recognize speech corresponding to a spoken input in the received audio data 911, and to perform functions in response to the recognized speech. In at least some embodiments, these functions involve sending directives (e.g., commands), from the system component(s) to the user device 410 (and/or other devices 410) to cause the user device 410 to perform an action, such as output an audible response to the spoken input via a loudspeaker(s), and/or control secondary devices in the environment by sending a control command to the secondary devices.

Thus, when the user device 410 is able to communicate with the system component(s) over the network(s) 499, some or all of the functions capable of being performed by the system component(s) may be performed by sending one or more directives over the network(s) 499 to the user device 410, which, in turn, may process the directive(s) and perform one or more corresponding actions. For example, the system component(s), using a remote directive that is included in response data (e.g., a remote response), may instruct the user device 410 to output an audible response (e.g., using TTS processing performed by an on-device TTS component) to a user's question via a loudspeaker(s) of (or otherwise associated with) the user device 410, to output content (e.g., music) via the loudspeaker(s) of (or otherwise associated with) the user device 410, to display content on a display of (or otherwise associated with) the user device 410, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 405 as part of a shopping function, establishing a communication session (e.g., a video call) between the user 405 and another user, and so on.

In at least some embodiments, a hybrid selector, of the user device 410, may send the audio data 911 to the wakeword detection component 920. If the wakeword detection component 920 detects a wakeword in the audio data 911, the wakeword detection component 920 may send an indication of such detection to the hybrid selector. In response to receiving the indication, the hybrid selector may send the audio data 911 to the system component(s) and/or the ASR component of the user device 410. The wakeword detection component 920 may also send an indication, to the hybrid selector, representing a wakeword was not detected. In response to receiving such an indication, the hybrid selector may refrain from sending the audio data 911 to the system component(s), and may prevent the ASR component of the user device 410 from further processing the audio data 911. In this situation, the audio data 911 can be discarded.

The user device 410 may conduct its own speech processing using on-device language processing components, such as an ASR component, similar to the manner discussed herein with respect to the ASR component 950 of the system component(s). The user device 410 may also internally include, or otherwise have access to, other components such as one or more skill components capable of executing commands based on the output of an orchestrator component, an LLM orchestrator, or other results determined by the user device 410/system component(s) (which may operate similarly to skill components 954), an arbitrator component (configured to process in a similar manner to that discussed herein above with respect to the arbitrator component 982), an action plan execution component (configured to process in a similar manner to that discussed herein with respect to the action plan execution component 150), a personalized context component (configured to process in a similar manner to that discussed herein with respect to the personalized context component 465), a user recognition component (configured to process in a similar manner to that discussed herein with respect to the user recognition component 995 of the system component(s)), profile storage (configured to store similar profile data to that discussed herein with respect to the profile storage 970 of the system component(s)), or other components. In at least some embodiments, the profile storage may only store profile data for a user or group of users specifically associated with the user device 410. Similar to as described above with respect to skill component 954, a skill component of the user device 410 may communicate with a skill system component(s) 425. The user device 410 may also have its own TTS component, which may operate similarly to TTS component 980.

In at least some embodiments, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s). If the user device 410 attempts to process a natural language user input for which the on-device language processing components are not necessarily best suited, the language processing results determined by the user device 410 may indicate a low confidence or other metric indicating that the processing by the user device 410 may not be as accurate as the processing done by the system component(s).

The hybrid selector, of the user device 410, may include a hybrid proxy (HP) configured to proxy traffic to/from the system component(s). For example, the HP may be configured to send messages to/from a hybrid execution controller (HEC) of the hybrid selector. For example, command/directive data received from the system component(s) can be sent to the HEC using the HP. The HP may also be configured to allow the audio data 911 to pass to the system component(s) while also receiving (e.g., intercepting) this audio data 911 and sending the audio data 911 to the HEC.

In at least some embodiments, the hybrid selector may further include a local request orchestrator (LRO) configured to notify the ASR component of the user device 410 about the availability of new audio data 911 that represents user speech, and to otherwise initiate the operations of local language processing when new audio data 911 becomes available. In general, the hybrid selector may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 410 receives directive data from the system component(s) and chooses to use that remotely-determined directive data.

Thus, when the audio data 911 is received, the HP may allow the audio data 911 to pass through to the system component(s) and the HP may also input the audio data 911 to the on-device ASR component by routing the audio data 911 through the HEC of the hybrid selector, whereby the LRO notifies the on-device ASR component of the audio data 911. At this point, the hybrid selector may wait for response data from either or both of the system component(s) or the local language processing components. However, the disclosure is not limited thereto, and in some examples the hybrid selector may send the audio data 911 only to the local ASR component without departing from the disclosure. For example, the user device 410 may process the audio data 911 locally without sending the audio data 911 to the system component(s).

The local ASR component is configured to receive the audio data 911 from the hybrid selector 1024, and to recognize speech in the audio data 911. The user device 410 and/or the system component(s) may associate a unique identifier with each natural language user input. The user device 410 may include the unique identifier when sending the audio data 911 to the system component(s), and the response data from the system component(s) may include the unique identifier to identify which natural language user input the response data corresponds.

In at least some embodiments, the user device 410 may include, or be configured to use, one or more skill components that may work similarly to the skill component(s) 954 implemented by the system component(s). The skill component(s) may correspond to one or more domains that are used in order to determine how to act on a spoken input in a particular way, such as by outputting a directive that corresponds to the determined intent, and which can be processed to implement the desired operation. The skill component(s) installed on the user device 410 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 410 may be in communication with one or more skill system component(s) 425. For example, a skill system component(s) 425 may be located in a remote environment (e.g., separate location) such that the user device 410 may only communicate with the skill system component(s) 425 via the network(s) 499. However, the disclosure is not limited thereto. For example, in at least some embodiments, a skill system component(s) 425 may be configured in a local environment (e.g., home server and/or the like) such that the user device 410 may communicate with the skill system component(s) 425 via a private network, such as a local area network (LAN).

A skill system component(s) 425 may communicate with a skill component(s) 954 within the system component(s) 420 directly with the orchestrator component 930 and/or the action plan execution component 150, or with other components. A skill system component(s) 425 may be configured to perform one or more actions. An ability to perform such action(s) may sometimes be referred to as a "skill." That is, a skill may enable a skill system component(s) 425 to execute specific functionality in order to provide data or perform some other action requested by a user. For example, a weather service skill may enable a skill system component(s) 425 to provide weather information to the system component(s) 420, a car service skill may enable a skill system component(s) 425 to book a trip with respect to a taxi or ride sharing service, an order pizza skill may enable a skill system component(s) 425 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 420 may be configured with a skill component 954 dedicated to interacting with the skill system component(s) 425. Unless expressly stated otherwise, reference to a skill, skill device, or skill component may include a skill component 954 operated by the system component(s) 420 and/or skill operated by the skill system component(s) 425. Moreover, the functionality described herein as a skill or skill may be referred to using many different terms, such as an action, bot, app, or the like. The skill component 954 and or skill system component(s) 425 may return output data to the orchestrator component 930.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 980. The TTS component 980 may generate audio data (e.g., synthesized speech) from text data using one or more different methods. Text data input to the TTS component 980 may come from a skill component 954, the orchestrator component 930, or another component of the system. In one method of synthesis called unit selection, the TTS component 980 matches text data against a database of recorded speech. The TTS component 980 selects matching units of recorded speech and concatenates the units together to form audio data. In another method of synthesis called parametric synthesis, the TTS component 980 varies parameters such as frequency, volume, and noise to create audio data including an artificial speech waveform. Parametric synthesis uses a computerized voice generator, sometimes called a vocoder.

The user device 410 may include still image and/or video capture components such as a camera or cameras to capture one or more images. The user device 410 may include circuitry for digitizing the images and/or video for transmission to the system component(s) 420 as image data. The user device 410 may further include circuitry for voice command-based control of the camera, allowing a user 405 to request capture of image or video data. The user device 410 may process the commands locally or send audio data 911 representing the commands to the system component(s) 420 for processing, after which the system component(s) 420 may return output data that can cause the user device 410 to engage its camera.

The system component(s) 420 may include a user recognition component 995 that recognizes one or more users using a variety of data. The user recognition component 995 may take as input the audio data 911 and/or text data output by the ASR component 950. The user recognition component 995 may perform user recognition by comparing audio characteristics in the audio data 911 to stored audio characteristics of users. The user recognition component 995 may also perform user recognition by comparing biometric data (e.g., fingerprint data, iris data, etc.), received by the system in correlation with the present user input, to stored biometric data of users assuming user permission and previous authorization. The user recognition component 995 may further perform user recognition by comparing image data (e.g., including a representation of at least a feature of a user), received by the system in correlation with the present user input, with stored image data including representations of features of different users. The user recognition component 995 may perform additional user recognition processes, including those known in the art.

The user recognition component 995 determines scores indicating whether user input originated from a particular user. For example, a first score may indicate a likelihood that the user input originated from a first user, a second score may indicate a likelihood that the user input originated from a second user, etc. The user recognition component 995 also determines an overall confidence regarding the accuracy of user recognition operations.

Output of the user recognition component 995 may include a single user identifier corresponding to the most likely user that originated the user input. Alternatively, output of the user recognition component 995 may include an N-best list of user identifiers with respective scores indicating likelihoods of respective users originating the user input. The output of the user recognition component 995 may be used to inform processing of the arbitrator component 982, the orchestrator component 930, and/or the LLM orchestrator component 130 as well as processing performed by other components of the system.

The system component(s) 420/user device 410 may include a presence detection component that determines the presence and/or location of one or more users using a variety of data.

The system 100 (either on user device 410, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 970 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 410, the user profile (associated with the presented login information) may be updated to include information about the user device 410, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 970 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 970 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 9 may be illustrated as part of system component(s) 420, user device 410, or otherwise, the components may be arranged in other device(s) (such as in user device 410 if illustrated in system component(s) 420 or vice-versa, or in other device(s) altogether) without departing from the disclosure.

In at least some embodiments, the system component(s) may receive the audio data 911 from the user device 410, to recognize speech corresponding to a spoken input in the received audio data 911, and to perform functions in response to the recognized speech. In at least some embodiments, these functions involve sending directives (e.g., commands), from the system component(s) to the user device 410 (and/or other devices 410) to cause the user device 410 to perform an action, such as output an audible response to the spoken input via a loudspeaker(s), and/or control secondary devices in the environment by sending a control command to the secondary devices.

Thus, when the user device 410 is able to communicate with the system component(s) over the network(s) 499, some or all of the functions capable of being performed by the system component(s) may be performed by sending one or more directives over the network(s) 499 to the user device 410, which, in turn, may process the directive(s) and perform one or more corresponding actions. For example, the system component(s), using a remote directive that is included in response data (e.g., a remote response), may instruct the user device 410 to output an audible response (e.g., using TTS processing performed by an on-device TTS component) to a user's question via a loudspeaker(s) of (or otherwise associated with) the user device 410, to output content (e.g., music) via the loudspeaker(s) of (or otherwise associated with) the user device 410, to display content on a display of (or otherwise associated with) the user device 410, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 405 as part of a shopping function, establishing a communication session (e.g., a video call) between the user 405 and another user, and so on.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems may recognize, retain, and use information collected during more than one input during a back-and-forth or "multi-turn" interaction with the user; for example, information regarding a language in which a dialog is being conducted.

The system(s) 100 may include a dialog manager component 1072 that manages and/or tracks a dialog between a user and a device, and in some cases between the user and one or more system component(s) 420. The dialog manager component 1072 may associate a dialog session identifier with the dialog upon identifying that the user is engaging in a dialog with the user. The dialog manager component 1072 may track a user input and the corresponding system generated response to the user input as a turn. The dialog session identifier may correspond to multiple turns of user input and corresponding system generated response. The dialog manager component 1072 may transmit data identified by the dialog session identifier directly to the orchestrator component 930, the LLM orchestrator component 130 and/or other components of the system 100. Depending on system configuration the dialog manager component 1072 may determine the appropriate system generated response to give to a particular utterance or user input of a turn. Or creation of the system generated response may be managed by another component of the system (e.g., the orchestrator component 930, the LLM orchestrator component 130, etc.) while the dialog manager component 1072 selects the appropriate responses. Alternatively, another component of the system component(s) 420 may select responses using techniques discussed herein. The text of a system generated response may be sent to a TTS component 980 for creation of audio data corresponding to the response. The audio data may then be sent to a user device (e.g., device 410) for ultimate output to the user. Alternatively (or in addition) a dialog response may be returned in text or some other form.

The dialog manager component 1072 may receive the ASR hypothesis/hypotheses (i.e., text data) and make a semantic interpretation of the phrase(s) or statement(s) represented therein. That is, the dialog manager component 1072 determines one or more meanings associated with the phrase(s) or statement(s) represented in the text data based on words represented in the text data. The dialog manager component 1072 determines a goal corresponding to an action that a user desires be performed as well as pieces of the text data that allow a device (e.g., the user device 410, the system component(s) 420, a skill component 954, a skill processing component(s) 425, etc.) to execute the intent. If, for example, the text data corresponds to "what is the weather," the dialog manager component 1072 may determine that that the system component(s) 420 is to output weather information associated with a geographic location of the device 410. In another example, if the text data corresponds to "turn off the lights," the dialog manager component 1072 may determine that the system component(s) 420 is to turn off lights associated with the user device(s) 410 or the user(s) 405.

The dialog manager component 1072 may send the results data to one or more skill component(s) 954. If the results data includes a single hypothesis, the orchestrator component 930 may send the results data to the skill component(s) 954 associated with the hypothesis. If the results data includes an N-best list of hypotheses, the orchestrator component 930 may send the top scoring hypothesis to a skill component(s) 954 associated with the top scoring hypothesis.

Figure 10:
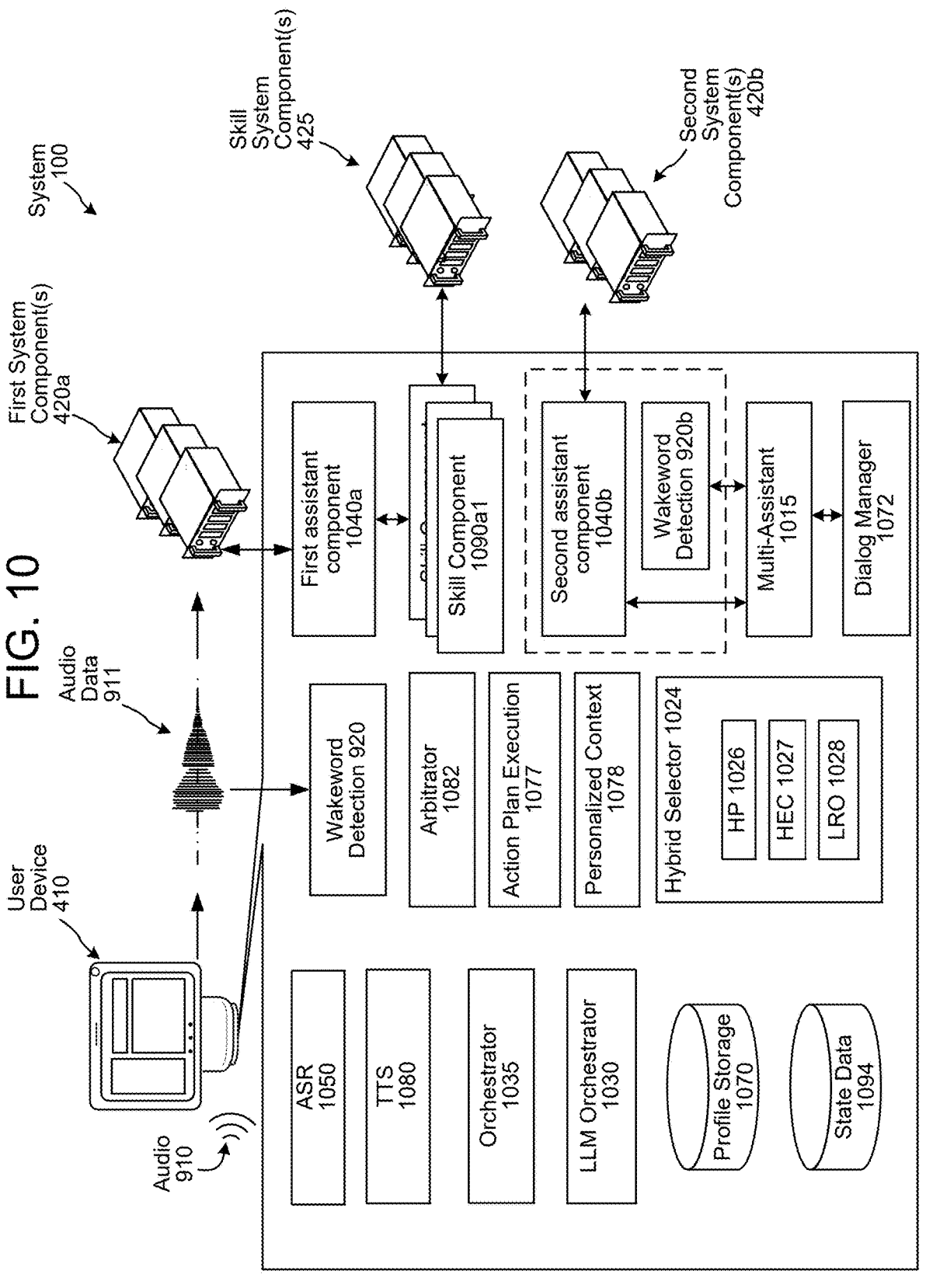
FIG. 10 is a conceptual diagram illustrating components that may be included in a device, according to embodiments of the present disclosure.

Although the components of FIG. 9 may be illustrated as part of system component(s) 420, device 410, or otherwise, the components may be arranged in other device(s) (such as in device 410 if illustrated in system component(s) 420 or vice-versa, or in other device(s) altogether) without departing from the disclosure. FIG. 10 illustrates such a configured device 410.

The device may include one or more assistant components 1040 including the first assistant component 1040a and the second assistant component 1040b. The assistant component(s) 1040 may interface with one or more of the system component(s) 420. In the example system 100 shown in FIG. 10, the first assistant component 1040*a* communicates with the first system component(s) 420*a*, and the second assistant component 1040*b* communicates with the second system component(s) 420*b*. In some implementations, a single assistant component 1040 may handle communications with more than one system component(s) 420. The user device 410 may have a dedicated assistant component 1040 for a system component(s) 420, or a single assistant component 1040 communicating with all system component(s) 420. The device may include a multi-assistant component 1015 for managing multi-assistant and cross-assistant operations of the user device 410 as described herein. The device may also include a set of components to store/track state data 1094. (As noted below, state data 1094 can be separately tracked and maintained by each assistant component 1040 as well as by the multi-assistant component 1015.) Such state data 1094 may indicate the state of the user device 410 (and/or a user profile corresponding to the user device 410) and may correspond to one or more processes of the device. Examples of state data may include volume level, data indicating what is being shown on a display, time data, network access data, timer status, or the like. The state data 1094 may be stored on the user device 410 or potentially on another device such as a remote device, home server, or the like.

In certain configurations, to maintain privacy perception and/or other separation between speech-processing systems, a first assistant component 1040*a* may not be configured to communicate with a second assistant component 1040*b* without routing the communication through the multi-assistant component 1015. In this way the multi-assistant component 1015 may mediate the interactions between the speech-processing system components. Similarly, the multi-assistant component 1015 (or other remote/cloud component) may mediate communications between the first system component(s) 420*a* and the second system component(s) 420*b*. Thus speech-processing systems may not be configured to directly communicate, particularly when such communications may involve a particular utterance being processed. While illustrated to operate physically on user device 410, the multi-assistant component 1015 may operate on a different physical device, for example a home server or the like. In such (or other) situations the multi-assistant component 1015 may coordinate multi-assistant operations for multiple user devices 410, where such user devices 410 may be associated with one or more user accounts. For example, a single multi-assistant component 1015 may coordinate multi-assistant operations for multiple device(s) associated with a particular user/user profile, family/family profile/ multiple user profile(s), or the like.

As part of such separation, in certain configurations, each speech-processing system and/or components associated therewith, may store/manage their own state data 1094 with respect to the device. For example, a first assistant component 1040*a* associated with first system component(s) 420*a* may store/manage state data 1094*a* which includes data regarding interactions/operations with regard to the user device 410 (and/or a user profile associated with user device 410) and first system component(s) 420*a*. For example, if a user interacts with user device 410 to invoke first system component(s) 420*a* (for example by speaking a first wakeword associated with first system component(s) 420*a*), the first assistant component 1040*a* may save certain information regarding the interaction between user device 410 and first system component(s) 420*a* as state data 1094*a*. Thus, if a device process is initiated as a result of a command to first system component(s) 420*a*, the first assistant component 1040*a* may store information regarding that device process as state data 1094*a*. For example, if a user starts a timer by invoking a first assistant associated with first system component(s) 420*a*, the state data 1094*a* may reflect the start time of the timer, time remaining, label associated with the timer, etc. In another example, if a user starts to play music by invoking a first assistant associated with first system component(s) 420*a*, the state data 1094*a* may reflect the start of the music, the source of the music content (e.g., music service), information about currently playing music, information about previously played music, etc.

A second assistant component 1040*b* may also store/ manage its own state data 1094*b* with respect to interactions/ operations with regard to the user device 410 (and/or a user profile associated with user device 410) and second system component(s) 420*b*. Such management of state data 1094*b* with regard to second system component(s) 420*b* may operate similarly to that described above with regard to state data 1094*a* and first system component(s) 420*a*. As part of the separation of systems, however, first assistant component 1040*a* may not have access to state data 1094*b* and second assistant component 1040*b* may not have access to state data 1094*a*. Thus each system/assistant component may only track state data 1094 with respect to its own operations.

Certain state data 1094 may also be stored/managed by multi-assistant component 1015. Such state data may include information related to device processes ongoing at the device and may include some portion(s) of information stored in state data 194*a*/194*b* and/or other information about management of device processes. For example, if a timer is ongoing, state data may include an indicator that the timer is ongoing and the system component(s) 420 that was used to invoke the timer, but may not include as many details of the timer as the state data 1094 of the invoking system. Similarly, if music is being output, state data may indicate that music is being played but may not include all the details of the music playback. State data may indicate which device process(es) are active at any particular point in time (for example, timer ongoing, timer ended and beeping, music playback ongoing, etc.) State data may indicate which device controls are executable for a particular device process (whether ongoing or not). For example, state data may indicate if a device 410 is capable of stopping, extending, pausing a timer; stopping, pausing, adjusting volume for music playback, etc. State data may also indicate which channels (e.g., hardware components) are currently being used by what process(es), etc. Information may be exchanged between multi-assistant component 1015 and a single assistant component 1040 to update the respective state data(s) and/or execute controls for the user device 410/a device process. For example, an application programming interface (API) or other interface, registration process, etc. may be used to coordinate between the multi-assistant component 1015 and a single assistant component 1040 to exchange information about a state/process of the user device 410.

In the example system 100 shown in FIG. 10, the user device 410 includes the first assistant component 1040*a* and the second assistant component 1040*b*. The first assistant component 1040*a* may be in communication with back-end components of the first system component(s) 420*a* (e.g., via the network 499). The first assistant component 1040*a* may also be in communication with the ASR component 1050, the TTS component 1080, a first wakeword detection component 920a, and/or a hybrid selector 1024. The first system component(s) 420a may be associated with one or more local skill components 954a1, 954a2, and 954a3 (collectively "skill components 954"). The local skill components 954 may be in communication with one or more skill processing component(s) 425. The second assistant component 1040b may be associated with the second system component(s) 420b, which may be a separate computing system separate and remote from the device 410. The first system component(s) 420a and the second system component(s) 420b be configured as described herein; for example, as described with respect to FIG. 9.

The second assistant component 1040b may be logically or otherwise walled off from certain components of the user device 410. For example, the second assistant component 1040b may not be able to communicate directly with the first assistant component 1040a; such communications may need to be mediated by multi-assistant component 1015. The second assistant component 1040b may include or be associated with its own proprietary components. For example, the second assistant component 1040b may be associated with a second wakeword detection component 920b. In addition, the second assistant component 1040b may leverage separate processing/output components, which may reside in the user device 410 or the second system component(s) 420b. The second assistant component 1040b may, however, interface with a multi-assistant component 1015 and/or a dialog manager, which may be shared between the first assistant component 1040a and the second assistant component 1040b.

In some implementations, speech processing of input audio data directed to the first system component(s) 420a may take place on the user device 410. The user device 410 may send a message represented in the input audio data to the second system component(s) 420b without first sending the input audio data to the first system component(s) 420a. For example, the user device 410 may receive the input audio data and detect, with the first wakeword detection component 920a, a wakeword corresponding to the first system component(s) 420a. The ASR component 1050 of the user device 410 may process the input audio data and determine that the input audio data represents a request to generate a message and send the message to the second system component(s) 420b. The first assistant component 1040a may receive the output of the ASR components 1050, and forward it to the multi-assistant component 1015. The first assistant component 1040a may include with the output metadata that indicates that the multi-assistant component 1015 is to forward the output to the second system component(s) 420b (e.g., via the second assistant component 1040b). In some cases, the first assistant component 1040a may send the output to the TTS component 1080 to generate an output in the form of output audio data (e.g., a TTS output) representing the output. The multi-assistant component 1015 may receive the output (or output audio data) and metadata, and determine that the output is to be processed by the second system component(s) 420b. The multi-assistant component 1015 may send the output to the second assistant component 1040b. The second assistant component 1040b may send the output to the second system component(s) 420b. The second system component(s) 420b may process the output by, for example, executing a command represented in the output. The system component(s) 420b may return response data to the device 410; for example, by sending responsive output audio data to the multi-assistant component 1015 for output by a speaker of the device.

In some cases, the multi-assistant component 1015 may determine (for example, based on state data regarding an active dialog that includes the input audio data) that the response data from the second system component(s) 420b is to be translated back into the language of the input audio data. The multi-assistant component 1015 may send the response data to the first system component(s) 420a via the first assistant component 1040a along with an indication that the response data is to be translated. The response data may, for example, be audio data and/or text data. The first system component(s) 420a may return translated response data. The translated response data may be audio data and/or text data. if the translated response data is text data, the multi-assistant component 1015 may send it to the TTS component 1080 for conversion into synthetic speech for output by the user device 410.

In at least some embodiments, the system component(s) 420 may receive the audio data 911 from the user device 410, to recognize speech corresponding to a spoken input in the received audio data 911, and to perform functions in response to the recognized speech. In at least some embodiments, these functions involve sending directives (e.g., commands), from the system component(s) 420 to the user device 410 (and/or other user devices 410) to cause the user device 410 to perform an action, such as output an audible response to the spoken input via a loudspeaker(s), and/or control secondary devices in the environment by sending a control command to the secondary devices.

Thus, when the user device 410 is able to communicate with the system component(s) 420 over the network(s) 499, some or all of the functions capable of being performed by the system component(s) 420 may be performed by sending one or more directives over the network(s) 499 to the user device 410, which, in turn, may process the directive(s) and perform one or more corresponding actions. For example, the system component(s) 420, using a remote directive that is included in response data (e.g., a remote response), may instruct the user device 410 to output an audible response (e.g., using TTS processing performed by an on-device TTS component 1080) to a user's question via a loudspeaker(s) of (or otherwise associated with) the user device 410, to output content (e.g., music) via the loudspeaker(s) of (or otherwise associated with) the user device 410, to display content on a display of (or otherwise associated with) the user device 410, and/or to send a directive to a secondary device (e.g., a directive to turn on a smart light). It is to be appreciated that the system component(s) 420 may be configured to provide other functions in addition to those discussed herein, such as, without limitation, providing step-by-step directions for navigating from an origin location to a destination location, conducting an electronic commerce transaction on behalf of the user 405 as part of a shopping function, establishing a communication session (e.g., a video call) between the user 405 and another user, and so on.

The user device 410 may include one or more wakeword detection components 920 (and/or 920a and/or 920b) configured to compare the audio data 911 to stored models used to detect a wakeword (e.g., "Alexa") that indicates to the user device 410 that the audio data 911 is to be processed for determining NLU output data (e.g., slot data that corresponds to a named entity, label data, and/or intent data, etc.). In at least some embodiments, a hybrid selector 1024, of the user device 410, may send the audio data 911 to the wakeword detection component 920a. If the wakeword detection component 920a detects a wakeword in the audio data 911, the wakeword detection component 920a may send an indication of such detection to the hybrid selector 1024. In response to receiving the indication, the hybrid selector 1024 may send the audio data 911 to the system component(s) 420 and/or the ASR component 950. The wakeword detection component 920a may also send an indication, to the hybrid selector 1024, representing a wakeword was not detected. In response to receiving such an indication, the hybrid selector 1024 may refrain from sending the audio data 911 to the system component(s) 420, and may prevent the ASR component 950 from further processing the audio data 911. In this situation, the audio data 911 can be discarded.

The user device 410 may conduct its own speech processing using on-device language processing components, such as an ASR component 950, similar to the manner discussed herein with respect to the ASR component 950 of the system component(s) 420. The ASR component 950 may operate similarly to ASR component 950. The user device 410 may also internally include, or otherwise have access to, other components such as one or more skill components 954 capable of executing commands based on results determined by the user device 410/system component(s) 420 (which may operate similarly to skill components 954), profile storage 1070 (configured to store similar profile data to that discussed herein with respect to the profile storage 970 of the system component(s) 420), LLM orchestrator component 1030 (which may operate similarly to the LLM orchestrator component 130), orchestrator component 1035 (which may operate similarly to the orchestrator component 930), action plan execution component 1077 (which may operate similarly to the action plan execution component 150), personality context component 1078 (which may operate similarly to the personalized context component 465), arbitrator component 1082 (which may operate similarly to the arbitrator component 982), or other components. In at least some embodiments, the profile storage 1070 may only store profile data for a user or group of users specifically associated with the device 410. Similar to as described above with respect to skill component 954, a skill component 954 may communicate with a skill processing component(s) 425. The user device 410 may also have its own TTS component 1080. The TTS component 1080 may operate similarly to TTS component 980.

In at least some embodiments, the on-device ASR component 1050 may not have the same capabilities as the ASR component 950 of the system component(s) 420. For example, the on-device ASR component 1050 may be configured to handle only a subset of the natural language user inputs that may be handled by the system component(s) 420. For example, such subset of natural language user inputs may correspond to local-type natural language user inputs, such as those controlling devices or components associated with a user's home. In such circumstances the on-device ASR component 1050 may be able to more quickly interpret and respond to a local-type natural language user input, for example, than processing that involves the system component(s) 420. If the user device 410 attempts to process a natural language user input for which the on-device ASR component 1050 is not necessarily best suited, the ASR results determined by the user device 410 may indicate a low confidence or other metric indicating that the processing by the user device 410 may not be as accurate as the processing done by the system component(s) 420.

The hybrid selector 1024, of the user device 410, may include a hybrid proxy (HP) 1026 configured to proxy traffic to/from the system component(s) 420. For example, the HP 1026 may be configured to send messages to/from a hybrid execution controller (HEC) 1027 of the hybrid selector 1024. For example, command/directive data received from the system component(s) 420 can be sent to the HEC 1027 using the HP 1026. The HP 1026 may also be configured to allow the audio data 911 to pass to the system component(s) 420 while also receiving (e.g., intercepting) this audio data 911 and sending the audio data 911 to the HEC 1027.

In at least some embodiments, the hybrid selector 1024 may further include a local request orchestrator (LRO) 1028 configured to notify the ASR component 1050 about the availability of new audio data 911 that represents user speech, and to otherwise initiate the operations of local language processing when new audio data 911 becomes available. In general, the hybrid selector 1024 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 410 receives directive data from the system component(s) 420 and chooses to use that remotely-determined directive data.

Thus, when the audio data 911 is received, the HP 1026 may allow the audio data 911 to pass through to the system component(s) 420 and the HP 1026 may also input the audio data 911 to the on-device ASR component 1050 by routing the audio data 911 through the HEC 1027 of the hybrid selector 1024, whereby the LRO 1028 notifies the ASR component 1050 of the audio data 911. At this point, the hybrid selector 1024 may wait for response data from either or both of the system component(s) 420 or the local language processing components. However, the disclosure is not limited thereto, and in some examples the hybrid selector 1024 may send the audio data 911 only to the local ASR component 1050 without departing from the disclosure. For example, the user device 410 may process the audio data 911 locally without sending the audio data 911 to the system component(s) 420.

The local ASR component 1050 is configured to receive the audio data 911 from the hybrid selector 1024, and to recognize speech in the audio data 911, and the local NLU component is configured to determine a user intent from the recognized speech, and to determine how to act on the user intent by generating NLU output data which may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 499. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component) may be selected as usable to respond to a natural language user input, and local response data may be sent (e.g., local NLU output data, local knowledge base information, internet search results, and/or local directive data) to the hybrid selector 1024, such as a "ReadyToExecute" response. The hybrid selector 1024 may then determine whether to use directive data from the on-device components to respond to the natural language user input, to use directive data received from the system component(s) 420, assuming a remote response is even received (e.g., when the user device 410 is able to access the system component(s) 420 over the network(s) 499), or to determine output audio requesting additional information from the user 405.

The user device 410 and/or the system component(s) 420 may associate a unique identifier with each natural language user input. The user device 410 may include the unique identifier when sending the audio data 911 to the system component(s) 420, and the response data from the system component(s) 420 may include the unique identifier to identify which natural language user input the response data corresponds.

In at least some embodiments, the user device 410 may include, or be configured to use, one or more skill components 954 that may work similarly to the skill component(s) 954 implemented by the system component(s) 420. The skill component(s) 954 may correspond to one or more domains that are used in order to determine how to act on a spoken input in a particular way, such as by outputting a directive that corresponds to the determined intent, and which can be processed to implement the desired operation. The skill component(s) 954 installed on the user device 410 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 410 may be in communication with one or more skill processing component(s) 425. For example, a skill processing component(s) 425 may be located in a remote environment (e.g., separate location) such that the user device 410 may only communicate with the skill processing component(s) 425 via the network(s) 499. However, the disclosure is not limited thereto. For example, in at least some embodiments, a skill processing component(s) 425 may be configured in a local environment (e.g., home server and/or the like) such that the device 410 may communicate with the skill processing component(s) 425 via a private network, such as a local area network (LAN).

As used herein, a "skill" may refer to a skill component 954/1054, a skill processing component(s) 425, or a combination of a skill component 954/1054 and a corresponding skill processing component(s) 425. Similar to the manner discussed herein, the local user device 410 may be configured to recognize multiple different wakewords and/or perform different categories of tasks depending on the wakeword. Such different wakewords may invoke different processing components of local user device 410 (not illustrated in FIG. 10). For example, detection of the wakeword "Alexa" by the wakeword detection component 920a may result in sending audio data to certain TTS components 1080/skill components 954 for processing while detection of the wakeword "Computer" by the wakeword detector may result in sending audio data different language processing components 1080/skill components 954 for processing.

Figure 11:
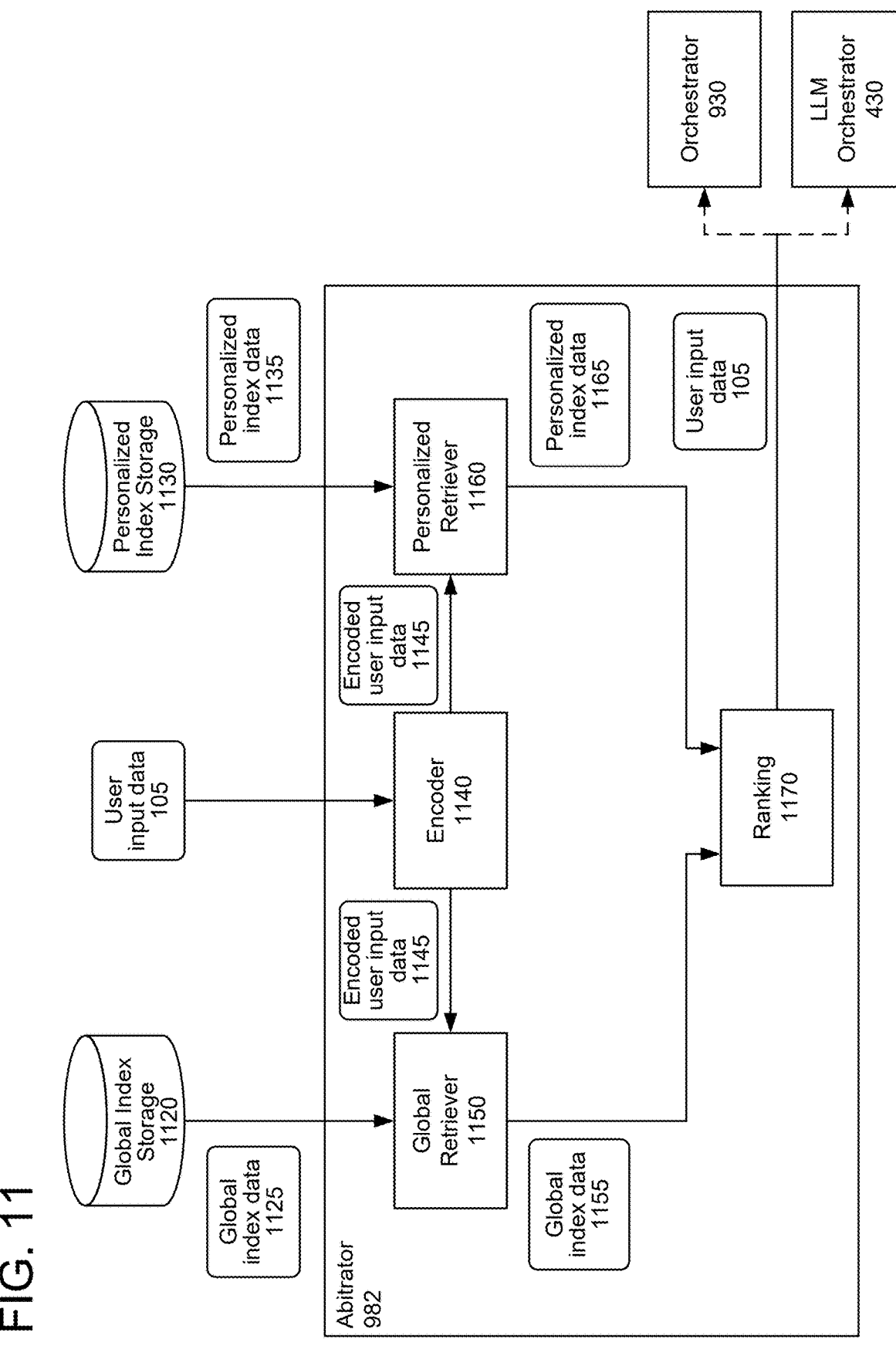
FIG. 11 is a conceptual diagram illustrating example processing of an arbitrator component of the system, according to embodiments of the present disclosure.

FIG. 11 illustrates example components and processing of the arbitrator component 982. As shown in FIG. 11, the arbitrator component 982 may include an encoder component 1140, a global retriever component 1150, a personalized retriever component 1160, and a ranking component 1170. The arbitrator component 982 may be in communication with a global index storage 1120 and a personalized index storage 1130. The arbitrator component 982 may be configured to perform retrieval-based techniques based on a semantic vectorized representation of a user input and historical user inputs received by the system 100 over a period of time (e.g., past 30 days) to determine whether the orchestrator component 930 or the LLM orchestrator component 430 or both of them should process with respect to the user input.

The user input data 105 may be received at the encoder component 1140 of the arbitrator component 982. The encoder component 1140 may process the user input data 105 to generate encoded user input data 1145 represented an encoded representation of the user input data 105 (e.g., a vectorized representation of the user input). The encoder component may send the encoded user input data 1145 to the global retriever component 1150 and the personalized retriever component 1160. In some embodiments, the encoder component 1140 may be trained using techniques associated with Deep Structured Semantic Models (DSSM).

The global retriever component 1150 is configured to determine one or more historical user inputs that are similar to the user input data 105. The global retriever component 1150 queries a global index storage 1120 for global index data 1125 representing one or more historical user inputs that are semantically similar to the user input data 105. The global retriever component 1150 may include one or more historical user inputs received from various users over a period of time (e.g., 30 days). In some embodiments, the global index data 1125 may correspond to an encoded representation(s) of the historical user input(s). In such embodiments, the one or more historical user inputs that are semantically similar to the user input data 105 may be determined based on comparing the encoded user input data 1145 to the encoder representation(s) of the historical user input(s) (e.g., to determine a cosine similarity). The global retriever component 1150 may send the global index data 1125 to the ranking component 1170.

The personalized retriever component 1160 is configured to determine one or more historical user inputs that are similar to the user input data 105, where the one or more historical user inputs are associated with the user 405 that provided the user input corresponding to the user input data 105. The personalized retriever component 1160 queries a personalized index storage 1130 for personalized index data 1135 representing one or more historical user inputs that are semantically similar to the user input data 105 and were provided by the same user that provided the user input corresponding to the user input data 105. The personalized retriever component 1160 may include one or more historical user inputs received from the user corresponding to the user input data 105 over a period of time (e.g., 30 days). In some embodiments, the personalized index data 1135 may correspond to an encoded representation(s) of the historical user input(s). In such embodiments, the one or more historical user inputs that are semantically similar to the user input data 105 may be determined based on comparing the encoded user input data 1145 to the encoder representation (s) of the historical user input(s) (e.g., to determine a cosine similarity). The personalized retriever component 1160 may send the personalized index data 1135 to the ranking component 1170.

In some embodiments, the global index storage 1120 and/or the personalized index storage 1130 may further include metadata associated with the historical user inputs, which may be further included in the global index data 1125 and/or the personalized index data 1135. For example, the global index storage 1120 and/or the personalized index storage 1130 may further include a user satisfaction associated with a system-generated response to the user input, a value representing how many times the user input was received during the time period, a domain (e.g., routine, smart home, shopping, weather, etc.), etc.

In some embodiments, the global retriever component 1150 and/or the personalized retriever component 1160 may retrieve the global index data 1125 and/or the personalized index data 1135 semantically similar to the encoded user input data 1145 using Maximum Inner Product Search Solution.

The ranking component 1170 may process the global index data 1155 and the personalized index data 1165 to determine whether to send the user input data 105 to the orchestrator component 930 and/or the LLM orchestrator component 430. In some embodiments, the ranking component 1170 may make such a determination based on the metadata included in the global index data 1155 and/or the personalized index data 1165. In some embodiments, the ranking component 1170 may be a rule-based component. In other embodiments, the ranking component 1170 may be an ML-based component (e.g., a decision tree, a classifier, an LLM, etc.). In embodiments where the ranking component 1170 is an LLM, the ranking component 1170 may be further configured to determine if there the user input is ambiguous, in which case the ranking component 1170 may generate a request for additional information to resolve the ambiguity.

In some embodiments, after determining that the orchestrator component 930 and/or the LLM orchestrator component 430 should process with respect to the user input data 105, the ranking component 1170 may be configured to periodically determine whether the orchestrator component 930 and/or the LLM orchestrator component 430 should continue processing with respect to the user input data 105. For example, after a particular point in the processing of the orchestrator component 930 (e.g., after performing NLU, prior to determining a skill component 954 to process with respect to the user input data 105, prior to performing an action responsive to the user input, etc.) and/or the LLM orchestrator component 430 (e.g., after selecting a task to be completed, after receiving the action response data from the one or more components, after completing a task, prior to performing an action responsive to the user input, etc.) the orchestrator component 930 and/or the LLM orchestrator component 430 may query the arbitrator component 982 has determined that the orchestrator component 930 and/or the LLM orchestrator component 430 should halt processing with respect to the user input data 105. As discussed above, the system 100 may be configured to stream portions of data associated with processing with respect to a user input to the one or more components such that the one or more components may begin performing their configured processing with respect to that data as soon as it is available to the one or more components. As such, the arbitrator component 982 may cause the orchestrator component 930 and/or the LLM orchestrator component 430 to begin processing with respect to a user input as soon as a portion of data associated with the user input data 105 is available (e.g., the ASR data, context data, output of the user recognition component 995. Thereafter, once the arbitrator component 982 has enough data to perform the processing described herein above to determine whether the orchestrator component 930 and/or the LLM orchestrator component 430 is to process with respect to the user input, the arbitrator component 982 may inform the corresponding component (e.g., the orchestrator component 930 and/or the LLM orchestrator component 430) to continue/halt processing with respect to the user input at one of the logical checkpoints in the processing of the orchestrator component 930 and/or the LLM orchestrator component 430.

In some embodiments, the orchestrator component 930 and/or the LLM orchestrator component 430 may periodically confirm that they are to continue processing with respect to the user input. For example, the arbitrator component 982 may be further configured to periodically receive data generated by the orchestrator component 930 and/or the LLM orchestrator component 430 during processing with respect to the user input and determine whether the orchestrator component 930 and/or the LLM orchestrator component 430 should continue processing. The arbitrator component 982 may receive such data at logical checkpoints in the processing of the orchestrator component 930 (e.g., after completion of ASR processing, after completion of natural language understanding processing, after selection of a skill component to process with respect to the user input and prior to initiation of processing by the skill component, or prior to the processing of any component discussed herein with respect to the orchestrator component 930.) and/or the LLM orchestrator component 430 (e.g., prior to processing of the LLM shortlister component 440, prior to beginning processing with respect to a subsequent task, or prior to the processing of any other component discussed herein above with respect to the LLM orchestrator component 430). The arbitrator component 982 may be configured to process as described herein above to compare the received data to data associated with processing of a previous user input. This may allow the arbitrator component 982 to make a more informed determination (e.g., based on the additional data determined during processing of the orchestrator component 930 and/or the LLM orchestrator component 430) as to which component(s) should process the user input. In some embodiments, the data may be received at another component of the system 100 configured to process as described herein.

In some embodiments, after sending the data to the arbitrator component 982, the orchestrator component 930 and/or the LLM orchestrator component 430 may temporarily suspend processing with respect to the user input until they receive data from the arbitrator component 982 confirming that they are to continue processing with respect to the user input. As discussed above, in some embodiments, the LLM orchestrator component 430 may send the data to the arbitrator component 982 prior to the processing of the LLM shortlister component 440. In some embodiments, the LLM orchestrator component 430 may further include a component configured to process the task processing data output by the task generation component 435 (e.g., the task data 437) to determine whether completion of the current task will result in a real-world action (e.g., a change in the state of a device, such as turning on a light, changing a channel on a television, changing a temperature value on a thermostat, locking a door, etc.). If the component determines that completion of the current task will result in a real-world action, then the LLM orchestrator component 430 may temporarily suspend its processing prior to the processing of the LLM shortlister component 440. If the component determines that completion of the current task will not result in a real-world action, then the LLM orchestrator component 430 may begin processing of the LLM shortlister component 440, rather than temporarily suspending processing. In some embodiments, the orchestrator component 930 may include a similarly configured component.

Figure 12:
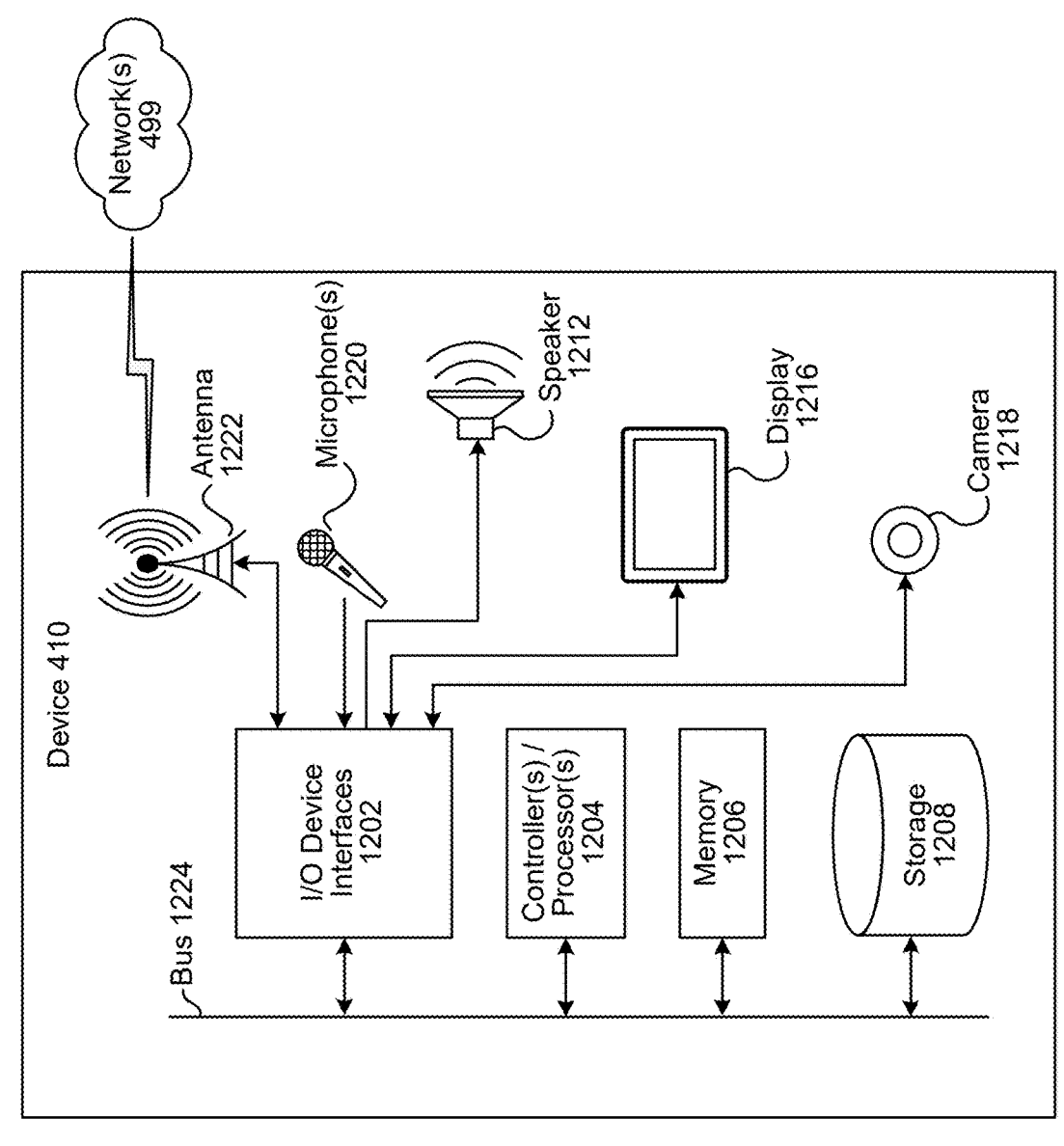
FIG. 12 is a block diagram conceptually illustrating example components of a device, according to embodiments of the present disclosure.

FIG. 12 is a block diagram conceptually illustrating a user device 410 that may be used with the system. FIG. 13 is a block diagram conceptually illustrating example components of a remote device, such as the natural language command processing system component(s), which may assist with ASR processing, NLU processing, etc., and a skill system component(s) 425. A system (420/425) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 410 may operate locally to a user (e.g., within a same environment so the device may receive inputs and playback outputs for the user) the server/system component(s) may be located remotely from the user device 410 as its operations may not require proximity to the user. The server/system component(s) may be located in an entirely different location from the user device 410 (for example, as part of a cloud computing system or the like) or may be located in a same environment as the user device 410 but physically separated therefrom (for example a home server or similar device that resides in a user's home or business but perhaps in a closet, basement, attic, or the like). The system component(s) 420 may also be a version of a user device 410 that includes different (e.g., more) processing capabilities than other user device(s) 410 in a home/office. One benefit to the server/system component(s) being in a user's home/business is that data used to process a command/return a response may be kept within the user's home, thus reducing potential privacy concerns.

Multiple system components (420/425) may be included in the overall system 100 of the present disclosure, such as one or more natural language processing system component(s) 420 for performing ASR processing, one or more natural language processing system component(s) 420 for performing NLU processing, one or more skill system component(s) 425, etc. In operation, each of these systems may include computer-readable and computer-executable instructions that reside on the respective device (420/425), as will be discussed further below.

Each of these devices (410/420/425) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random-access memory (RAM), non-volatile read only memory (ROM), non-volatile magnetoresistive memory (MRAM), and/or other types of memory. Each device (410/420/425) may also include a data storage component (1208/1308) for storing data and controller/processor-executable instructions. Each data storage component (1208/1308) may individually include one or more non-volatile storage types such as magnetic storage, optical storage, solid-state storage, etc. Each device (410/420/425) may also be connected to removable or external non-volatile memory and/or storage (such as a removable memory card, memory key drive, networked storage, etc.) through respective input/output device interfaces (1202/1302).

Computer instructions for operating each device (410/420/425) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (410/420/425) includes input/output device interfaces (1202/1302). A variety of components may be connected through the input/output device interfaces (1202/1302), as will be discussed further below. Additionally, each device (410/420/425) may include an address/data bus (1224/1324) for conveying data among components of the respective device. Each component within a device (410/420/425) may also be directly connected to other components in addition to (or instead of) being connected to other components across the bus (1224/1324).

Referring to FIG. 12, the user device 410 may include input/output device interfaces 1202 that connect to a variety of components such as an audio output component such as a speaker 1212, a wired headset or a wireless headset (not illustrated), or other component capable of outputting audio. The user device 410 may also include an audio capture component. The audio capture component may be, for example, a microphone 1220 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 410 may additionally include a display 1216 for displaying content. The user device 410 may further include a camera 1218.

Via antenna(s) 1222, the input/output device interfaces 1202 may connect to one or more networks 499 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 499, the system may be distributed across a networked environment. The I/O device interface (1202/1002) may also include communication components that allow data to be exchanged between devices such as different physical servers in a collection of servers or other components.

The components of the device(s) 410, the natural language command processing system component(s), or a skill system component(s) 425 may include their own dedicated processors, memory, and/or storage. Alternatively, one or more of the components of the device(s) 410, the natural language command processing system component(s), or a skill system component(s) 425 may utilize the I/O interfaces (1202/1302), processor(s) (1204/1304), memory (1206/1306), and/or storage (1208/1308) of the device(s) 410, natural language command processing system component(s), or the skill system component(s) 425, respectively. Thus, the ASR component 950 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 410, the natural language command processing system component(s), and a skill system component(s) 425, as described herein, are illustrative, and may be located as a stand-alone device or may be included, in whole or in part, as a component of a larger device or system. As can be appreciated, a number of components may exist either on a system component(s) and/or on user device 410. For example, ASR component 950/1050 and TTS component 880/1080), etc., for example as illustrated in FIGS. 9 and 10. Unless expressly noted otherwise, the system version of such components may operate similarly to the device version of such components and thus the description of one version (e.g., the system version or the local version) applies to the description of the other version (e.g., the local version or system version) and vice-versa.

Figure 14:
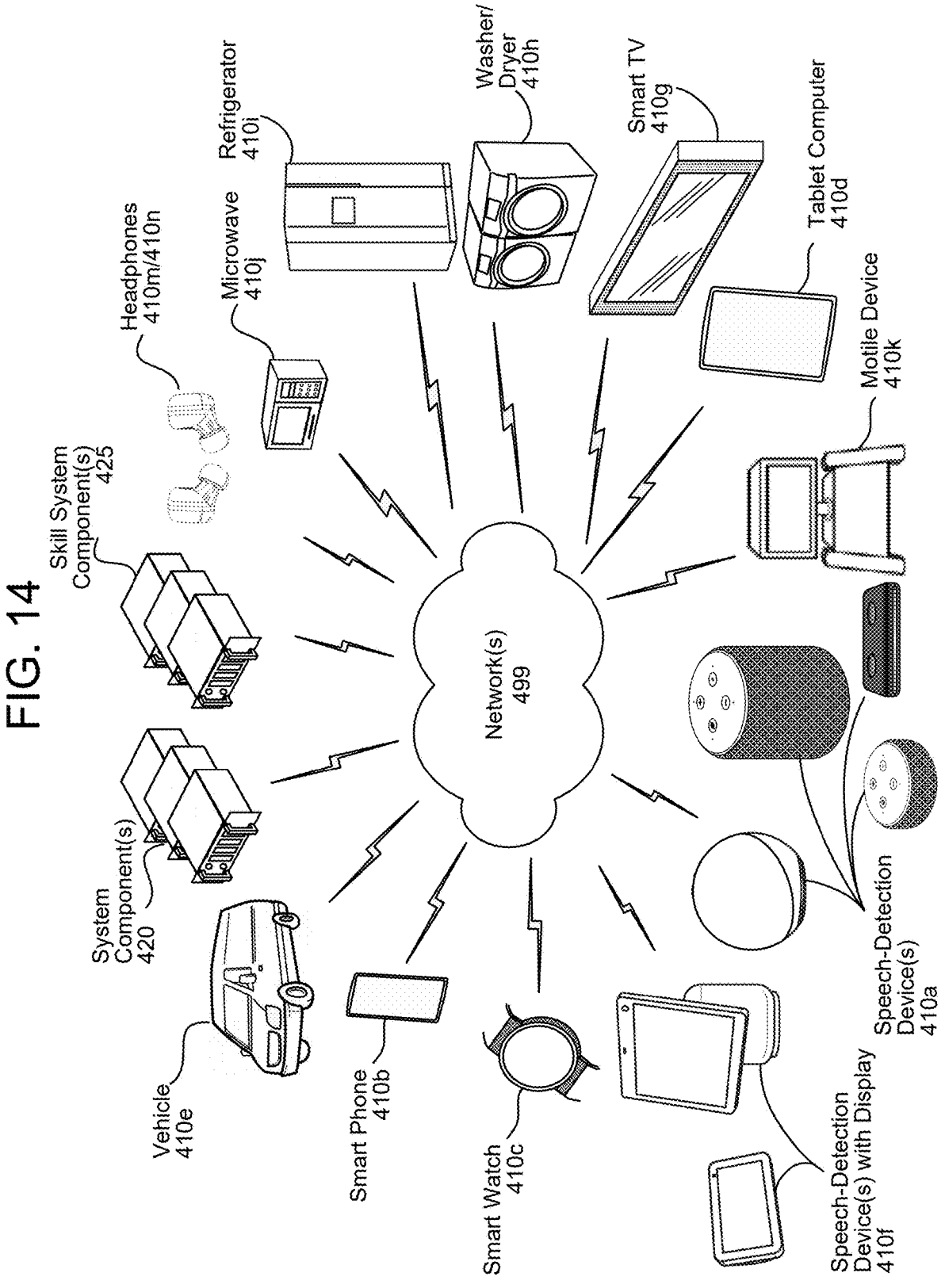
FIG. 14 illustrates an example of a computer network for use with the overall system, according to embodiments of the present disclosure.

As illustrated in FIG. 14, multiple devices (410*a*-410*n*, 420, 425) may contain components of the system and the devices may be connected over a network(s) 499. The network(s) 499 may include a local or private network or may include a wide network such as the Internet. Devices may be connected to the network(s) 499 through either wired or wireless connections. For example, a speech-detection device 410*a*, a smart phone 410*b*, a smart watch 410*c*, a tablet computer 410*d*, a vehicle 410*e*, a speech-detection device with display 410*f*, a display/smart television 410*g*, a washer/dryer 410*h*, a refrigerator 410*i*, a microwave 410*j*, autonomously motile device 410*k* (e.g., a robot), etc., may be connected to the network(s) 499 through a wireless service provider, over a Wi-Fi or cellular network connection, or the like. Other devices are included as network-connected support devices, such as the natural language command processing system component(s) 420, the skill system component(s) 425, and/or others. The support devices may connect to the network(s) 499 through a wired connection or wireless connection. Networked devices may capture audio using one-or-more built-in or connected microphones or other audio capture devices, with processing performed by ASR components, NLU components, or other components of the same device or another device connected via the network(s) 499, such as the ASR component 950, etc. of the natural language command processing system component(s) 420.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first natural language input data corresponding to a first user input;
   determining first user profile data associated with the first user input;

processing the first natural language input data and the first user profile data to select first personality data associated with the first user input, the first personality data representing a first personality type, the first personality type including at least a first personality characteristic;

processing the first natural language input data, the first user profile data, and the first personality data to generate first prompt data, the first prompt data corresponding to a first natural language directive for a large language model (LLM) to generate a first response to the first user input, wherein the first response is associated with the first personality data;

processing, using the LLM, the first prompt data to generate first model output data, the first model output data indicating that a first component is to generate first data corresponding to a response to the first user input;

based on the first model output data, causing the first component to generate first natural language data associated with the first user input;

processing, using the LLM, the first prompt data and the first natural language data to generate second model output data, the second model output data including second natural language data responsive to the first user input, wherein the second natural language data corresponds to the first personality data;

processing the second model output data to generate the first output data responsive to the first user input; and causing presentation of the first output data.

2. The computer-implemented method of claim 1, wherein the first component is associated with the first personality type, and the method further comprises:

based on the first personality data representing the first personality type and the first component being associated with the first personality type, sending, to the first component, the first user input, the first user profile data, and the first personality data; and processing, by the first component, the first user input, the first user profile data, and the first personality data to generate the first natural language data, wherein the first natural language data represents information associated with the first personality type.

3. The computer-implemented method of claim 1, wherein the first natural language input data is received during a first dialog, and the method further comprises:

receiving, during the first dialog, third natural language input data corresponding to a second user input;

determining the first natural language input data;

processing the third natural language input data and the first natural language input data to determine second personality data associated with the second user input, the second personality data representing the first personality type including at least a second personality characteristic;

processing the third natural language input data, the first natural language input data, and the second personality data to generate second prompt data, the second prompt data corresponding to a second natural language directive for the LLM to generate a second response to the second user input, wherein the second response is associated with the second personality data;

processing, using the LLM, the second prompt data to generate third model output data, the third model output data indicating that a second component is to generate second data corresponding to a response to the second user input;

based on the third model output data, causing the second component to generate third natural language data;

processing, using the LLM, the second prompt data and the third natural language data to generate fourth model output data, the fourth model output data including fourth natural language data responsive to the second user input, wherein the fourth natural language data corresponds to the second personality data;

processing the fourth model output data to generate second output data responsive to the second user input; and causing presentation of the second output data.

4. The computer-implemented method of claim 1, further comprising:

processing, using a first machine learning (ML) model, the second natural language data to determine a first value representing a likelihood that the second natural language data corresponds to the first personality data;

processing, using a second ML model, the second natural language data to determine a second value representing an association between the first natural language data and the second natural language data;

processing the second natural language data to determine a third value representing an amount of words included in the second natural language data;

processing the first value, the second value, and the third value to determine first annotated data corresponding to the second natural language data; and based on the first annotated data, configuring a first model value of the LLM.

5. A computer-implemented method comprising:

receiving first input data corresponding to a natural language input;

determining first personality data associated with the natural language input, the first personality data representing a first personality determined to be associated with a response to the natural language input;

determining first prompt data including the first input data and the first personality data, the first prompt data corresponding to a first natural language directive for a language model to generate a first response to the natural language input, wherein the first response is to be associated with the first personality data;

processing, using the language model, the first prompt data to generate first model output data, the first model output data indicating that a first component is to generate first data associated with the first input data;

receiving, from the first component, first natural language data associated with the first input data;

processing, using the language model, the first prompt data and the first natural language data to generate second model output data responsive to the natural language input, wherein the second model output data corresponds to the first personality data;

processing the second model output data to generate the first output data responsive to the natural language input; and causing presentation of the first output data.

6. The computer-implemented method of claim 5, further comprising:

processing the first input data to select a personality type associated with the natural language input, the personality type including a first personality characteristic; and processing the first input data to select a second personality characteristic associated with the natural language input.

7. The computer-implemented method of claim 5, further comprising:

determining user profile data associated with the natural language input; and determining device type data indicating a type of device that received the natural language input, wherein determining the first personality data comprises processing the first input data, the user profile data, and the device type data.

8. The computer-implemented method of claim 5, wherein the first input data is received during a first dialog, the first personality data represents a first personality type, the first personality type including at least a first personality characteristic, and the method further comprises:

receiving, during the first dialog, first natural language input data corresponding to a first user input;

determining the first input data;

processing the first natural language input data and the first input data to determine second personality data associated with the first user input, the second personality data representing the first personality type, the first personality type including at least a second personality characteristic;

processing the first natural language input data, the first input data, and the second personality data to generate second prompt data, the second prompt data corresponding to a second natural language directive for the language model to generate a second response to the first user input that is associated with the second personality data;

processing, using the language model, the second prompt data to generate third model output data, the third model output data indicating that a second component is to generate second data corresponding to a response to the first user input;

based on the third model output data, causing the second component to generate second natural language data;

processing, using the language model, the second prompt data and the second natural language data to generate fourth model output data, the fourth model output data including third natural language data responsive to the first user input, wherein the third natural language data corresponds to the first personality data;

processing the fourth model output data to generate second output data responsive to the first user input; and causing presentation of the second output data.

9. The computer-implemented method of claim 5, further comprising:

sending, to the first component, the first input data and the first personality data; and processing, by the first component, the first input data and the first personality data to generate the first natural language data, wherein the second model output data corresponds to the first personality data based on processing, using the language model, the first prompt data and the first natural language data.

10. The computer-implemented method of claim 5, wherein the first component is associated with a first personality type, the first personality data represents the first personality type is associated with the natural language input, and the method further comprises:

based on the first personality data representing the first personality type is associated with the natural language input and the first component being associated with the first personality type, sending, to the first component, the first input data and the first personality data; and processing, by the first component, the first input data and the first personality data to generate the first natural language data, wherein the first natural language data represents information associated with the first personality type.

11. The computer-implemented method of claim 5, further comprising:

processing, using a first machine learning (ML) model, the second model output data to determine a first value representing a likelihood that the second model output data corresponds to the second model output data;

processing the second model output data to determine a second value representing an amount of words included in the second model output data;

processing the first value and the second value to determine first annotated data corresponding to the second model output data, the first annotated data including a first indication corresponding to the first value and a second indication corresponding to the second value; and based on the first annotated data, configuring a first model value of the language model.

12. The computer-implemented method of claim 5, further comprising:

processing, using a first machine learning (ML) model, the second model output data to determine a first value representing an association between the first natural language data and the second model output data;

processing the first value to determine first annotated data corresponding to the second model output data, the first annotated data including an indication of the first value; and based on the first annotated data, configuring a first model value of the language model.

13. A computing system comprising:

at least one processor; and at least one memory comprising instructions that, when executed by the at least one processor, cause the computing system to:

receive first input data corresponding to a natural language input;

determine first personality data associated with the natural language input, the first personality data representing a first personality determined to be associated with a response to the natural language input;

determine first prompt data including the first input data and the first personality data, the first prompt data corresponding to a first natural language directive for a language model to generate a first response to the natural language input, wherein the first response is to be associated with the first personality data;

process, using the language model, the first prompt data to generate first model output data, the first model output data indicating that a first component is to generate first data associated with the first input data;

receive, from the first component, first natural language data associated with the first input data;

process, using the language model, the first prompt data and the first natural language data to generate second model output data responsive to the natural language input, wherein the second model output data corresponds to the first personality data;

process the second model output data to generate the first output data responsive to the natural language input; and cause presentation of the first output data.

14. The computing system of claim 13, wherein the at least one memory further comprises instructions that, when executed by the at least one processor, further cause the computing system to:

process the first input data to select a personality type associated with the natural language input, the personality type including a first personality characteristic; and process the first input data to select a second personality characteristic associated with the natural language input.

15. The computing system of claim 13, wherein the at least one memory further comprises instructions that, when executed by the at least one processor, further cause the computing system to:

determine user profile data associated with the natural language input; and determine device type data indicating a type of device that received the natural language input, wherein determining the first personality data comprises processing the first input data, the user profile data, and the device type data.

16. The computing system of claim 13, wherein the first input data is received during a first dialog, the first personality data representing a first personality type, the first personality type including at least a first personality characteristic, and wherein the at least one memory further comprises instructions that, when executed by the at least one processor, further cause the computing system to:

receive, during the first dialog, first natural language input data corresponding to a first user input;

determine the first input data;

process the first natural language input data and the first input data to determine second personality data associated with the first user input, the second personality data representing the first personality type, the first personality type including at least a second personality characteristic;

process the first natural language input data, the first input data, and the second personality data to generate second prompt data, the second prompt data corresponding to a second natural language directive for the language model to generate a second response to the first user input that is associated with the second personality data;

process, using the language model, the second prompt data to generate third model output data, the third model output data indicating that a second component is to generate second data corresponding to a response to the first user input;

based on the third model output data, cause the second component to generate second natural language data;

process, using the language model, the second prompt data and the second natural language data to generate fourth model output data, the fourth model output data including third natural language data responsive to the first user input, wherein the third natural language data corresponds to the first personality data;

process the fourth model output data to generate second output data responsive to the first user input; and cause presentation of the second output data.

17. The computing system of claim 13, wherein the at least one memory further comprises instructions that, when executed by the at least one processor, further cause the computing system to:

send, to the first component, the first input data and the first personality data; and process, by the first component, the first input data and the first personality data to generate the first natural language data, wherein the second model output data corresponds to the first personality data based on processing, using the language model, the first prompt data and the first natural language data.

18. The computing system of claim 13, wherein the first component is associated with a first personality type, the first personality data represents the first personality type is associated with the natural language input, and the at least one memory further comprises instructions that, when executed by the at least one processor, further cause the computing system to:

based on the first personality data representing the first personality type is associated with the natural language input and the first component being associated with the first personality type, send, to the first component, the first input data and the first personality data; and process, by the first component, the first input data and the first personality data to generate the first natural language data, wherein the first natural language data represents information associated with the first personality type.

19. The computing system of claim 13, wherein the at least one memory further comprises instructions that, when executed by the at least one processor, further cause the computing system to:

process, using a first machine learning (ML) model, the second model output data to determine a first value representing a likelihood that the second model output data corresponds to the second model output data;

process the second model output data to determine a second value representing an amount of words included in the second model output data;

process the first value and the second value to determine first annotated data corresponding to the second model output data, the first annotated data including a first indication corresponding to the first value and a second indication corresponding to the second value; and based on the first annotated data, configure a first model value of the language model.

20. The computing system of claim 13, wherein the at least one memory further comprises instructions that, when executed by the at least one processor, further cause the computing system to:

process, using a first machine learning (ML) model, the second model output data to determine a first value representing an association between the first natural language data and the second model output data;

process the first value to determine first annotated data corresponding to the second model output data, the first annotated data including an indication of the first value; and based on the first annotated data, configure a first model value of the language model.

\* \* \* \* \*